Aug. 1, 1950 S. H. JONES 2,517,436
FORMING METHOD AND APPARATUS
Filed March 17, 1944 33 Sheets-Sheet 1

INVENTOR.
Stewart H. Jones
BY
ATTORNEY

Aug. 1, 1950 S. H. JONES 2,517,436
FORMING METHOD AND APPARATUS
Filed March 17, 1944 33 Sheets-Sheet 2
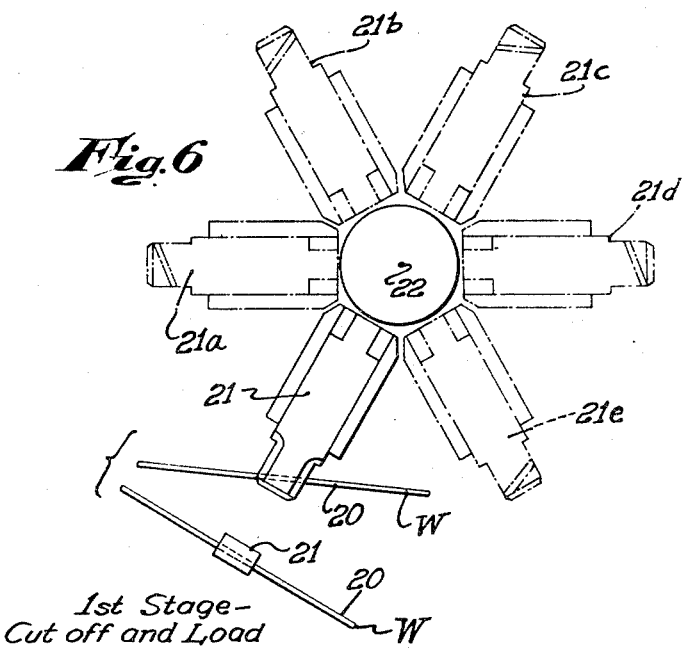
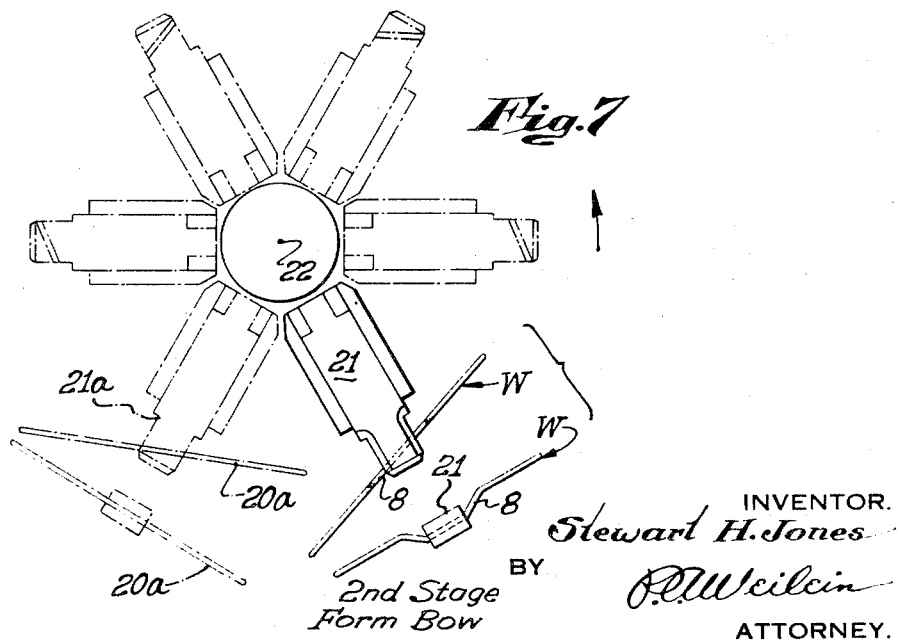
INVENTOR.
Stewart H. Jones
BY
ATTORNEY.

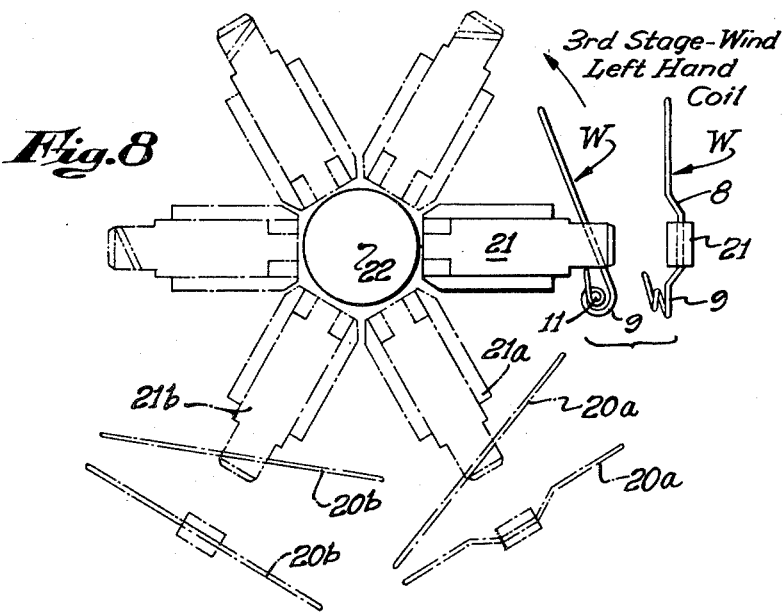
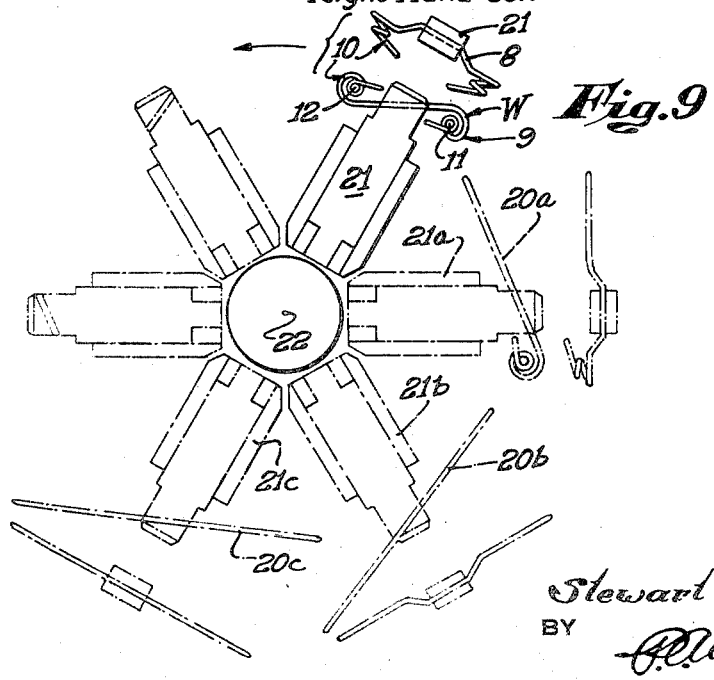

Aug. 1, 1950 S. H. JONES 2,517,436
FORMING METHOD AND APPARATUS
Filed March 17, 1944 33 Sheets-Sheet 4
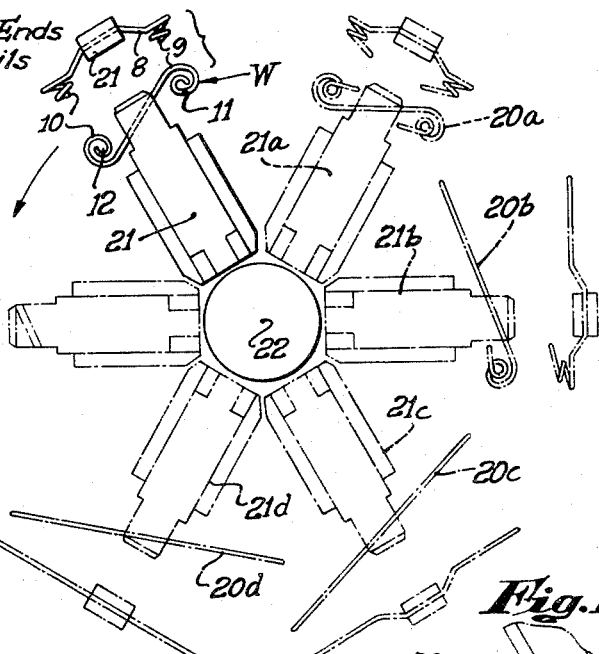
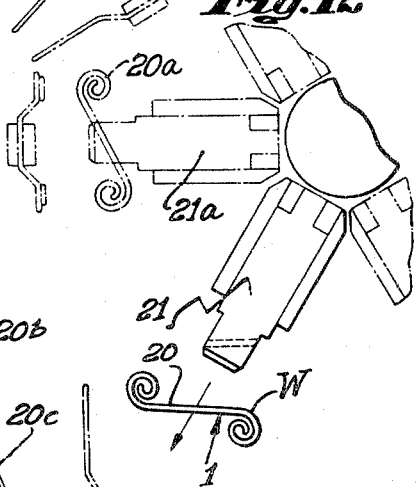
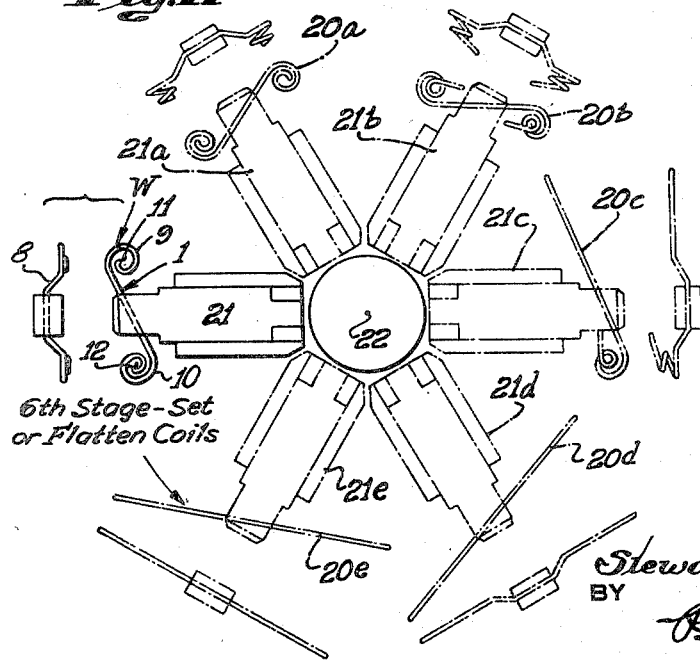
INVENTOR.
Stewart H. Jones
BY
ATTORNEY.

Aug. 1, 1950     S. H. JONES     2,517,436
FORMING METHOD AND APPARATUS

Filed March 17, 1944     33 Sheets-Sheet 8

INVENTOR.
Stewart H. Jones
BY
ATTORNEY.

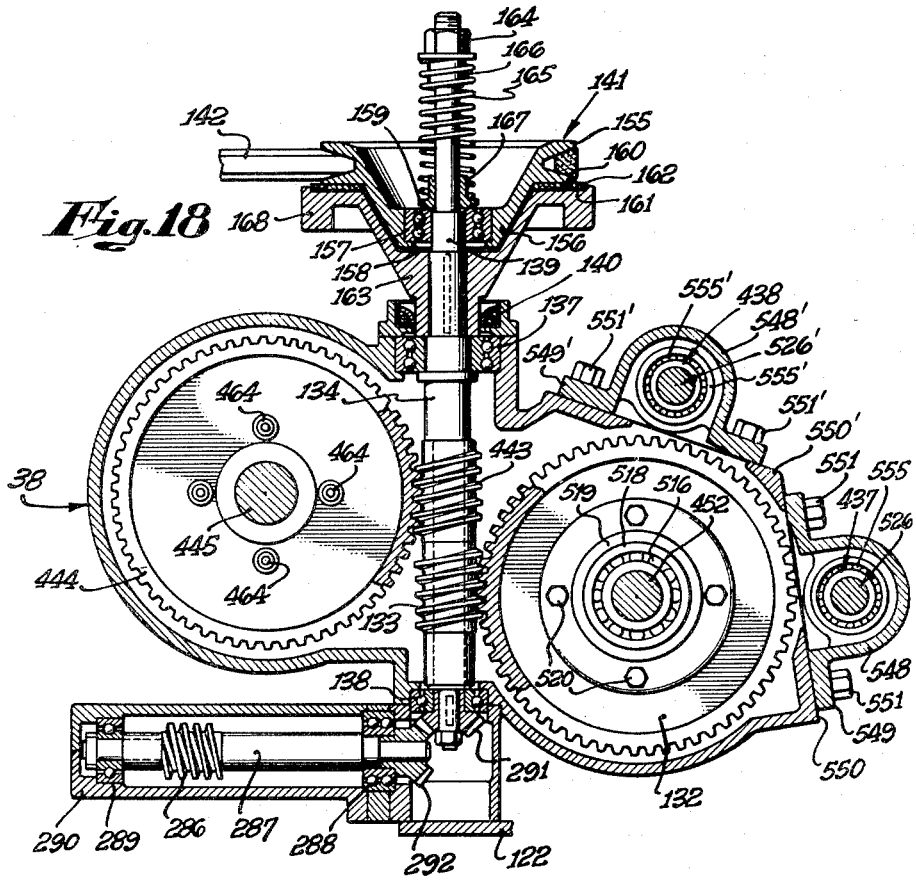
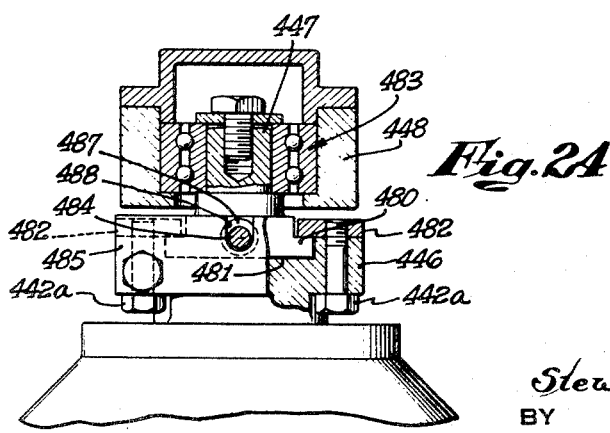

Aug. 1, 1950 S. H. JONES 2,517,436
FORMING METHOD AND APPARATUS
Filed March 17, 1944 33 Sheets-Sheet 11

INVENTOR.
Stewart H. Jones
BY
ATTORNEY.

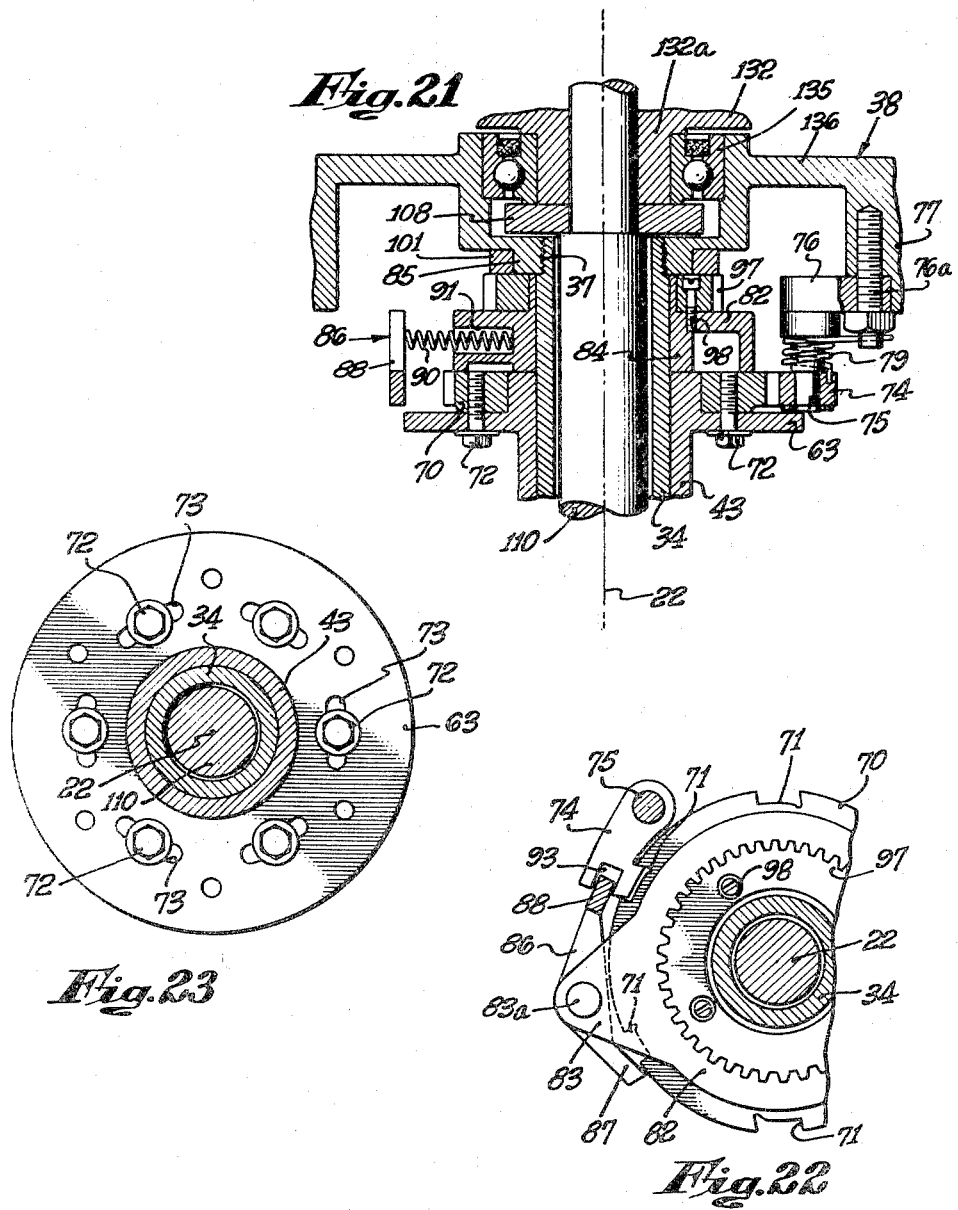

Aug. 1, 1950  S. H. JONES  2,517,436
FORMING METHOD AND APPARATUS
Filed March 17, 1944  33 Sheets-Sheet 13
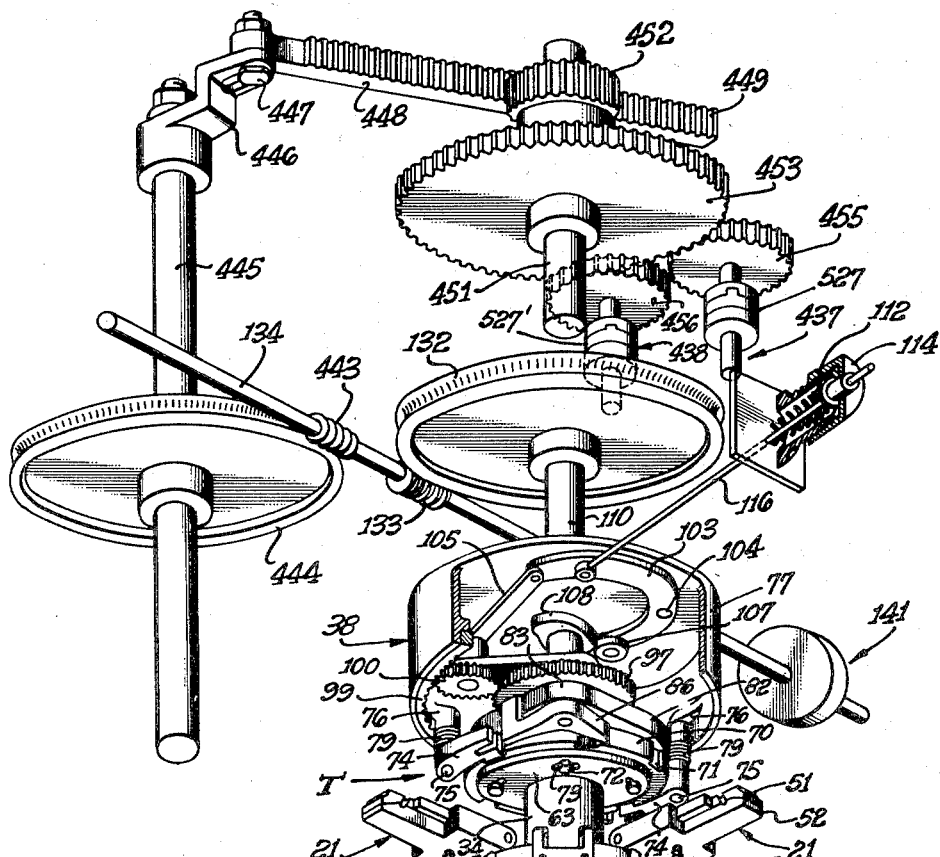
Fig. 25
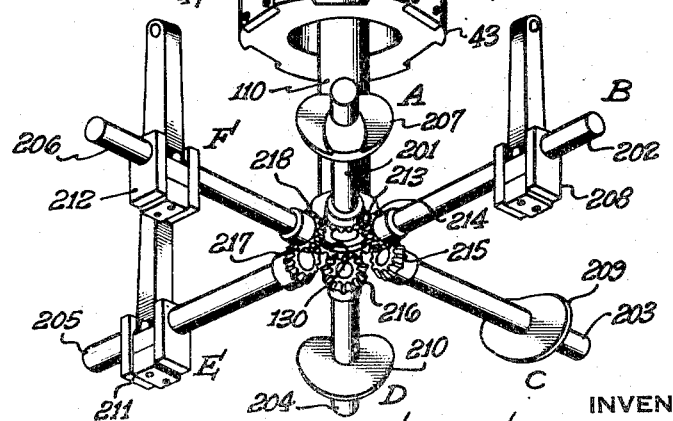
INVENTOR.
Stewart H. Jones
BY
ATTORNEY.

Aug. 1, 1950   S. H. JONES   2,517,436
FORMING METHOD AND APPARATUS
Filed March 17, 1944   33 Sheets-Sheet 14
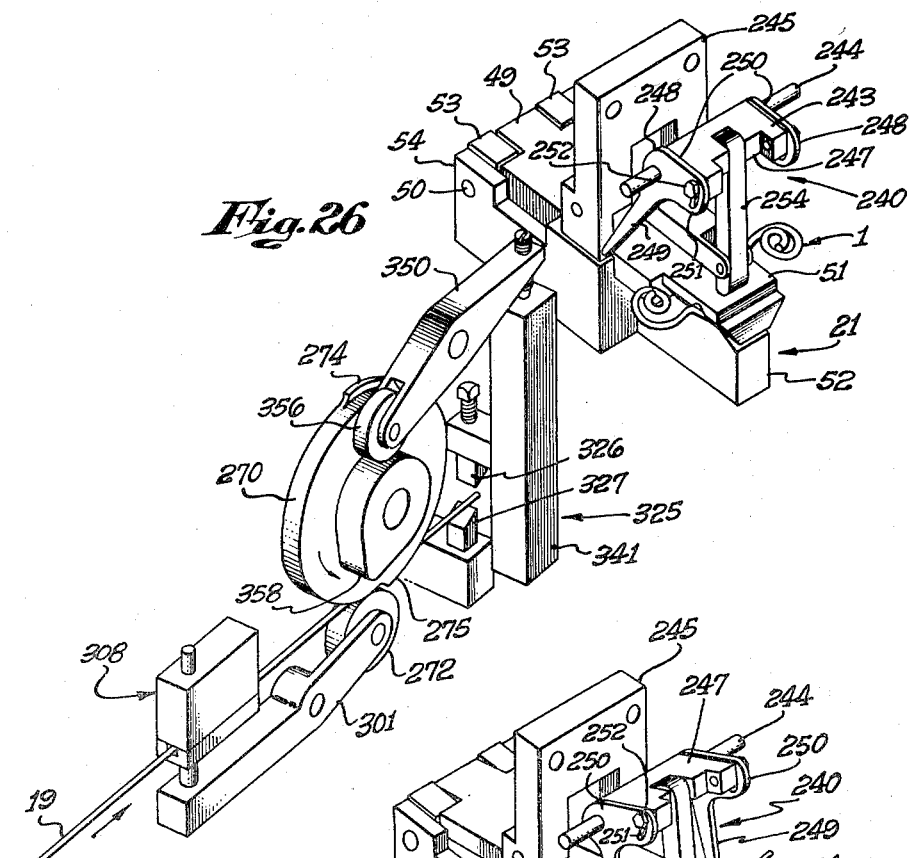
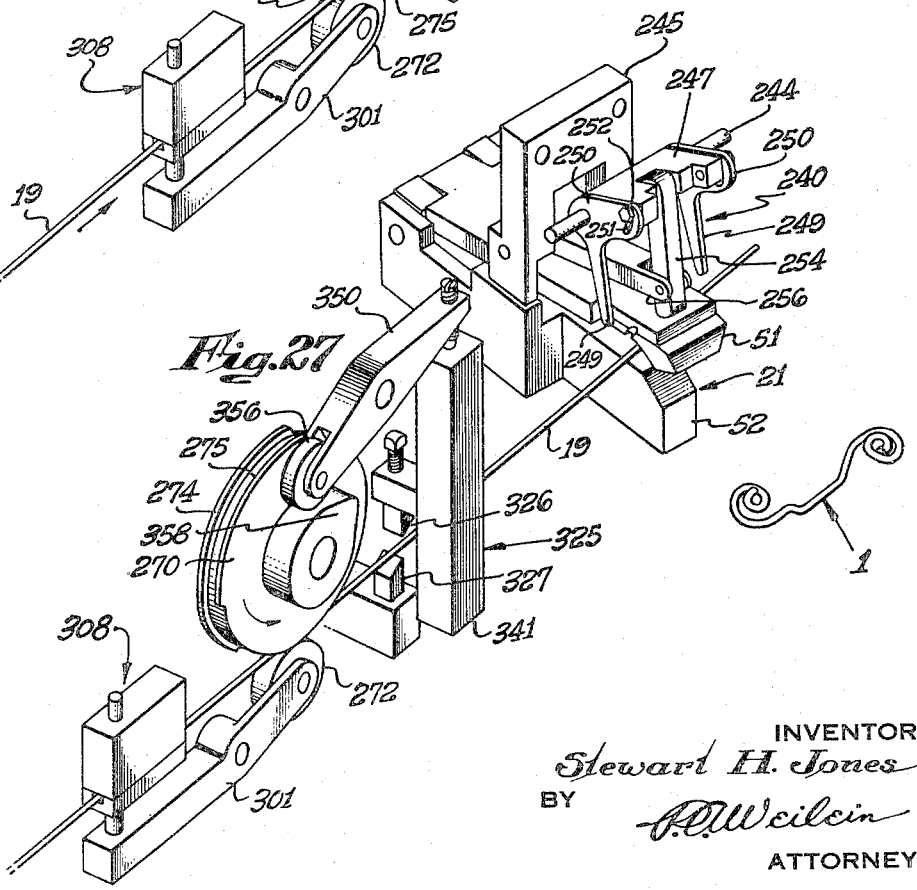
INVENTOR.
Stewart H. Jones
BY
ATTORNEY.

Aug. 1, 1950 S. H. JONES 2,517,436
FORMING METHOD AND APPARATUS
Filed March 17, 1944 33 Sheets-Sheet 15
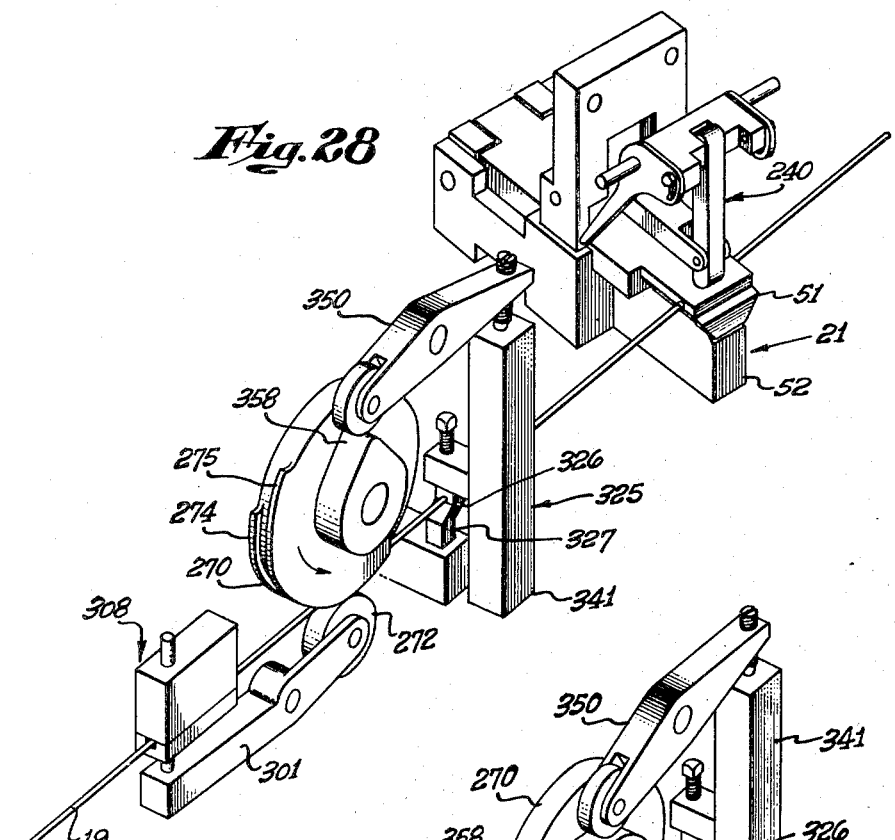
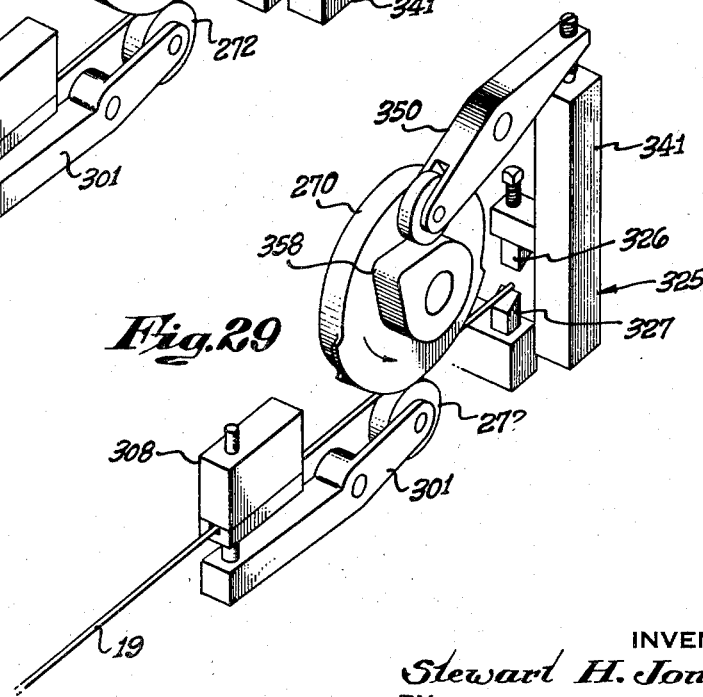
INVENTOR.
Stewart H. Jones
BY
ATTORNEY.

Aug. 1, 1950   S. H. JONES   2,517,436
FORMING METHOD AND APPARATUS
Filed March 17, 1944   33 Sheets-Sheet 16
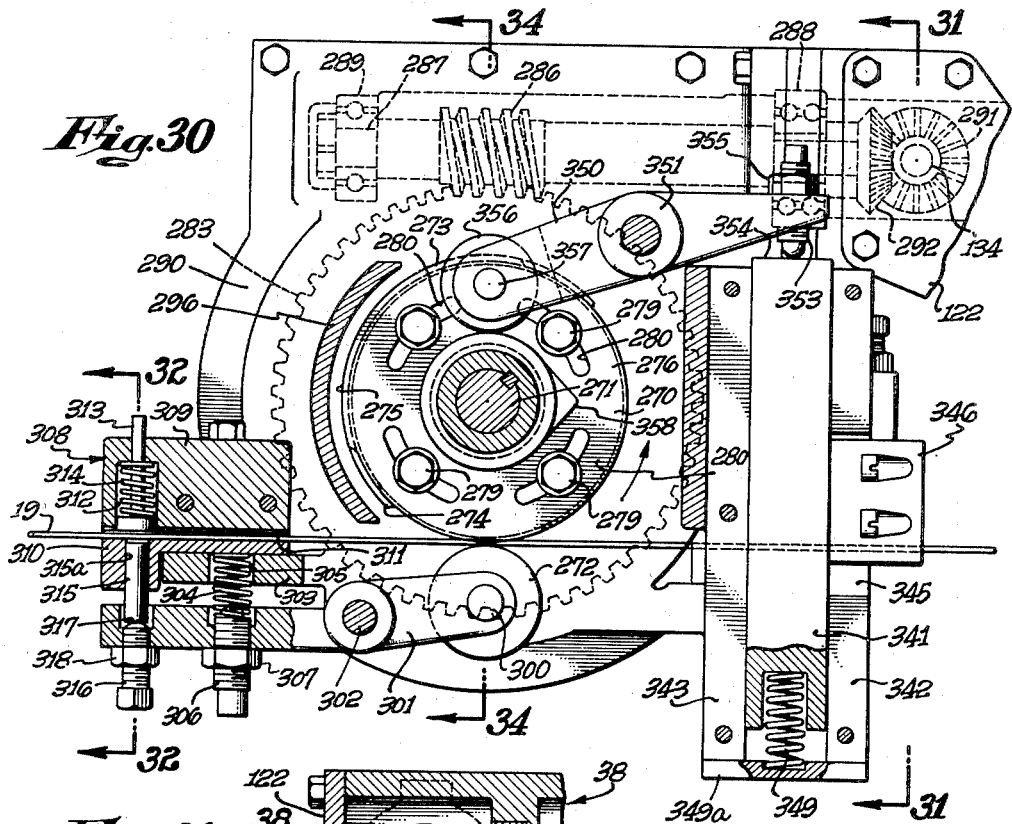
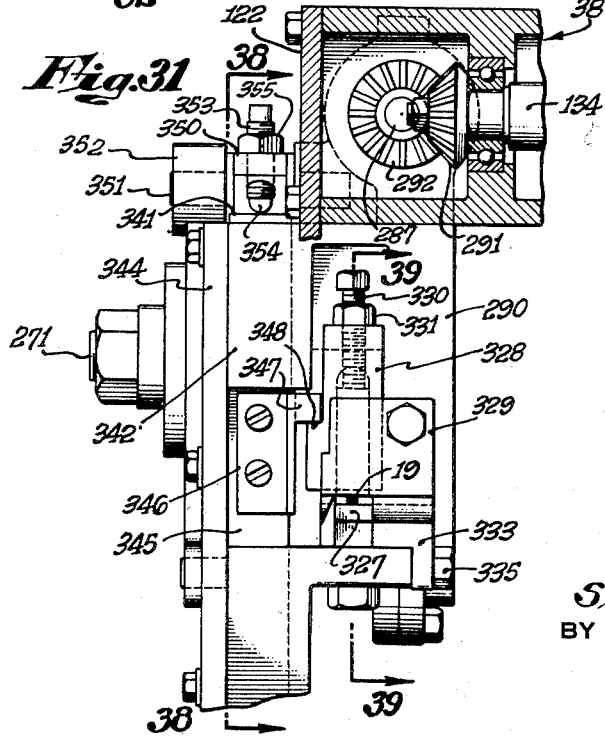
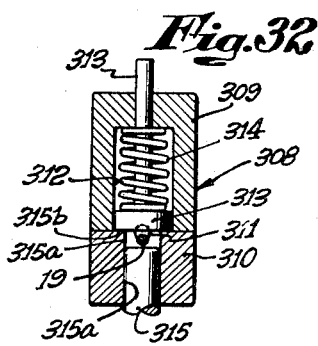
INVENTOR.
Stewart H. Jones
BY
*(signature)*
ATTORNEY.

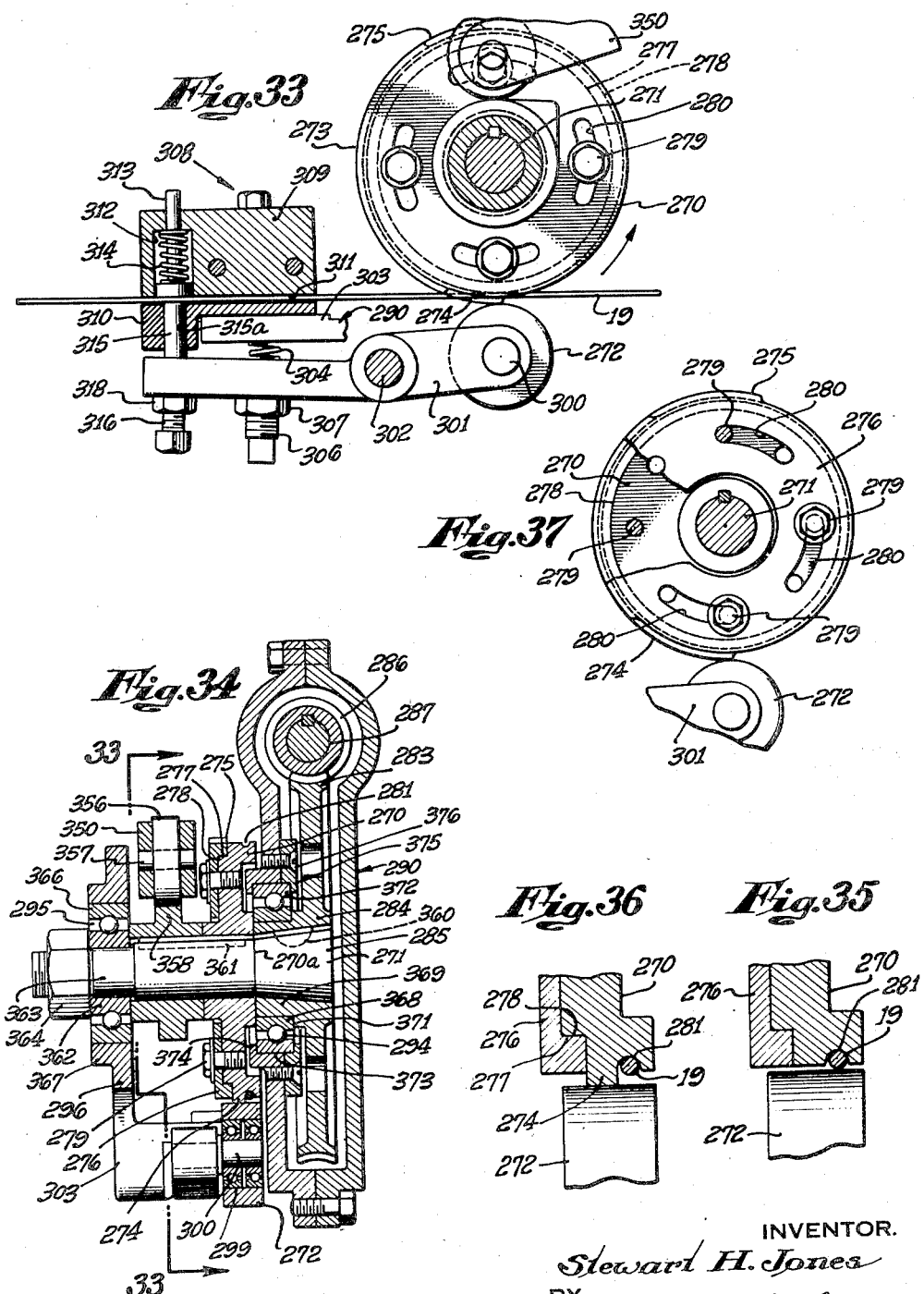

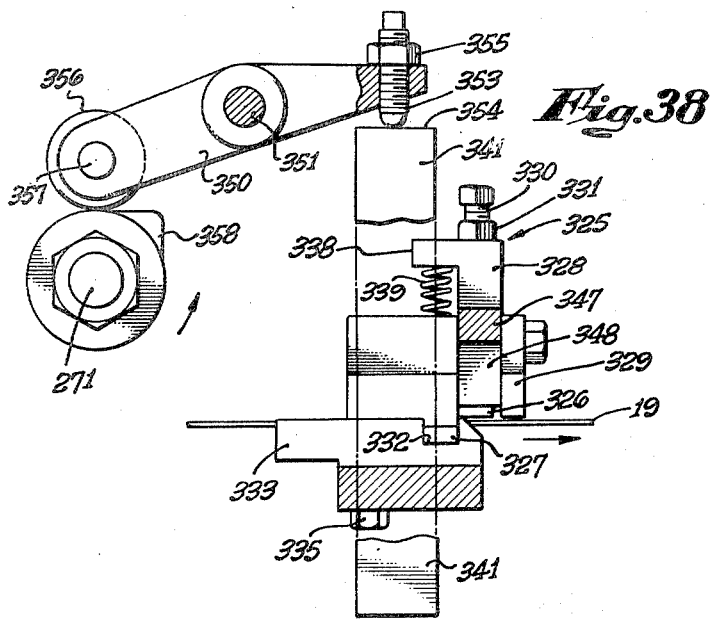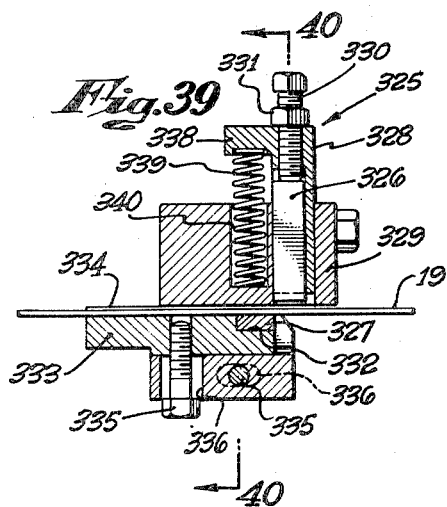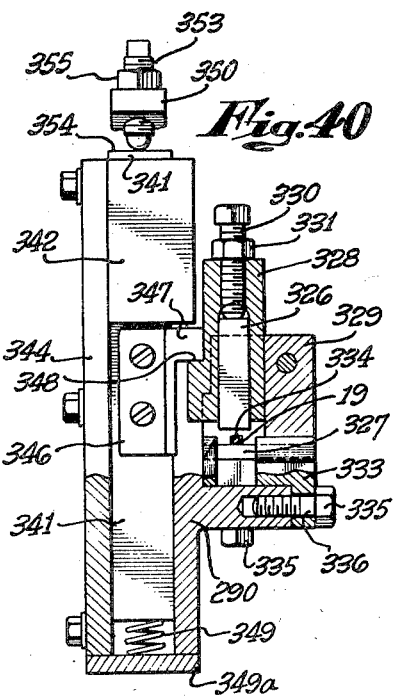

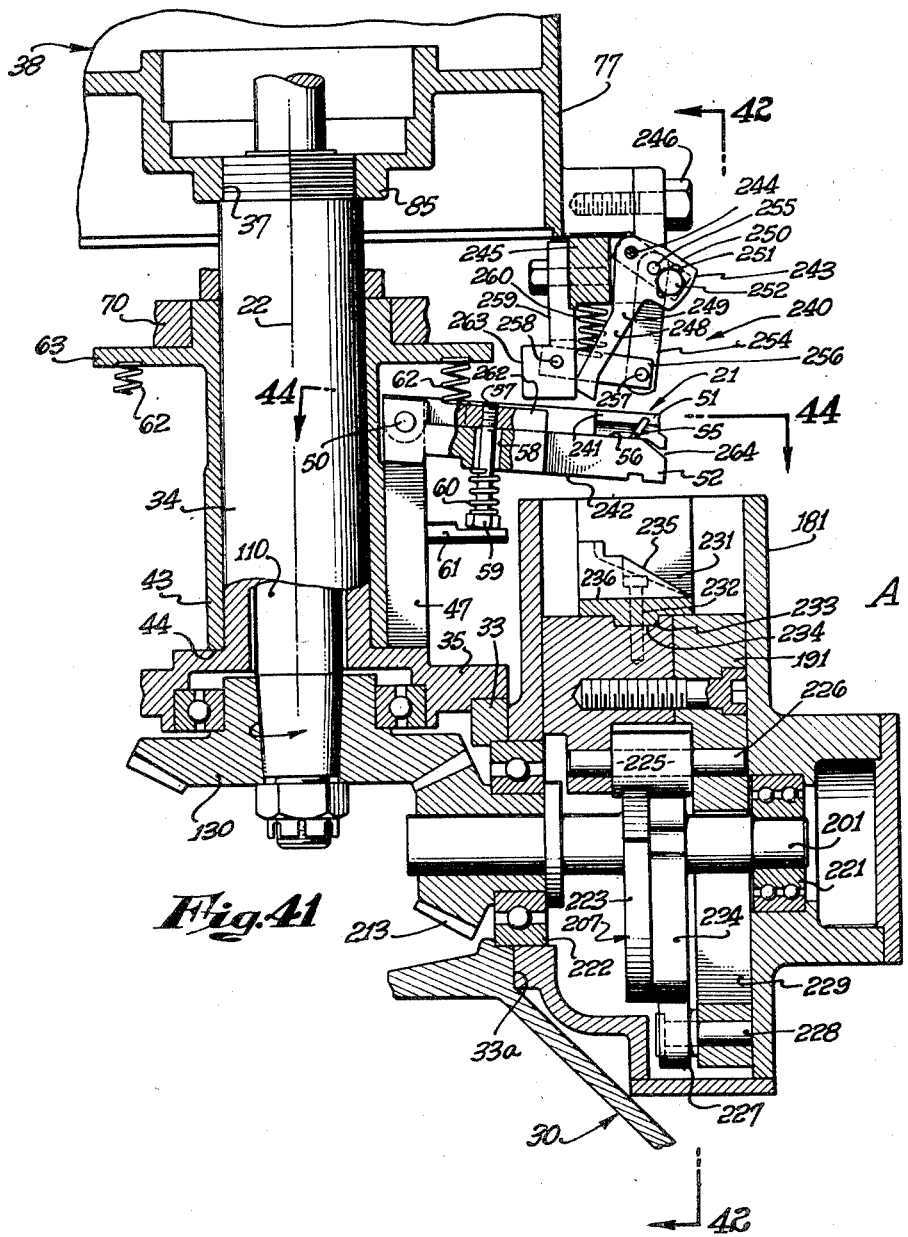

Aug. 1, 1950  S. H. JONES  2,517,436
FORMING METHOD AND APPARATUS
Filed March 17, 1944  33 Sheets-Sheet 20
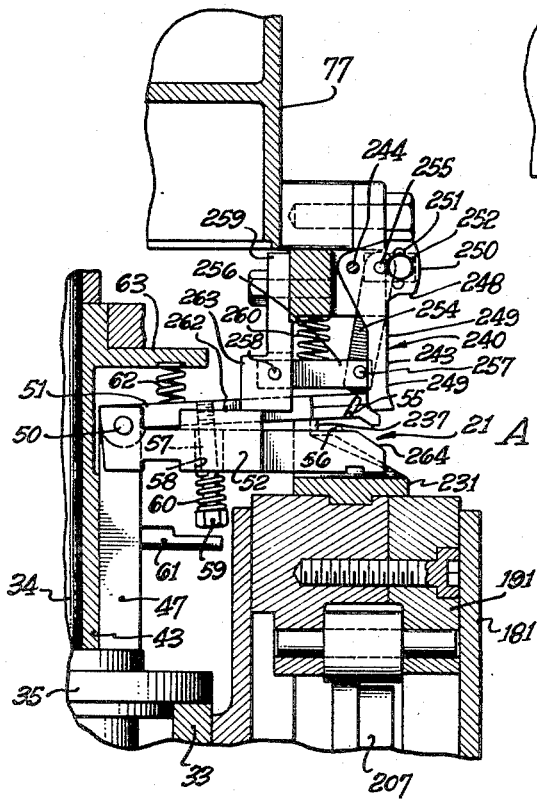
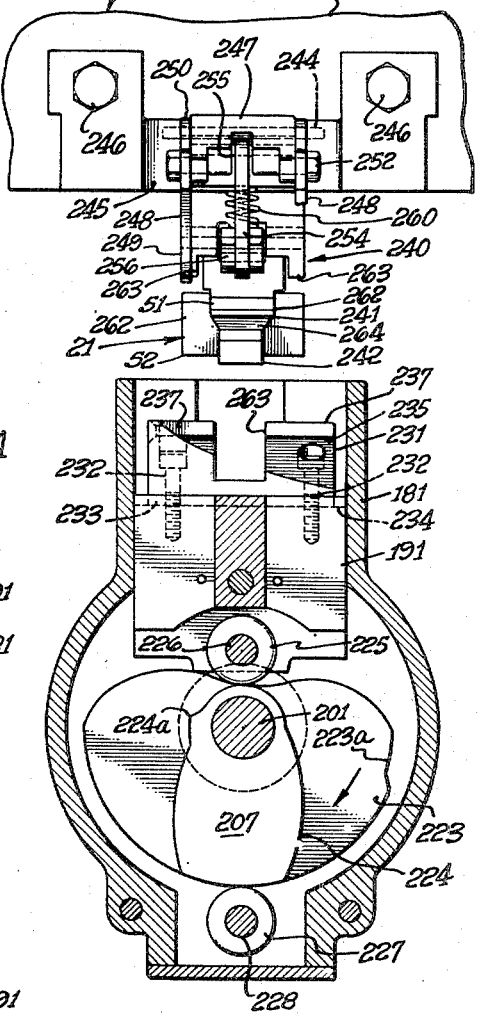
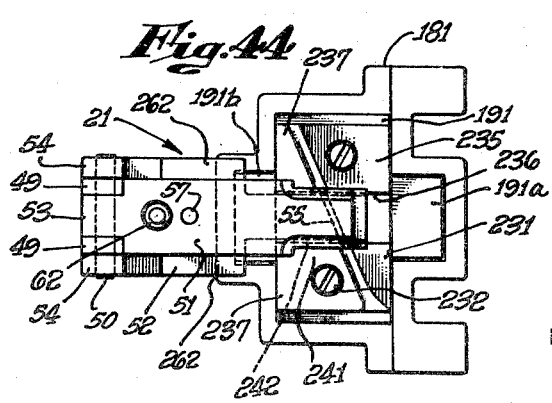
INVENTOR.
Stewart H. Jones
BY
ATTORNEY.

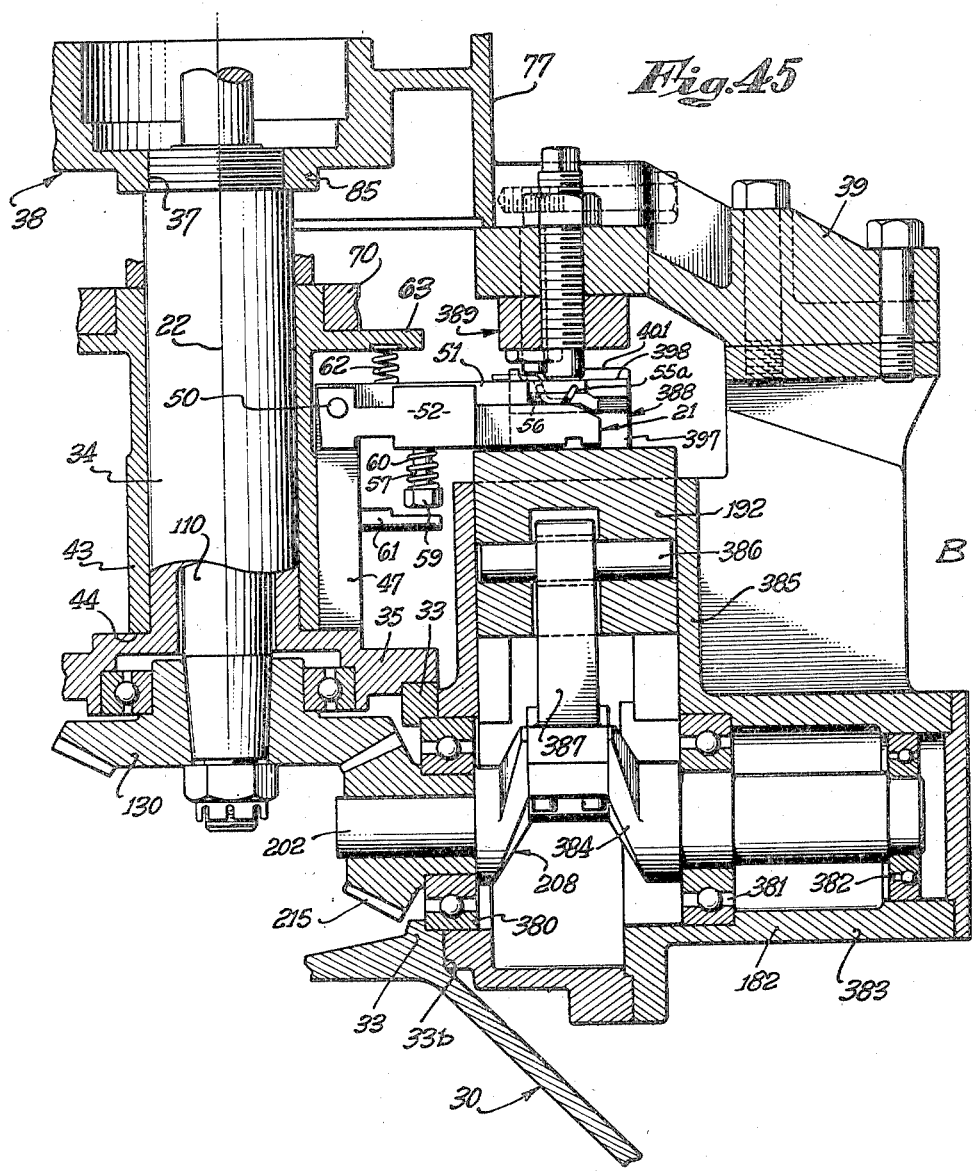

Aug. 1, 1950 S. H. JONES 2,517,436
FORMING METHOD AND APPARATUS
Filed March 17, 1944 33 Sheets-Sheet 22
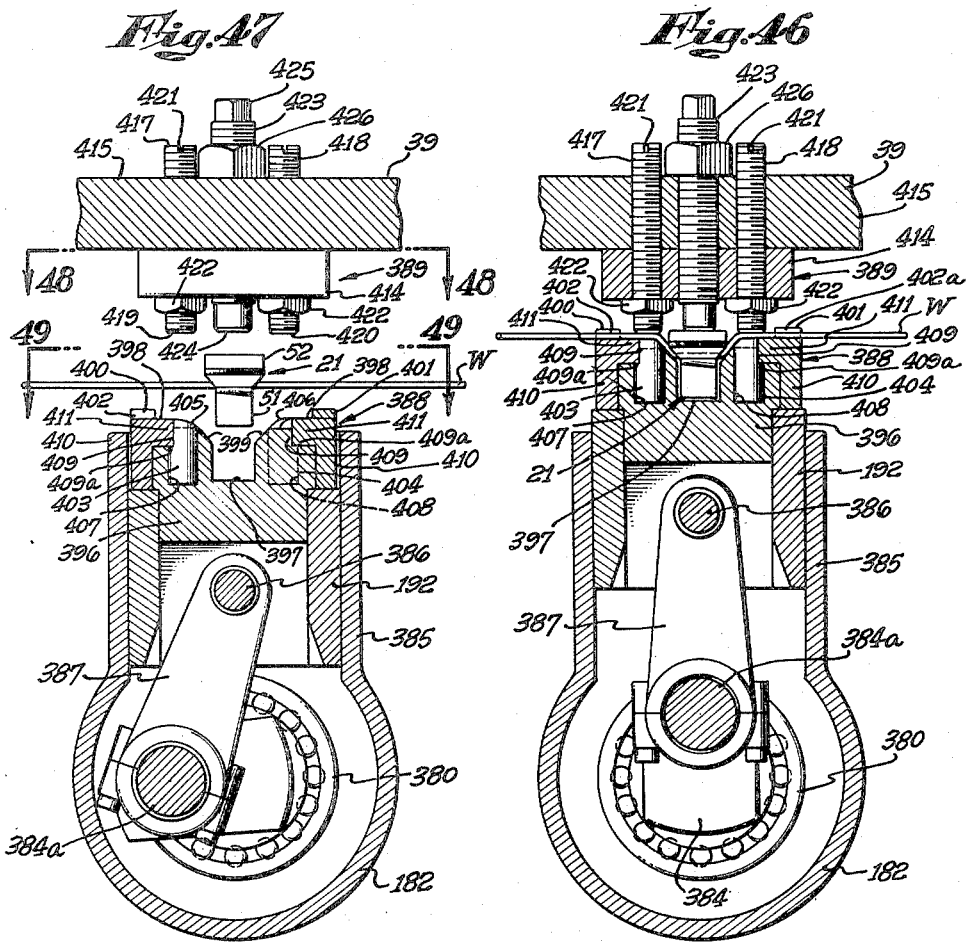
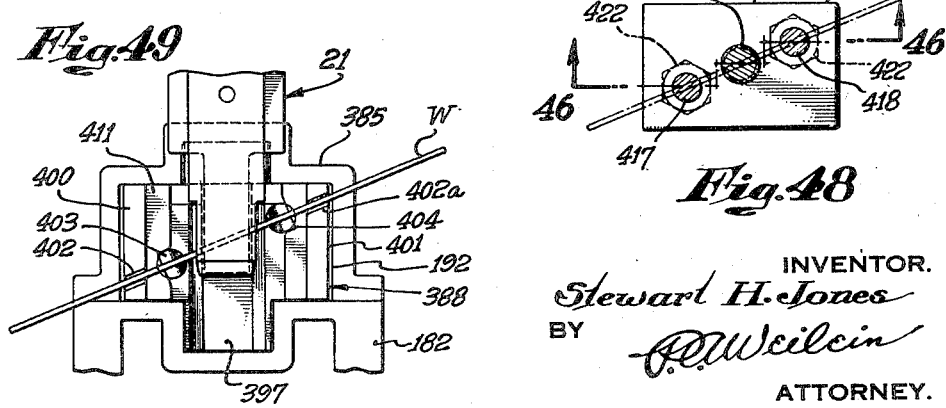
INVENTOR.
Stewart H. Jones
BY
ATTORNEY.

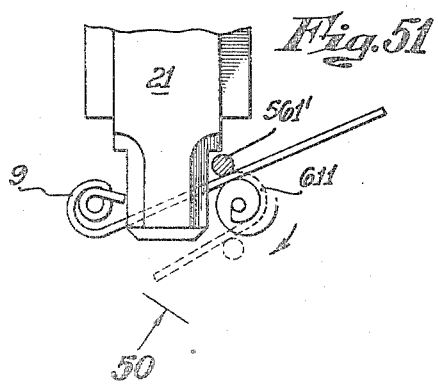
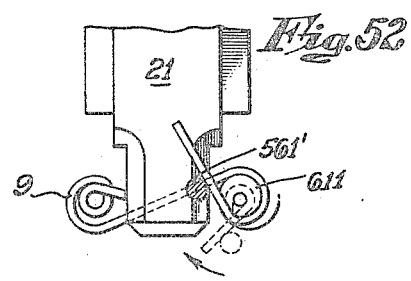
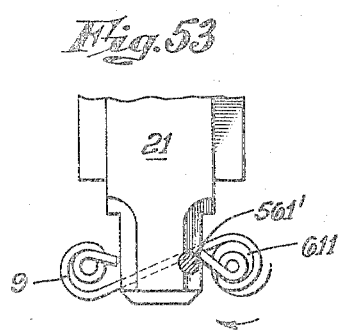
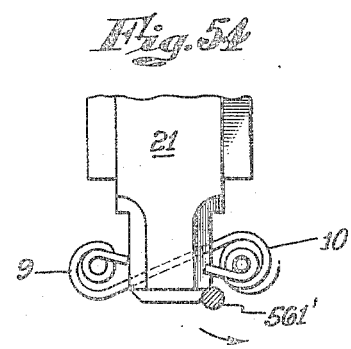
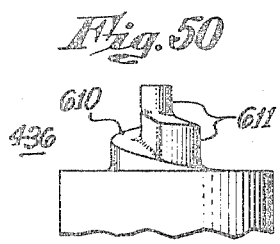

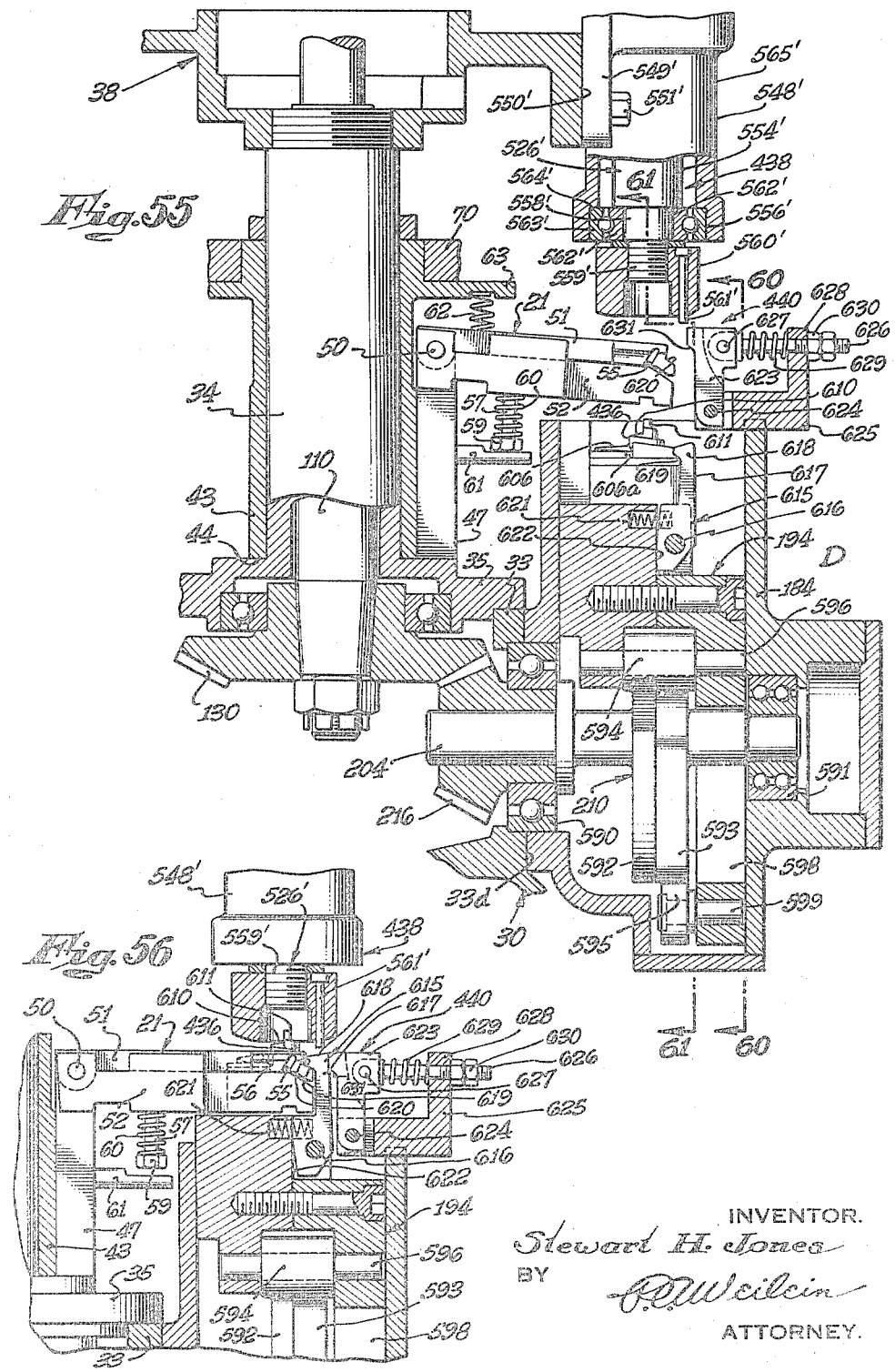

Aug. 1, 1950 S. H. JONES 2,517,436
FORMING METHOD AND APPARATUS
Filed March 17, 1944 33 Sheets-Sheet 25
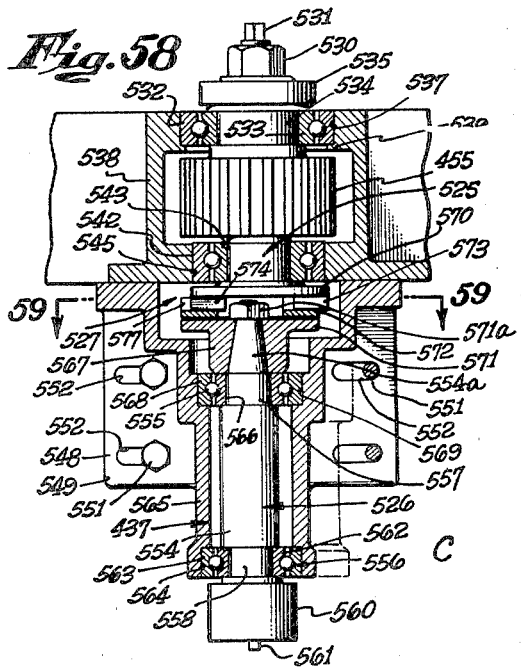
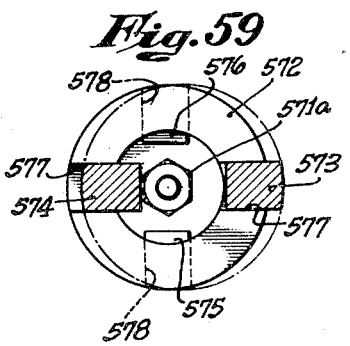
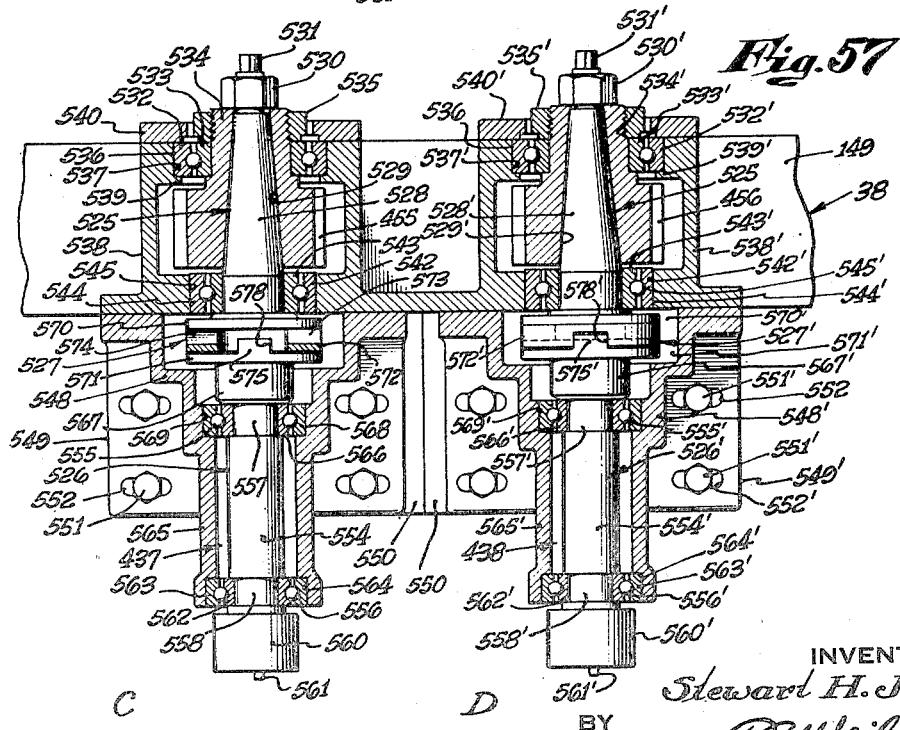
INVENTOR.
Stewart H. Jones
BY
ATTORNEY.

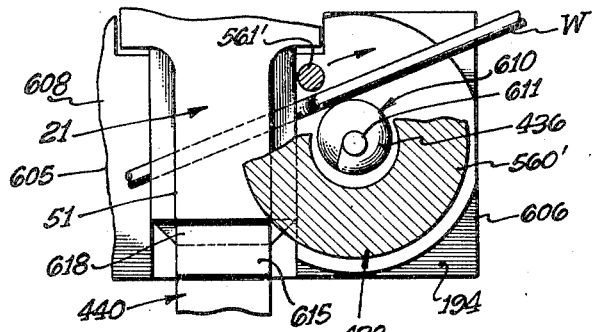
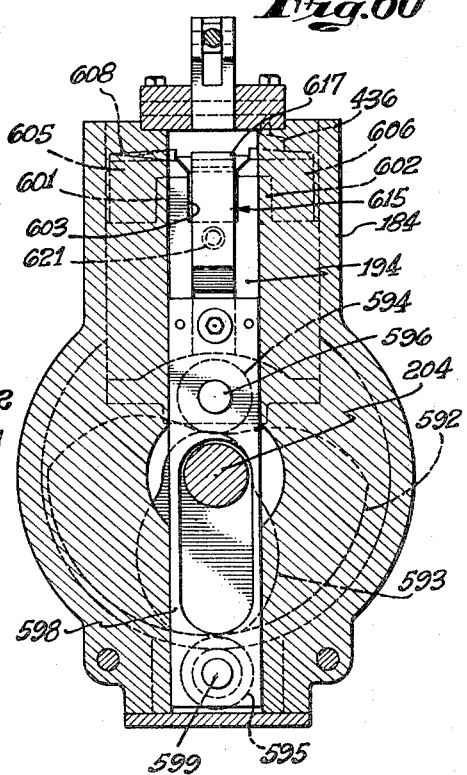
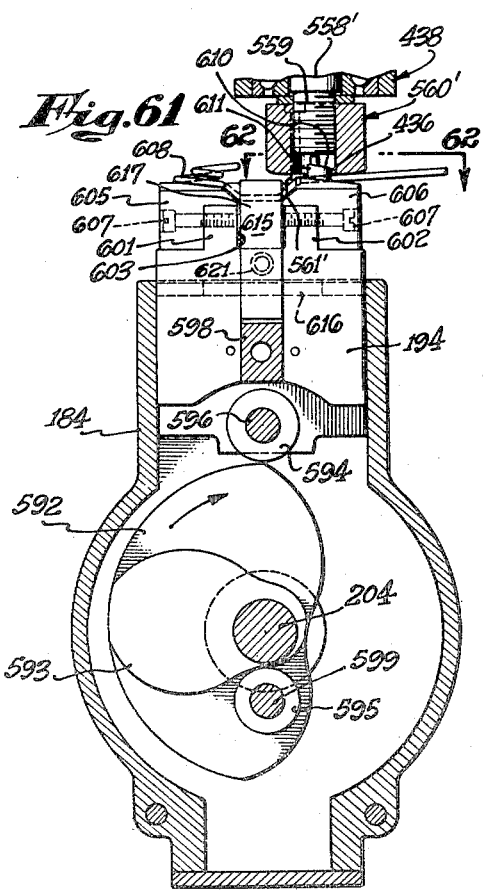

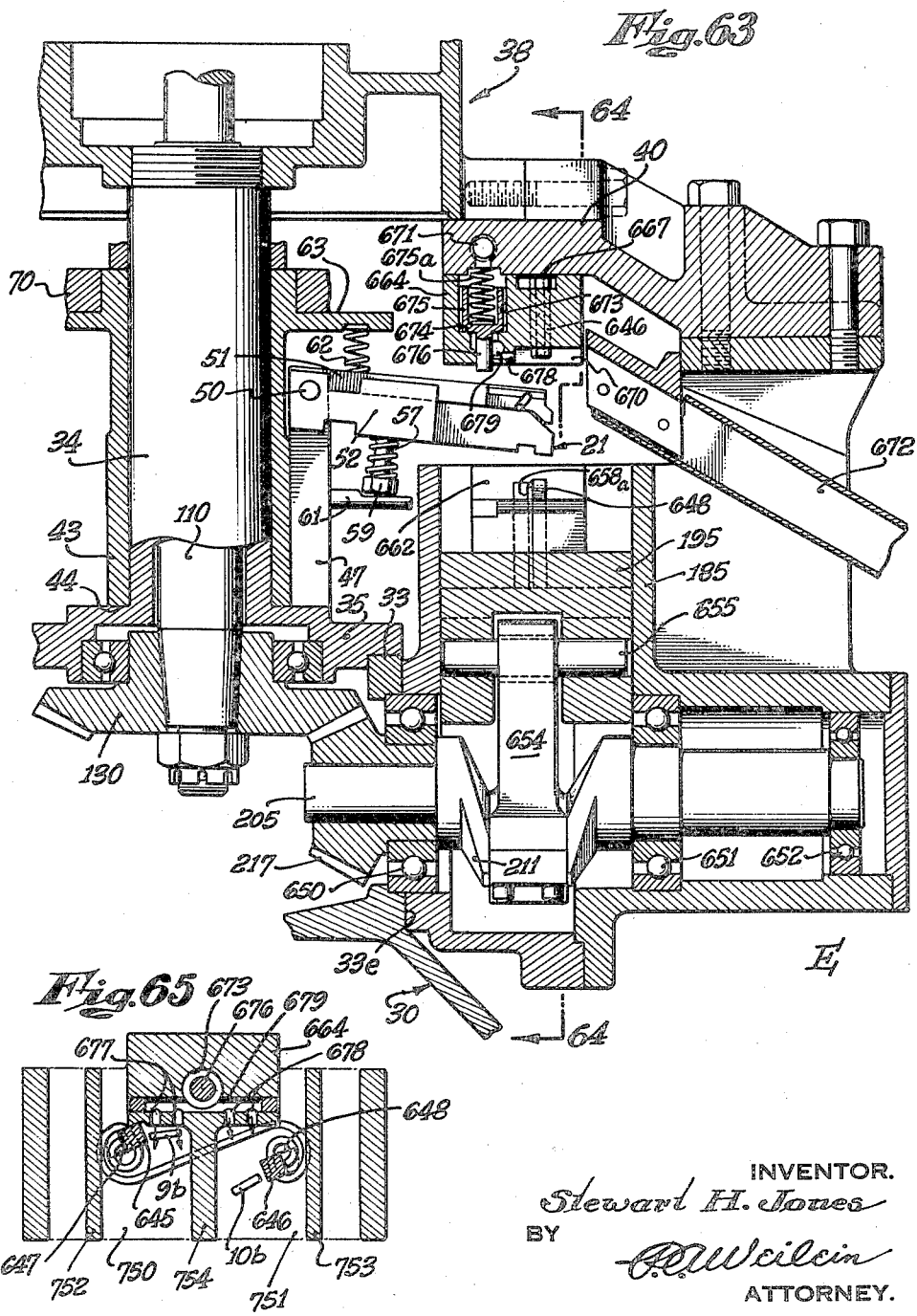

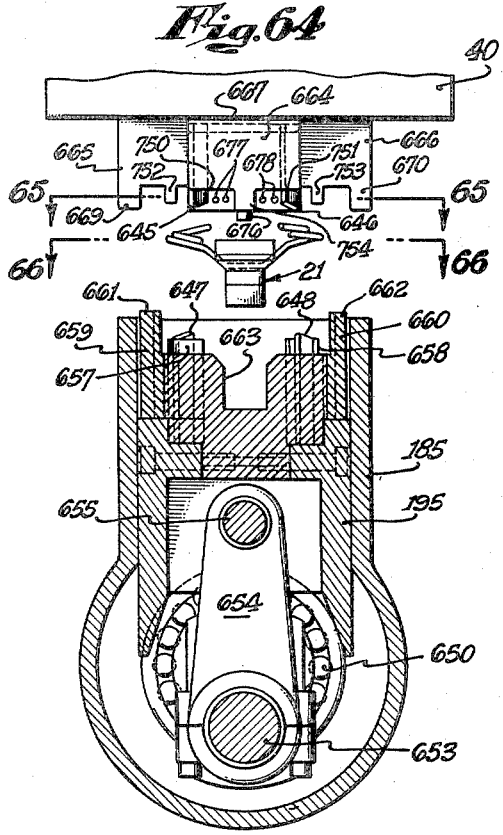

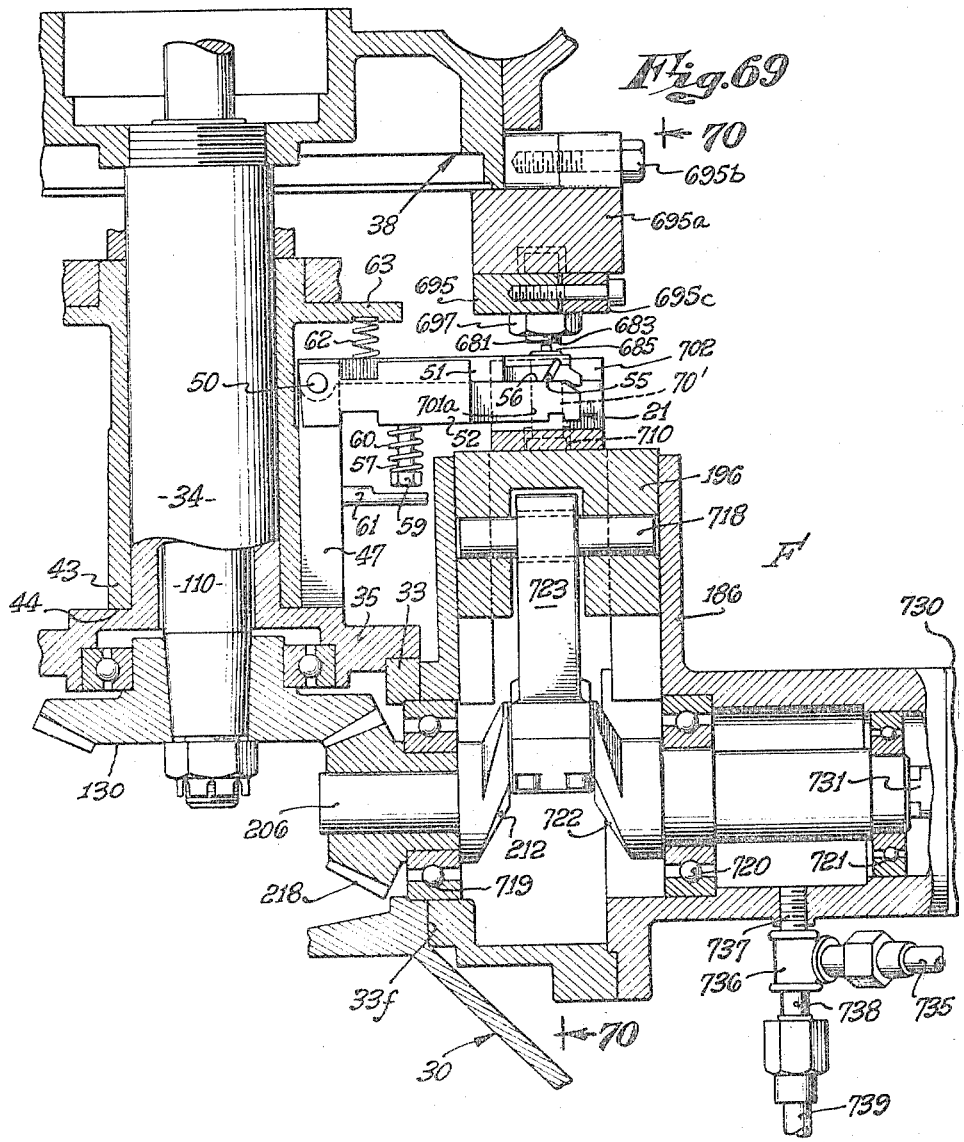

Aug. 1, 1950 S. H. JONES 2,517,436
FORMING METHOD AND APPARATUS
Filed March 17, 1944 33 Sheets-Sheet 30
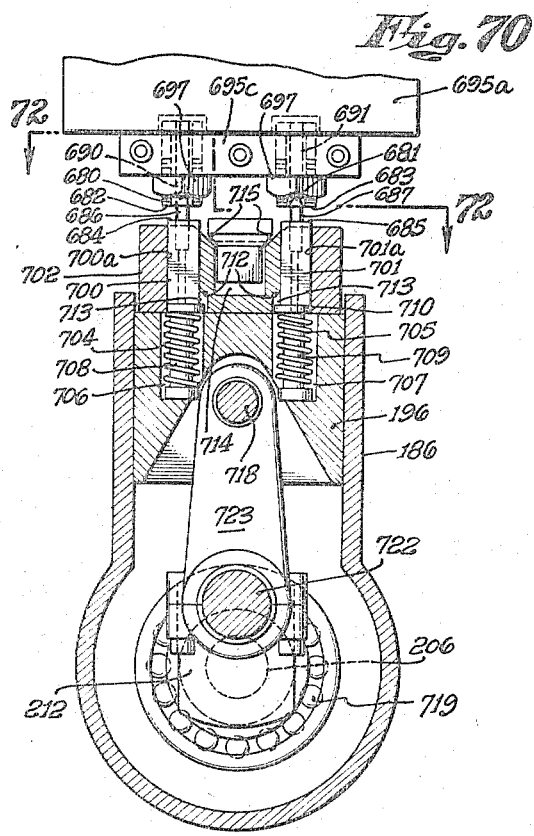
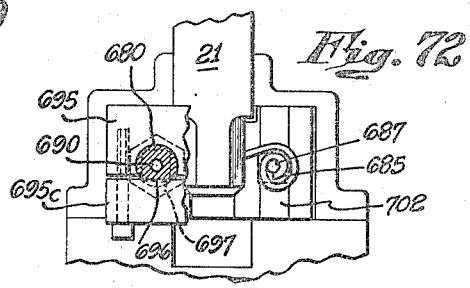
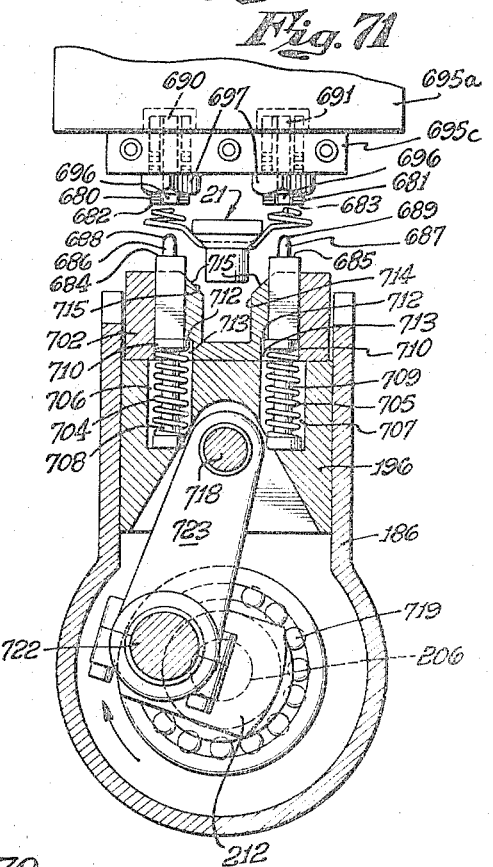
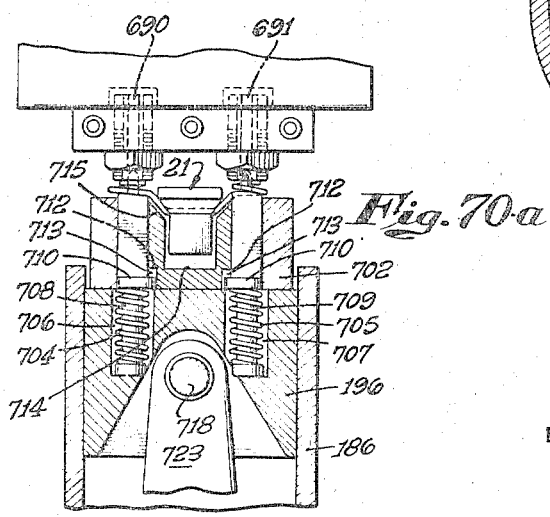
INVENTOR.
Stewart H. Jones
BY
P. W. Weilein
ATTORNEY.

Aug. 1, 1950 S. H. JONES 2,517,436
FORMING METHOD AND APPARATUS
Filed March 17, 1944 33 Sheets-Sheet 31
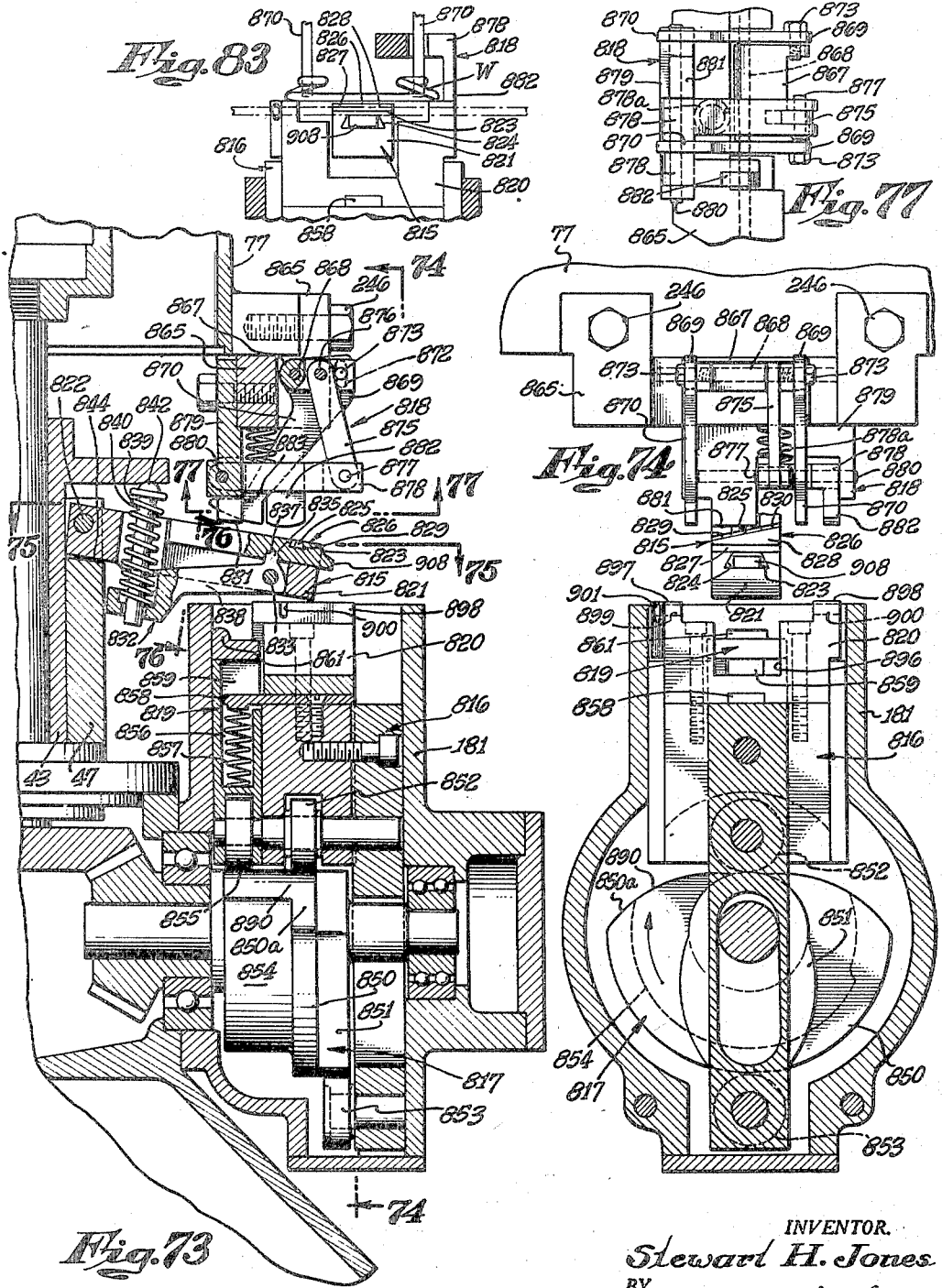
INVENTOR.
Stewart H. Jones
BY
ATTORNEY Aug. 1, 1950 S. H. JONES 2,517,436
FORMING METHOD AND APPARATUS
Filed March 17, 1944 33 Sheets-Sheet 32

INVENTOR.
Stewart H. Jones
BY
ATTORNEY

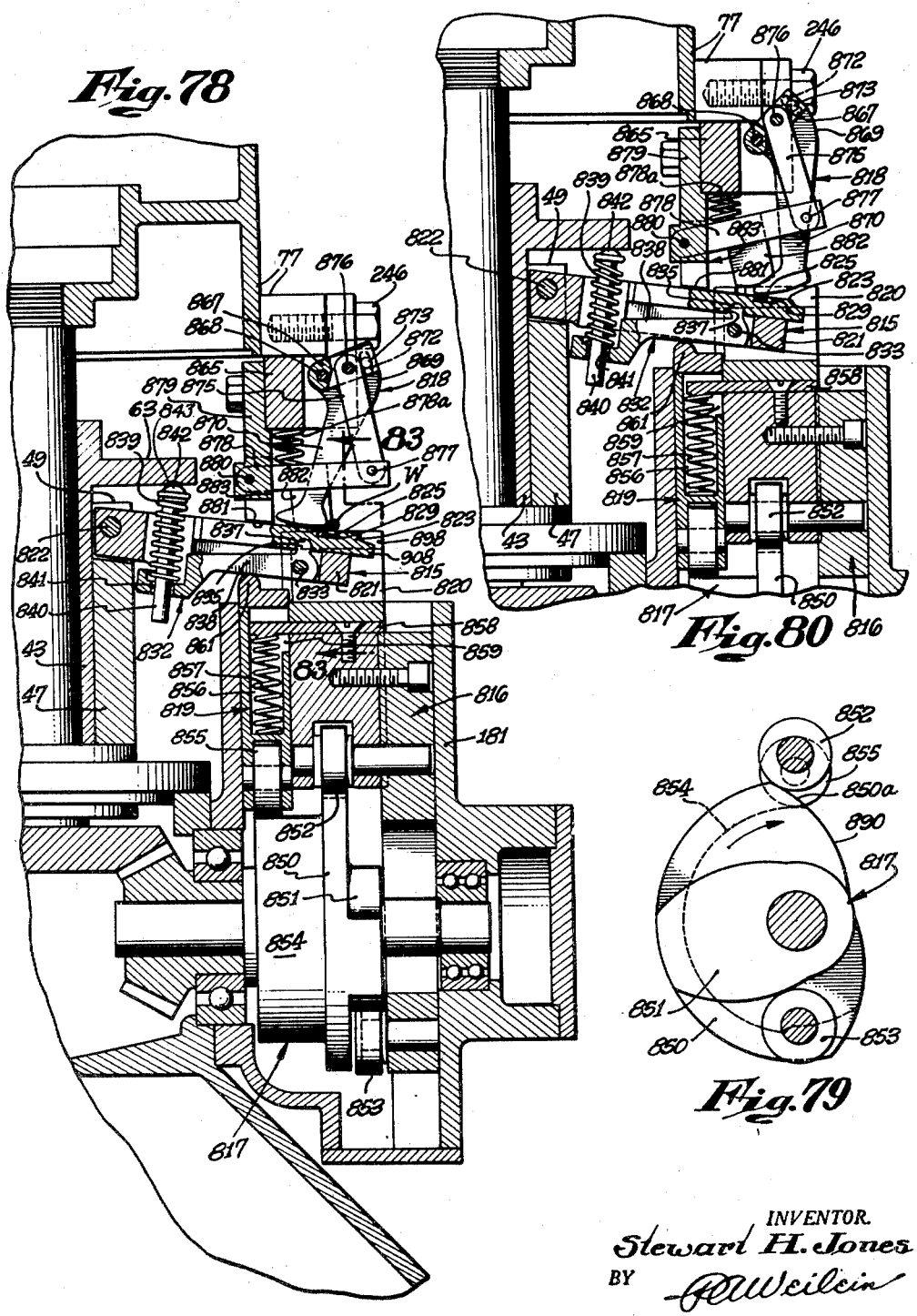

Patented Aug. 1, 1950

2,517,436

UNITED STATES PATENT OFFICE 2,517,436

FORMING METHOD AND APPARATUS

Stewart H. Jones, La Crescenta, Calif., assignor, by mesne assignments, to William Dzus, West Islip, N. Y.

Application March 17, 1944, Serial No. 526,993

47 Claims. (Cl. 140—71)

This invention relates to a forming method and apparatus for practicing the method; more particularly the invention relates to a multiple stage forming press adapted to produce accurately finished articles from wire or other suitable material supplied to the machine in a continuous piece, in a series of successively performed operations constituting one cycle of operation, such cycles being repeated in a continuous manner.

It is an object of this invention to provide an improved method of making articles from wire or light bar stock.

It is another object of this invention to provide a novel method of winding coils.

It is another object of this invention to provide a forming machine wherein the stock to be formed is supplied to the machine in a continuous piece, the machine operating to cut the stock, perform a cycle of operations on each piece of cut stock, and deliver accurately and completely finished articles formed from such stock in a continuous manner.

It is another object of this invention to provide such a machine capable of performing in succession a series of steps on the stock such as forming an offset portion, forming one or more coils from a portion or portions of the stock, and sizing and accurately positioning such coils with respect to each other and to the offset.

It is another object of this invention to provide such a machine wherein the work is caused to advance angularly by increments about an axis, successive forming operations being performed between periods of advance.

It is another object of this invention to provide such a machine wherein the work is caused to advance progressively with respect to a series of forming mechanisms, the advancing means and the operation of the forming devices being co-related to position the stock correctly with respect to a given forming device and to provide a period of dwell while the operation is performed.

It is another object of this invention to provide such a machine having means to support the work for rotation about an axis and a plurality of forming mechanisms angularly spaced about the axis, the work being advanced about said axis so as to be successively positioned to be operated on by the forming mechanisms.

It is another object of this invention to provide such a machine wherein the work is caused to advance progressively with respect to a forming device by yieldable means, to guard against damage to the machine in the event of failure of the forming means or other parts of the mechanism.

It is still another object of this invention to provide a forming machine, wherein the work is caused to advance progressively with respect to a series of forming mechanisms, having an improved means for advancing the work and positioning it for the forming operations.

It is still another object of this invention to provide an indexing or timing mechanism for advancing work by definite angular increments about an axis and for accurately positioning the work and securing it against movement between periods of advance.

It is still another object of this invention to provide an indexing or timing mechanism for advancing work by definite angular increments about an axis and for accurately positioning the work and securing it against movement between periods of advance, wherein the force causing the advance is limited to prevent damage to the machine in the event of jamming or sticking.

It is still another object of this invention to provide an indexing or timing mechanism for advancing work by definite angular increments about an axis and for accurately positioning the work and securing it against movement between periods of advance, wherein an energy storing device is energized between periods of advance by a continuously rotating member, the subsequent rotation of said member releasing said device to cause the work to advance.

It is still another object of this invention to provide indexing or timing mechanism for advancing work by definite increments with respect to a series of forming mechanisms and for accurately positioning the work successively with respect to said forming mechanisms and securing it against movement between periods of advance, wherein a resilient force is utilized to cause the advance and is so arranged that if the advance is prevented by mechanical or frictional failure, the work may be returned to its starting position without disorganization of the functions and operation of the indexing mechanism or the coordination of the indexing mechanism with the forming mechanisms.

It is still another object of this invention to provide improved cutting and feeding mechanism for wire stock or the like.

It is still another object of this invention to provide cutting and feeding mechanism for delivering raw material from continuous stock to a forming machine, in which the cut length of such material may be readily and accurately adjusted.

It is still another object of this invention to provide cutting and feeding mechanism for delivering raw material to a forming machine, such machine including a work holding means for gripping the cut stock intermediate its ends, in which the cut length of such material may be accurately adjusted and the work holder may be caused to grip the work at an accurately predetermined position either substantially exactly equidistant from the ends of the stock, or at a place definitely spaced from such intermediate position.

It is still another object of this invention to provide cutting and feeding mechanism for continuous stock in which the advance of the stock by the feeding mechanism is intermittently halted as a means of determining its length, the cutting operation being performed while the advance of the stock is halted, including means for engaging the stock to prevent undesired advance of the stock due to the resilience or spring of the stock, or other cause.

It is still another object of this invention to provide cutting and feeding mechanism for continuous stock in which the stock is advanced by frictional engagement with the periphery of a continuously revolving feed roll, and means are provided relieving such frictional engagement at predetermined intervals to check the advance of the stock after a desired amount of advance, the cutting means being operated after the advance is halted.

It is still another object of this invention to provide a novel mechanism for holding the work during the forming operations.

It is still another object of this invention to provide in connection with a forming machine, improved mechanism for winding a coil wherein the angular extent of such spring is accurately controlled.

It is still another object of this invention to provide mechanism for winding or coiling the opposite ends of a piece of wire or the like into spiral coils of specified form, and in such manner that the coils have an exact center distance.

It is still another object of this invention to provide in connection with a coil forming mechanism, improved mechanism for cutting surplus material from the coil.

It is still another object of this invention to provide in connection with a machine for forming a spring fastener having an intermediate portion with a coil spring on each end thereof, mechanism for accurately positioning said coils with respect to each other and to the intermediate portion.

It is still another object of this invention to provide in connection with a machine for progressively performing operations on a piece of work, novel means for removing the finished work from the machine.

It is a still further object of this invention to provide a multiple stage forming press performing continuously cycles of successive forming operations involving the cutting and feeding of raw material as the first or loading step and the ejection of the completed article as the last step, the forming operations being performed in successive stages between the first and last steps, wherein the steps of loading and ejecting are performed in a single stage.

It is still another object of this invention to provide a machine of the character described which by slight modifications may be arranged to form articles of different configurations, and characteristics. For example, one or more of the forming stages may be rendered inactive so that the work passes through such stage or stages unchanged thereby, and/or the dies used in one or more of the stages may be replaced by other dies appropriately arranged to form a desirably different article.

It is still another object of this invention to provide, in a machine of the character described, novel work holding mechanism adapted to exert a substantial force on the work piece whereby a frictional grip is formed sufficient to insure against movement of the work in the holding mechanism during the forming operations.

It is still another object of this invention to provide novel means for operating such holding mechanism to released position, whereby to permit the ejectment of a completed work piece by mechanism operated in conjunction with the holding mechanism as well as to permit the loading of the mechanism with a new piece of stock.

This invention possesses many other advantages and has other objects which may be made more easily apparent from a consideration of several embodiments of the invention. For this purpose there are shown a number of forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Figure 13:
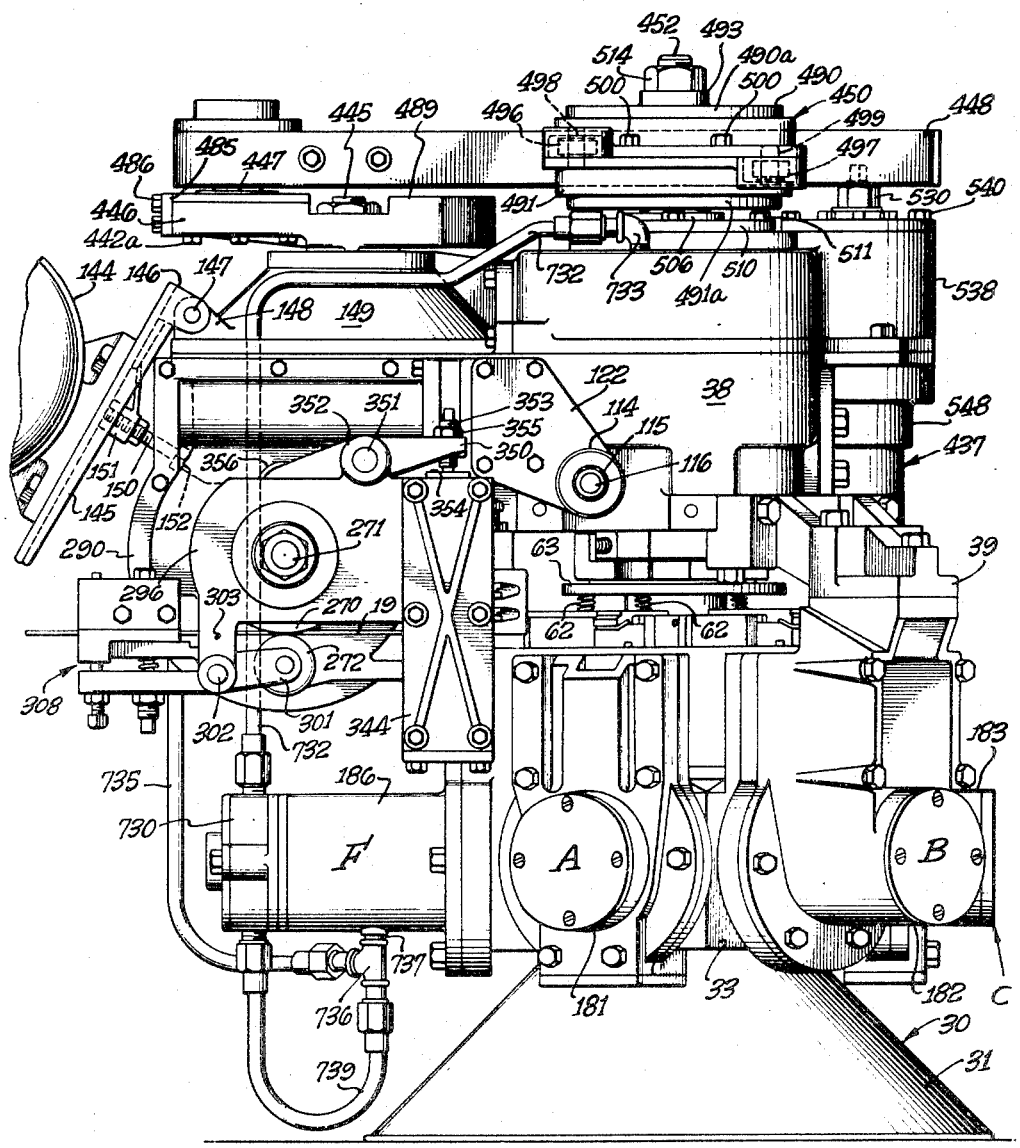
Figure 14:
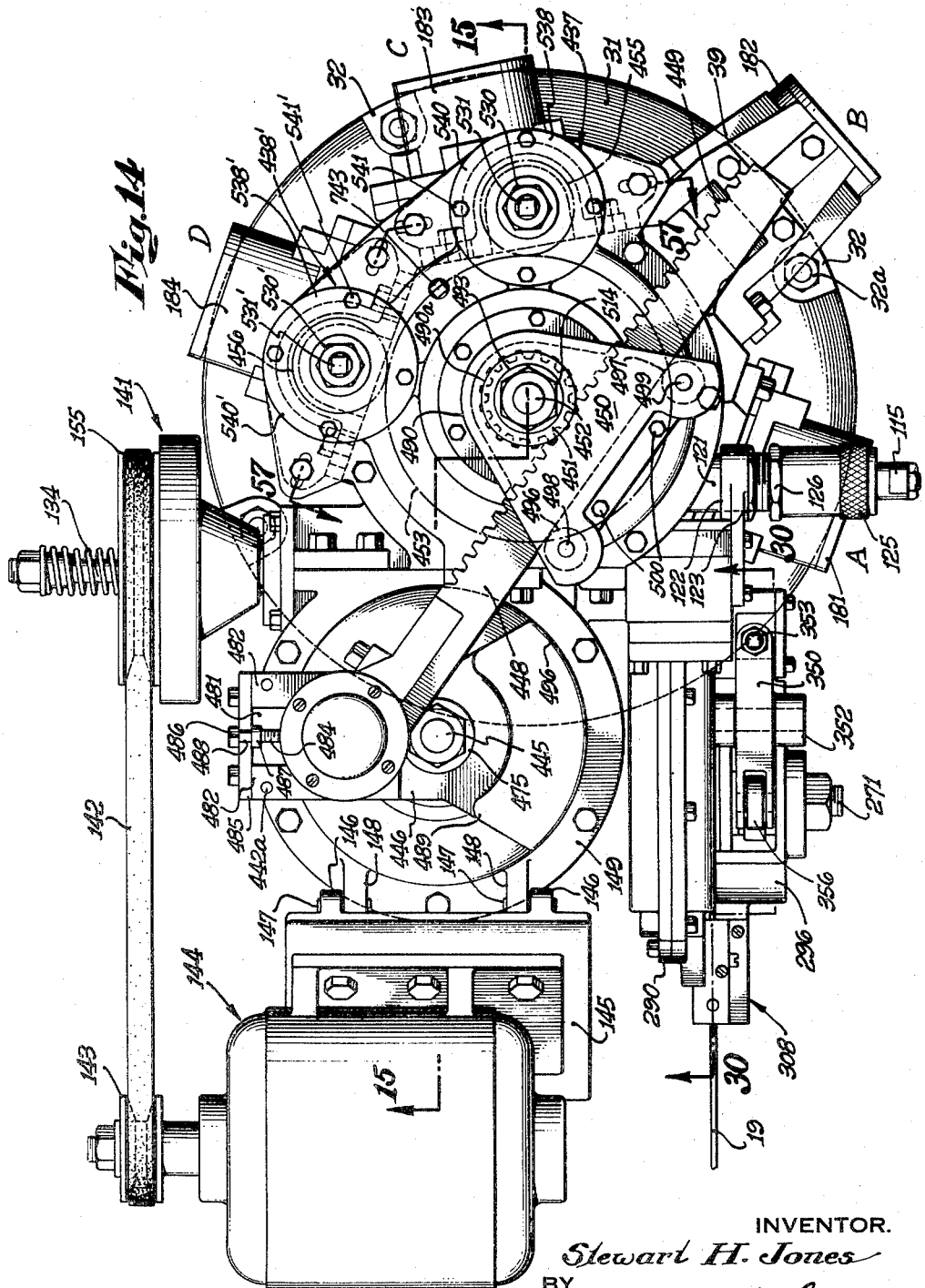
Figure 15:
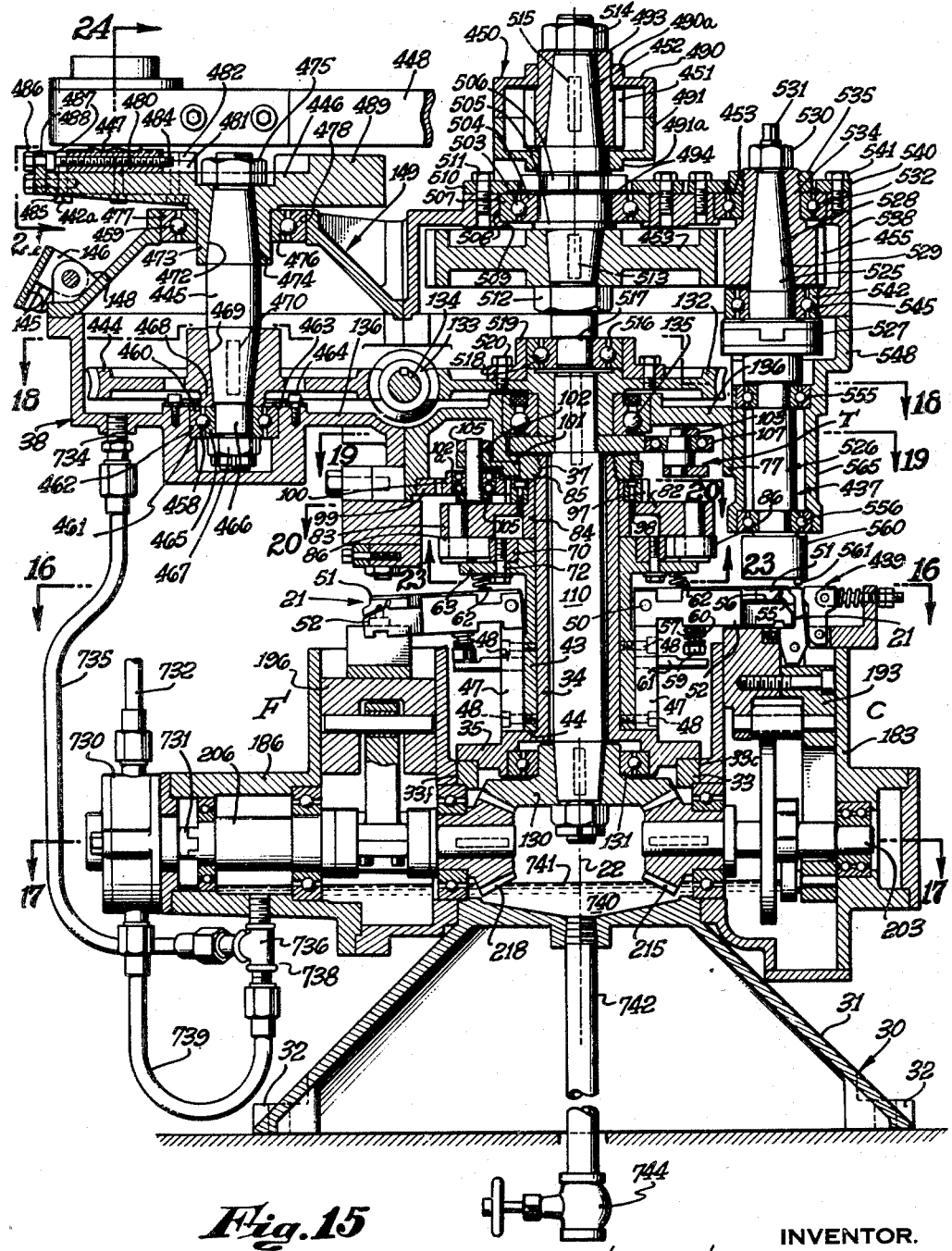
Figure 16:
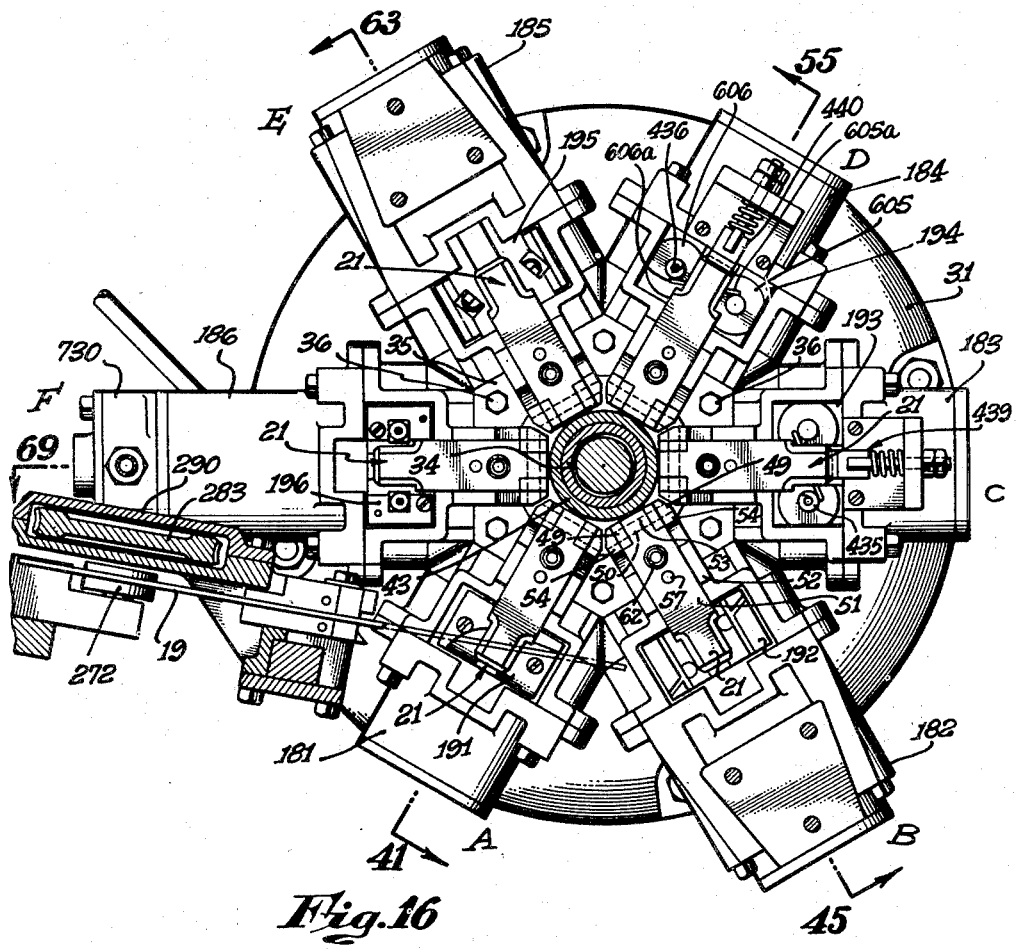
Figure 17:
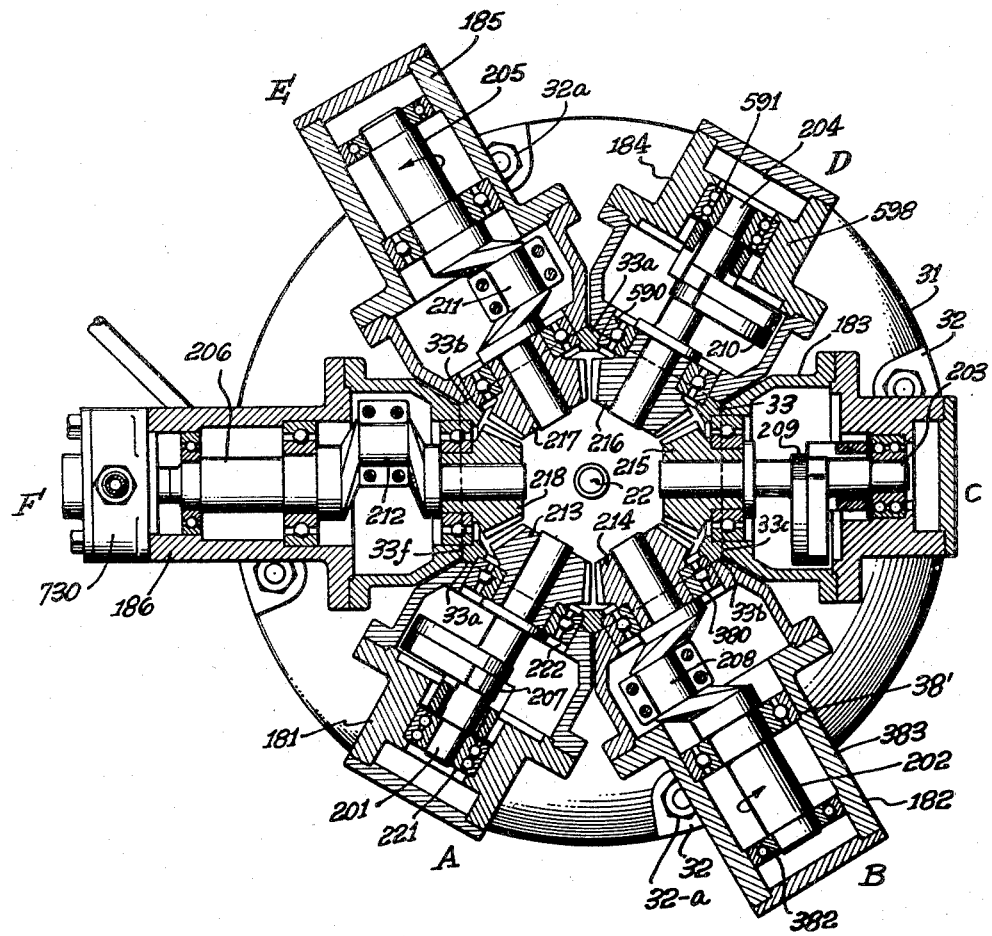
Figures 19, 20:
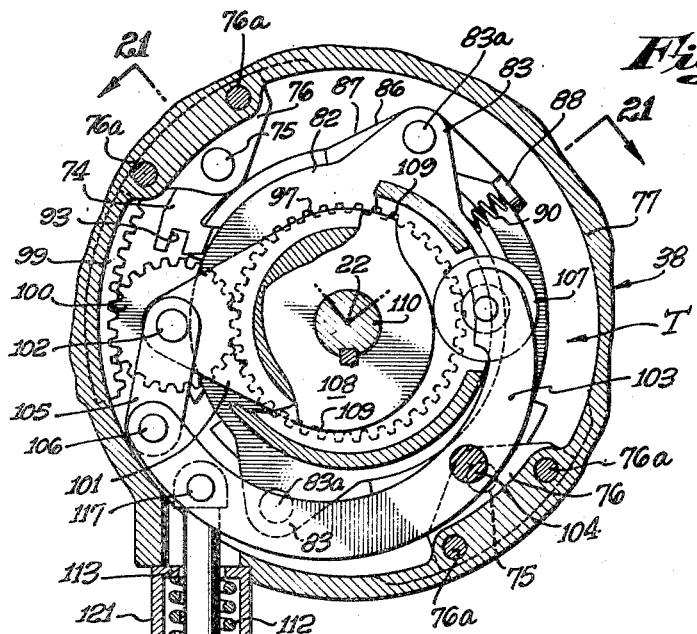
Figure 75:
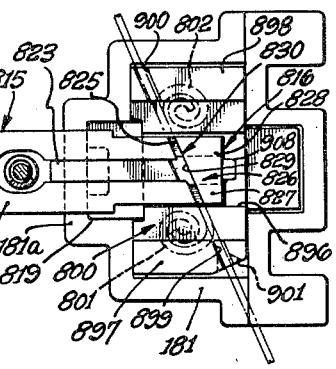
Figure 76:
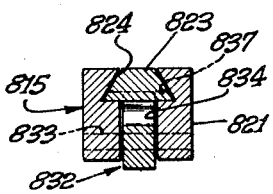
Figure 81:
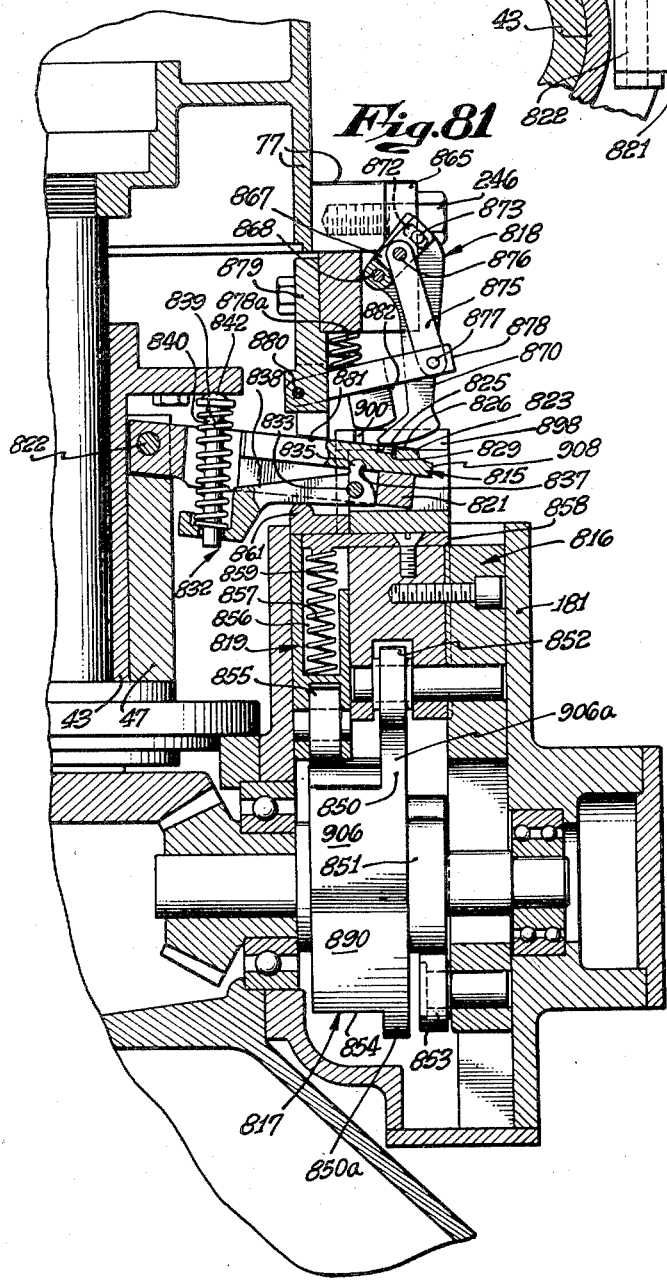
Figure 82:
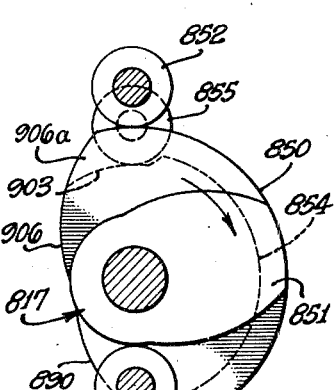

Figures 6 to 12 inclusive are diagrammatic views illustrating the forming steps of the method and apparatus of the invention;

Figure 13 is an elevation of a machine embodying the invention;

Figure 14 is a top plan view on an enlarged scale of the machine of Figure 13;

Figure 15 is a vertical section taken on line 15—15 of Figure 14;

Figures 16, 17 and 18 are cross sections taken on corresponding numbered lines of Figure 15;

Figures 19 and 20 are cross sections on an enlarged scale taken on correspondingly numbered lines of Figure 15;

Figure 21 is a vertical section taken on line 21—21 of Figure 19;

Figure 22 is a fragmentary cross section similar to Figure 20 but showing a different operating position of the parts;

Figure 23 is a cross section on an enlarged scale taken on line 23—23 of Figure 15;

Figure 24 is a detail transverse section taken along line 24—24 of Figure 15;

Figure 25 is a schematic view, broken away in parts, illustrating certain operative features of the machine;

Figures 26 to 29 inclusive are schematic views showing the operation of the mechanism for feeding the material to be formed to the machine and the mechanism for ejecting the finished spring elements;

Figure 30 is a vertical section on an enlarged scale taken on line 30—30 of Figure 14;

Figure 31 is a transverse section taken on line 31—31 of Figure 30;

Figure 32 is a detail section taken on line 32—32 of Figure 30;

Figure 33 is a fragmentary view similar to Figure 30 but showing a different operative position of the parts;

Figure 34 is a transverse section taken on line 34—34 of Figure 30, but showing still another operative position of the parts;

Figures 35 and 36 are detail sections useful in explaining the operation of the feeding mechanism;

Figure 37 is a view similar to Figure 33 but showing a different adjusted position of the parts;

Figure 38 is a view showing the cutting mechanism and taken substantially along line 38—38 of Figure 31;

Figure 39 is a vertical section taken on line 39—39 of Figure 31;

Figure 40 is a transverse section taken on line 40—40 of Figure 39;

Figure 41 is a vertical section on an enlarged scale through the first or loading and ejecting stage of the machine, as indicated by the arrow 41 on Figure 16; the ram being shown for purposes of illustration as substantially at the bottom of its stroke;

Figure 42 is a transverse section taken substantially on line 42—42 of Figure 41;

Figure 43 is a fragmentary section similar to Figure 41, but showing the parts in a different operative position;

Figure 44 is a plan view of certain parts as indicated by line 44—44 of Figure 41;

Figure 45 is a vertical section on an enlarged scale through the second or offset forming stage, as indicated by the arrow 45 on Figure 16, the ram being shown for purposes of illustration as substantially at the top of its stroke;

Figure 46 is a transverse section through Figure 45, taken for purposes of clarity on the staggered line indicated by 46—46 in Figure 48;

Figure 47 is a view similar to Figure 46, but showing the parts in a different operative position;

Figure 48 is a cross section taken on line 48—48 of Figure 47;

Figure 49 is a fragmentary plan view of certain parts taken as indicated by line 49—49 of Figure 47;

Figure 50 is an elevation of the upper part of the mandrel upon which one of the coils is wound, taken as indicated by the arrow marked 50 in Figure 51;

Figures 51 to 54 inclusive are diagrams illustrating the winding procedure for one of the coils;

Figure 55 is a vertical section on an enlarged scale through one of the winding stages in which one of the coils on the spring fastening element is formed; for example, that stage forming the right hand coil on the element, and as indicated by the arrow 55 in Figure 16, the ram for illustrative purposes being shown at the bottom of its stroke;

Figure 56 is a fragmentary section similar to Figure 55, but showing the parts in a different operating position;

Figure 57 is a vertical section taken substantially on line 57—57 of Figure 14;

Figure 58 is a view showing a different adjusted position of one of the elements of Figure 57;

Figure 59 is a detail section taken on line 59—59 of Figure 58;

Figure 60 is a transverse section taken along line 60—60 of Figure 55;

Figure 61 is a transverse section taken along line 61—61 of Figure 55, but showing the parts in a different operating position;

Figure 62 is a detail section taken on line 62—62 of Figure 61;

Figure 63 is a vertical section on an enlarged scale through the trimming stage, as indicated by the arrow 63 in Figure 16, the ram being shown for purposes of illustration as at substantially the bottom of its stroke;

Figure 64 is a transverse section taken on line 64—64 of Figure 63;

Figure 65 is a detail section taken on line 65—65 in Figure 64;

Figure 66 is a fragmentary plan view of certain parts as indicated by line 66—66 in Figure 64, the piece that is being formed being omitted for clarity;

Figure 67 is a view similar to Figure 64 but showing the parts in a different operating position;

Figure 68 is a fragmentary elevation on an enlarged scale illustrating the trimming operation;

Figure 69 is a vertical section on an enlarged scale through the setting stage as indicated by arrow 69 in Figure 16, the ram being shown for illustrative purposes as substantially at the top of its stroke;

Figure 70 is a transverse section taken substantially on line 70—70 of Figure 69;

Figure 70a is a view similar to Figure 70 with the work piece shown in place;

Figure 71 is a view similar to Figure 70 but showing the parts in a different operative relationship;

Figure 72 is a fragmentary plan view of certain parts as indicated by line 72—72 in Figure 70;

Figure 73 is a fragmentary vertical section similar to Figure 41 but showing a modified form of work holder;

Figure 74 is a transverse section taken substantially on line 74—74 of Figure 73;

Figure 75 is a plan view as indicated by line 75—75 of Figure 73;

Figure 76 is a detail cross section taken on line 76—76 of Figure 73;

Figure 77 is a bottom plan view of the ejecting mechanism taken on line 77—77 of Figure 73;

Figure 78 is a view similar to Figure 73 showing the parts in a different operating position;

Figure 79 is a diagrammatic showing of the position of the operating cam of Figure 78;

Figures 80 and 81 are fragmentary sections similar to Figure 73, showing other operating positions of the parts;

Figure 82 is a diagram showing the position of the operating cam of Figure 81; and Figure 83 is a fragmentary section taken on line 83—83 of Figure 78.

The invention contemplates a forming machine having a plurality of mechanisms arranged in stages for performing in sequence a series of forming operations on a piece of work, which is advanced in a step by step manner so as to be properly positioned to be operated on by the successive mechanisms. For this purpose, the work is supported for movement by definite angular increments about a fixed axis, the forming mechanisms being arranged about this axis. To assure proper positioning of the work for the forming operations, a timing mechanism is provided for advancing the work and holding it fixed between periods of advance, this timing mechanism being arranged to operate synchronously with the forming mechanisms.

For example, the forming mechanisms may be arranged in a desired order to wind a portion of the work piece to form a spring, to press the work piece to a desired configuration, to cut it to an exact size, to perform sizing operations to dimension the work to close tolerances, and to perform other operations dependent upon the design of the finished piece.

To permit operation of the machine in a continuous manner for quantity production, mechanism is provided for feeding the stock or pieces which are to be formed to the machine, and mechanism is provided for ejecting the finished pieces, such feeding and ejecting mechanisms being operated in synchronism with the advancing and forming mechanisms.

Figure 1:
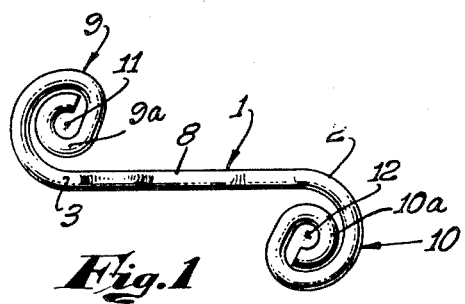
Figure 1 is a plan view of a spring fastening element made in accordance with the method of, and by the apparatus of, the invention.
Figure 3:
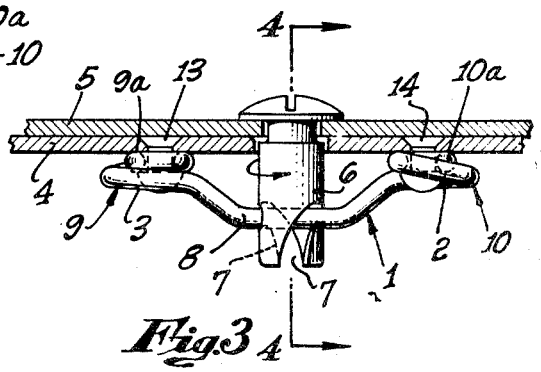
Figure 3 is a sectional view through a pair of elements secured by fastening means utilizing the spring element of Figure 1.
Figure 2:
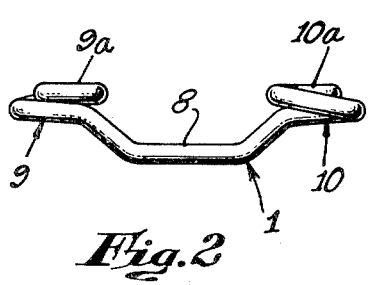
Figure 2 is a side elevation of the element shown in Figure 1.
Figure 4:
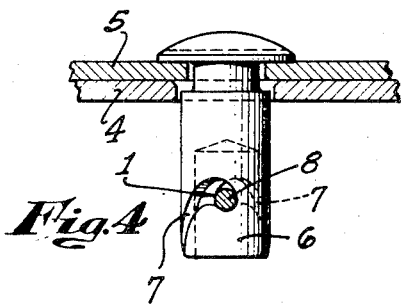
Figure 4 is a section on an enlarged scale taken on line 4—4 of Figure 3.

By way of example, an article is shown in Figures 1 and 2 which is adapted to be formed in accordance with the method of the invention, and apparatus for forming the article will be described in detail. The article 1 constitutes one element of a spring fastening device extensively used in the aircraft industry, this device being illustrated in Figures 3 and 4. As shown in these figures, the article or spring 1 is secured at its opposite ends 2 and 3 to one of the members, such as the plate 4, which it is desired to secure to a second member or plate 5, to which is attached a rotatable tubular element or post 6. The post 6 has opposed cam surfaces 7 formed by steeply inclined helical slots in its wall adapted to engage the central portion 8 of the spring member 1. The elements 4 and 5 are shown as locked together. However, by turning the post 6 counterclockwise from the position of Figure 3, as indicated by the arrow, about one quarter turn, the member 1 may be withdrawn from the slot 7 and plates 4 and 5 separated. A fastening device of this character is described and claimed in a patent granted to William Dzus on April 24, 1934, entitled "Fastening Device" and bearing Number 1,955,740.

It will be apparent that to function in this manner, the member 1 must be resilient and accordingly it may be conveniently formed of spring wire. Furthermore, to increase such resilience, small coils 9 and 10, which function as springs, are formed at the opposite ends of the member 1, terminating in eyes or loops 11 and 12 for receiving rivets or screws 13 and 14 by which the member 1 is secured to the plate 4. The central part 8 may be offset or formed as a bow to act as a truss to transmit the locking force exerted by the element 6 to the coils 9 and 10 and prevent excessive lateral flexure of the central part of the member 1.

It is necessary that the fastener element 1 be accurately formed. Thus, the center distance between the eyes 11 and 12 must closely agree with that of the holes in the plate 4 for the elements 13 and 14, to promote ease of assembly as well as to avoid straining or deforming the plate 4 and/or the coiled springs 9 and 10. Further, the height of the member 1 between the central offset portion 8 and the face of eyes 11 and 12 must be held within close limits to assure that when the member 1 is mounted on the plate 4, the central portion 8 will be at a suitable height for cooperation with the cam surfaces 7 to properly stress the member 1 when the post 6 is turned to locked position.

Furthermore, it is essential that the coils 9 and 10 have their convolutions arranged to provide flat seats 9—a and 10—a of considerable angular extent, in this case approximately 270° from the free ends of the coils, to provide a substantial seat for the element when it is mounted on the plate 4 so that it will be secure against any tendency to tip or rock.

The steps for forming the article 1 are illustrated diagrammatically in Figures 6 to 12 inclusive. These figures are diagrammatic views taken generally in the plane of movement of the work or article between successive forming stages. Each figure includes one or more projected views at right angles to such plane illustrating the work piece as it appears after performance of the operation of that particular stage illustrated. To facilitate an understanding of the method, the figures have been drawn as for an initial or first cycle of operations. The successive positions of the initial work piece and holding means therefor, illustrated in Figure 6, being shown in this and subsequent figures by full lines, the succeeding work pieces and the other of the holding means being shown in broken lines.

Referring to Figure 6, an appropriate length of spring wire or stock 20 is fed by axial movement of the stock to the gripping means or work holder 21, which is caused to grip the stock substantially midway of its length. This work holder 21 is one of a series of six such work holders, the other work holders being indicated as 21—a, 21—b, 21—c, 21—d and 21—e, all mounted for simultaneous rotation about an axis 22. Since in making the particular article under consideration, a comparatively light stock is used, it is convenient to feed the stock from a roll or continuous length thereof, appropriate means being provided to sever the wire after an appropriate length has been fed to each work holder 21 and thus form work pieces W.

After the work piece W has been gripped by the work holder 21, all of the work holders are advanced about one-sixth of a turn in a counterclockwise direction about the axis 22 to the position of Figure 7 where a pressing operation forces both end portions of the work piece W upwardly to form the offset or bow 8 of the finished article. This angular movement serves to position the next work holder 21—a in loading position, and additional stock to form another work piece 20—a is supplied to it. After these loading and pressing operations which occur substantially simultaneously, the work holders are all advanced another 60°, more or less, to the position of Figure 8 where one end of the work piece W is wound to form one of the coil springs as 9 of the finished article 1. Simultaneously, the previously described pressing operation is performed on the work piece 20—a, while a third work piece 20—b is supplied to the work holder 21—b. Another 60° advance positions the work piece W in the position of Figure 9 for the winding of the other coil 10; as well as positioning the work piece 20—a for the winding of the coil 9 thereon, work piece 20—b for the forming of the bow 8 and work holder 21—c for reception of a fourth work piece 20—c. These operations all proceed substantially simultaneously after arrival or indexing of the work holders to proper position.

Another advance of 60° now positions the work piece W in the position of Figure 10, where the surplus material is cut from the free end of each of the coils 9 and 10, the succeeding piece 20—a having the second coil 10 formed thereon, piece 20—b having the coil 9 formed thereon, piece 20—c having the bow 8 formed therein, and piece 20—d being loaded into holding means 21—d. A further 60° advance indexes the work piece W, to the position shown in Figure 11 for a setting and sizing operation, which involves adjusting the center distance between the eyes 11 and 12 on the end of the springs 9 and 10 to a predetermined amount and compressing the coils 9 and 10 to provide an adequate seat 9—a and 10—a thereon respectively. The following pieces 20—a, 20—b, 20—c and 20—d are all subjected to forming steps in accordance with those just pointed out, the work holder 21—e being loaded with a sixth work piece 20—e.

The next 60° advance serves to return the holding means 21 to its initial position (see Figure 12), wherein mechanism operates to release the holding means and eject the finished work piece W which now forms the finished article 1, thus completing the cycle of operations with respect to the initial work piece 20. Holding means 21 is now in condition to be reloaded and start another cycle of operations and it is to be understood that the ejection of the finished article and the loading of the next work piece together constitute but one stage of operation, corresponding to any one of the other described forming operations.

It will be apparent that these operations are but steps in a continuous process wherein the work pieces are fed to the apparatus, successively formed and otherwise operated upon, and delivered as finished articles, and as such is capable of operation at a rapid rate. For rapid operation it is of course essential that the forming and other operations on the work be performed expeditiously. Further, the cyclic advance of the work from one stage to the next must be rapid and accurate to insure proper positioning of the work for the various steps, and this advance must be closely synchronized with the operation of the forming mechanism. Further, to guard against possible damage to the machine in case of failure of any of the parts it is preferable that positive mechanical connections to the advancing mechanism be avoided. Thus, in the event of failure or jamming of the forming apparatus of any stage, the work will not be forced positively to advance with likelihood of injury to the machine. For this purpose a novel timing or indexing apparatus has been devised, wherein stored energy of a limited predetermined amount is released in synchronism with the operation of the forming mechanisms to advance the work, and means are included for accurately positioning the work with respect to the forming mechanisms at the end of each advance.

Before proceeding with a description of the work holders 21, and the means for angularly advancing them, a brief description of the machine as a whole is in order. For this purpose, particular reference should be had to Figures 13, 14, 15, 16, 17 and 18. Referring particularly to Figure 15, it will be seen that the machine is a unitary structure, all parts being assembled on a main frame 30. This frame 30 includes a generally conical, hollow base 31 adapted for mounting on a suitable support or foundation, ears 32 being provided for the reception of hold down bolts 32—a. The base 31 is provided with a six sided upper extension 33 to which portions of the mechanisms constituting the six forming stages are secured in angularly spaced relation about the axis 22 around which the work advances.

Referring to Figure 16, that mechanism which performs the initial operation constituting the first stage is indicated by A, and as before explained, this stage also includes mechanism for ejecting the finished article from the machine. The mechanisms of the succeeding stages for performing the additional operations on the work piece are indicated in order by the letters B, C, D, E and F. These will hereinafter be described in detail. Mounted on top of the extension 33 is a cylindrical column like member 34, having an axis coincident with the axis 22 and having a lower flange 35 which serves to secure the member 34 to the base extension 33 as by a number of bolts 36 (Figure 16). Secured to the upper end of the column 34 as by a threaded connection 37 is a gear case 38 enclosing gearing for operating the machine. This gearing as well as the enclosing case will be described in detail in due course; at the present time it suffices to say that the gear case 38 is divided into suitable sections for ready fabrication and assembly and is additionally supported by brackets 39 and 40 secured to suitable extensions respectively on the housings of the forming mechanisms B and E. In this connection see also Figures 13, 45 and 63.

A sleeve 43 rotatably engages the exterior of the column 34, the weight of the sleeve and attached parts being supported on a finished hub 44 on the flange 35. The work holders 21 are attached to the sleeve 43 to rotate therewith and hence rotate about the axis 22. The work holders 21 appear in many different figures of the drawings, but since they are all identical only one of them will be described, attention being directed to Figures 15, 16, 41, 42, 43 and 44 for this purpose.

The lower part of the sleeve 43 has a plurality of fulcrum blocks 47 firmly secured thereto as by screws 48. Each block 47 has a pair of upwardly extending ears 49 carrying a fulcrum pin 50, which in turn carries the work holder or gripping device 21. Each work holder 21 comprises an upper and a lower gripping finger 51 and 52 mounted for independent pivotal movement about the pin 50 as by having ears 53 and 54 respectively at their inner ends engaging the pin 50. Adjacent the outer end of the upper finger 51, a groove 55 is formed in the lower surface of the finger for receiving the work piece and clamping it against the upper surface 56 of the lower finger 52. For this purpose the groove 55 is made slightly less in depth than the thickness of the material to be handled. Furthermore, means are provided for resiliently urging the fingers 51 and 52 together. Thus, a headed pin 57 is threaded into the upper finger 51, passing through a clearance hole 58 in the lower finger 52, and a compression spring 60 is confined between the head 59 of the pin 57 and the underside of the finger 52. A stop pin 61 carried by the block 47, by engaging the head 59, serves to limit downward movement of the fingers 51 and 52, while a spring 62 confined between the upper side of the finger 51 and the flange 63 formed integrally with the sleeve 43, resiliently maintains the fingers in their lowermost position. This is the position of the fingers during movement between forming stages; during a forming operation, the upwardly moving element of the forming means engages the end portions of the work piece W on either side of the work holder 21 and exerts an upward pressure moving the work holder 21 upwardly against the force of the spring 62 to bring the said end portions of the work piece W into engagement with the stationary element of the forming means. After the forming operation has been completed, this upward pressure is released, allowing the work holder 21 to drop to its initial position. The means for causing this movement will be more fully described in connection with the various forming stages. This pivotal movement of the work holder 21 about the pin 50 serves to insure ample clearance for the work piece W as well as the work holder 21 as they enter and leave the forming stages.

The indexing and timing mechanism T for advancing the work by definite angular increments to, and holding it in, a predetermined position with respect to the forming mechanism, while such mechanism performs the forming operation, will now be described, reference being had to Figures 15, 18, 19, 20, 21, 22 and 23.

Referring particularly to Figures 15, 20, and 22, a latch ring 70 is shown, having a plurality of latch recesses 71 equiangularly spaced about its periphery and corresponding in number to the number of forming stages A, B, C, etc., and work holding means 21, in this case six. The ring 70 is attached to the sleeve 43 in any convenient manner, as for example by being secured to the upper surface of the flange 63 by a plurality of cap screws 72. To permit relative angular adjustment of the sleeve 43 and the ring 70, the holes 73 in the flange 63 for bolts 72 are slotted as shown in Figure 23. The purpose of this will appear presently. One or more latching dogs 74 are provided for cooperating with the recesses 71 for holding the ring 70 together with the sleeve 43 against angular movement about the axis 22. To provide a balanced construction, it is preferred to provide a pair of dogs 74 for simultaneously engaging diametrically opposite recesses 71. Each of the dogs 74 is pivotally mounted on a pin 75 suitably secured in a bracket 76 attached as by bolts 76a to a depending flange 77 of the gear housing 36. A torsion spring 79 is provided for each dog 74, one end of the spring being attached to the dog 74, the other end engaging one of the bolts 76a, to urge the dog 74 into latching engagement with any appropriate recess 71. It will be apparent that the latches 74 will serve to hold the ring 70 and the sleeve 43 in a definite angular position about the axis 22, and that the angular position in which the sleeve 43 is held may be altered by loosening the bolts 72 and adjusting the flange 63 and the sleeve 43 with respect to the ring 70, such adjustment being made possible by the slotted holes 73.

As a means of imparting angular movement to the sleeve 43, a spider 82, having oppositely extending arms 83, is rotatably supported on the column 34 by a hub 84 which is axially confined between the upper end of the sleeve 43 and the boss 85 on the gear case 36 which threadedly connects the gear case to the column 34 at 37, (see Figure 21). Pivotally secured to each of the arms 83 as at 83a, is a ratchet dog 86, which as best shown in Figures 20 and 22, has a forward extension 87 adapted to engage one of the recesses 71 and a rearward extension or tail 88. A compression spring 90 is confined between the bottom of a suitable recess 91 in the spider 82 and the tail 88 of the ratchet dog 86, and acts to urge the dog 86 counterclockwise about its pivot 83a so that the tip of the extension 87 is maintained against the periphery of the ring 70 or urged into one of the recesses 71. It will be apparent that movement of the spider 82 counterclockwise about the axis 22 will be imparted to the ring 70 and connected parts, due to the engagement of the dogs 86 with the notches 71 under the influence of the springs 90; whereas movement of the spider 82 in a clockwise direction will cause the extension 87 of the dogs 86 to ride up out of notches 71 onto the periphery of the ring 70, causing the tail 88 to approach the ring 70 and compress the spring 90.

As it is desired to advance the ring 70 and connected parts by angular increments, the spider 82 is given an oscillatory movement about the axis 22 corresponding in extent to the desired movement of the ring 70 and in the instant case equal to the angular separation of successive notches 71. All parts are shown in Figure 20 in the relative positions they occupy at the end of such an advancing movement, that is, locking dogs 74 are shown as having engaged the notches 71, holding the ring 70 against movement in either direction. Movement of the spider 82 from this position is in a direction opposite to the direction of advance of the ring 70, or clockwise. The ring 70 being held against movement, such clockwise movement of the spider 82 will cause the extensions 87 of the dogs 86 to ride up out of notches 71 onto the periphery of the ring 70, swinging the dogs about their pivots and causing the tails 88 to approach the ring 70 and compress the springs 90. A slot 93 is provided in the end of each latching dog 74, so positioned as to be engaged by the tail 88 of the cooperating dog 86 near the extremity of its retrograde or clockwise movement. As previously mentioned, the oscillatory movement of the spider 82 is equal in angular extent to the spacing of the notches 71. The dog 86 is so proportioned that the tail 88 engages the slot 93 before the end of the retrograde movement and before the extension 87 engages the adjacent notch 71 (see Figure 22). Thus, further retrograde movement permits the extension 87 to engage the notch 71, the resulting rotation of the dog 86 about its pivotal support on the arm 83 in response to the spring 90, which overcomes torsion spring 79, causing the tail 88 to swing the locking dog 74 up out of engagement with the notch 71. This releases the ring 70 so that it is free to advance in response to the ensuing advance of the spider 82. The parts are so proportioned that the dog 74 is not released by the tail 88 until the ring 70 has moved sufficiently to bring the peripheral surface of the ring under the dog 74 to prevent its reentry into the notch 71 in response to the spring 79. The ring 70 may now be advanced, the dog 74 riding on its periphery until at the end of the predetermined angular advance, the next notch 71 is engaged by the dog 74, when all parts of the indexing mechanism are again in the position of Figure 20, the ring 70 being locked against movement.

The mechanism for imparting the oscillatory movement to the spider 82 includes an energy storing device for imparting the movement to the spider which causes advance of the ring 70, the sleeve 43 and the work holding means 21 so that a positive mechanical connection between the parts to be advanced and the prime mover for the machine is avoided. In this way the force advancing the work holders and connected parts is restricted, so that in case any jamming of the machine occurs such as due to failure of any of the forming mechanisms or other causes, the work merely fails to advance. Thus, danger of extensive damage to the machine such as would be apt to occur if the work was positively advanced is avoided. This mechanism will now be described.

A spur gear 97 is secured on the upper side of the spider 82 as by screws 98, and a sector 99 of an internal gear is fixedly mounted coaxially therewith on the skirt 77 (see Figures 19 and 21). A pinion 100 meshing with the gear 97 and the sector 99, is rotatably mounted on an arm 101 by a pin 102, a suitable anti-friction bearing 102—a being interposed between the pin and the pinion 100, the arm 101 in turn being rotatable about the axis 22 of the assembly as by being mounted on the boss 85 of the gear case 38 (see Figures 15, 19 and 21). It will be apparent that movement of the arm 101 about the axis 22 will cause the pinion 100 to roll along the fixed sector 99, which in turn will cause the gear 97 to revolve. This forms a convenient motion multiplying arrangement, whereby a small angular movement of the arm 101 suffices to cause greater angular movement of the gear 97. Means are provided for imparting appropriate angular movement to the arm 101 to cause the spider 82 to have oscillatory motion of the desired extent.

For this purpose a lever 103 is pivotally supported intermediate its ends on the lower wall of the gear case 38, as by pin 104. One end of the lever 103 is connected to the arm 101 as by links 105. The links 105 are pivotally attached to the lever 103 as by a pin 106, and are likewise pivotally joined to the arm 101 as by the pin 102 which carries the pinion 100. The other end of the lever 103 has a roller 107 which may comprise an anti-friction bearing mounted thereon, which roller acts as a cam follower for a cam 108, having a pair of similar, diametrically opposite lobes 109 mounted for rotation about the axis 22 as by being keyed on the shaft 110. Rotation of the shaft 110 will cause the lobes 109 to engage the cam follower 107, swinging the lever 103 about its pivot 104, to move the pinion 100 in a clockwise direction about the axis 22, the engagement of the pinion 100 with the gear sector 99 causing the pinion to rotate about its axis and thus rotate the gear 97 in a clockwise direction. Thus, the movement imparted to the spider 82 by the lever 103 is substantially greater than the movement of the lever 103. This movement of the spider 82 corresponds to the retrograde movement previously mentioned. For maintaining the cam follower 107 in contact with the surface of the cam 108 at all times, and providing return movement of the lever 103 and pinion 100, which movement in turn causes the advancing movement of the gear 97, spider 82, sleeve 43, and work holders 21, a compression spring 112 is provided (Figure 19). The spring 112 is confined between the bottom 113 of a tubular housing 114 enclosing the spring, and an adjustable abutment 115 threaded on the outer end of a rod 116 passing axially through the spring. This rod 116 is joined to the lever 103 at a point adjacent the pin 106 by a pin 117.

The force exerted by the spring 112 may be altered by adjusting the position of the abutment 115 on the rod 116; furthermore, means are provided for adjusting the angular movement of the arm 101 and hence of the ring 70 and connected parts in response to the rotation of the cam 108. This means acts to limit the return movement of the cam follower 107, so that it is stopped at a desired distance above the low point of the cam 108 and comprises an adjustable stop 120 formed in conjunction with the housing 121 for limiting movement of the abutment 115 in response to the spring 112.

The main portion 121 of the housing 114 which includes the bottom 113, is fixed with respect to the skirt 77 and other stationary parts of the structure as by being threadedly secured in a bracket 122, suitably attached to the gear case 38, a lock nut 123 being provided to secure the housing against accidental displacement. The stop 120 is formed by an inwardly projecting flange 124 in a tubular member 125 threaded on the main portion 121 of the housing 114. A lock nut 126 serves to secure the member 125 in adjusted position. It will be apparent that axial adjustment of the stop 120 alters the amount of outward movement of the rod 116 in response to the force of the spring 112 and hence the distance through which the lever 103, pinion 100 and connected parts move after release by the high point of the cam 108.

The shaft 110 constitutes the main driving shaft of the machine, its axis coinciding with the axis 22. The shaft 110 extends through the column 34 and beyond the ends thereof. At its lower end it carries a bevel gear 130 for driving the forming mechanisms as will be hereinafter explained, and is rotatably supported by an anti-friction bearing 131 mounted in the flange 35 of the column 34. At its upper end the shaft 110 carries a worm gear 132 driven by a worm 133 carried on a power or jack shaft 134 (see Figures 15 and 18). An anti-friction bearing 135 suitably secured to the hub 132—a of the gear 132 and mounted in the lower wall 136 of the gear case 38 serves to radially guide the upper end of the shaft 110, as well as to axially support the shaft (see Figure 21).

As best shown in Figure 18, the jack shaft 134 extends transversely of the gear case 38, and is supported in the opposite walls of the casing 38 by anti-friction bearings 137 and 138. The shaft 134 has an extension 139 projecting out of the casing 38, a suitable oil seal 140 being provided to prevent leakage of lubricant from the gear case 38 along the shaft. A pulley structure 141 is mounted on the extension 139 of the shaft 134 for driving the shaft. The pulley 141 is connected by a belt 142 to a driving pulley 143 mounted on the shaft of the driving motor 144 (see Figure 14). Motor 144 is secured to a platform 145 having ears 146 on opposite sides adjacent one end thereof engaged by pins 147 passing through cooperating ears 148 formed on the cover member 149 of the gear case 38 (see Figure 13). The arrangement is such that the motor 144 and the platform 145 tend to swing downwardly about the pin 147, this downward movement being prevented by a strut 150 threaded into a suitable boss 151 on the platform 145 and abutting the main frame work of the machine at 152. By screwing the strut 150 into or out of the boss 151, the inclination of the platform 145 may be altered, which serves to adjust the center distance between the pulleys 141 and 143 and hence varies the tension in the belt 142.

As a precautionary measure to prevent damage to the machine in the event of derangement or jamming of the forming mechanism or other parts, the pulley structure 141 is arranged to include a friction connection by which the belt 142 drives the shaft 134 (see Fig. 18). Thus, in event of an excessive load being applied to the shaft 134 as by failure of a forming mechanism, or other causes, the shaft 134 and all parts driven thereby will stop, the belt and motor continuing in operation. For this purpose the pulley structure 141 is shown as including a pulley member 155 engaged by the belt 142 and having a cup like extension 156 mounted on the outer race 157 of an anti-friction bearing 158. The inner race 159 of the bearing 158 is slideably mounted on the extension 139 of the shaft 134. Thus, the pulley member 155 is freely rotatable as well as axially slideable on the shaft extension 139. The pulley member 155 is provided with a friction face 160 adapted to engage a cooperating face 161 formed of suitable facing material 162 on a clutch member 163 which is fixed on the shaft extension 139 to rotate therewith. The shaft extension 139 has an adjustable abutment 164 threaded thereon, a compression spring 165 being confined between the abutment 164 and the inner bearing race 159, suitable supporting sleeves 166 and 167 being provided for maintaining the spring coaxial with the shaft. The spring 165 urges the pulley member 155 axially of the shaft extension 139 toward the clutch member 163, causing surfaces 160 and 161 to frictionally engage. If the load on the shaft and the member 163 becomes too great, slippage between the surfaces 160 and 161 occurs, allowing the pulley member 155 to continue rotating and preventing overloading of the motor 144 and the belt 142. The amount of power which can be transmitted between the members 155 and 163 can be adjusted by altering the position of the abutment 164, to vary the force exerted by the spring 165 urging the surfaces 160 and 161 into engagement. To provide for momentary increases in the power requirements of the forming mechanisms due to the forming operations and to improve the operation of the machine as a whole, the clutch member 163 may be provided with a weighted rim 168 to act as a flywheel.

As previously mentioned, the forming stages A, B, C, etc., are mounted on the main frame 30 by being attached to the extension 33 of the base 31, which extension is provided with a plurality of vertical faces 33—a, 33—b, 33—c, etc., one for each stage forming mechanism. Since in the present case there are six forming stages, the extension 33 has a hexagonal cross section, the mechanisms constituting the forming stages being respectively secured to faces 33—a, 33—b, etc. Since the mechanisms of these several stages are in many respects similar, a brief general discussion of these mechanisms before taking them up in detail is believed in order.

Thus, the mechanisms A, B, C, D, E and F include casings or housings 181, 182, 183, 184, 185 and 186 respectively, which are attached respectively to faces 33—a, 33—b, 33—c, 33—d, 33—e and 33—f of the frame extension 33 (see Figures 15 and 17). In these casings are rams or plungers 191, 192, 193, 194, 195, and 196, respectively, mounted for reciprocating movement in a generally vertical direction (see Figures 16, 41, 45, 55, 63 and 69). Each ram carries a die adapted to cooperate with a die supported on the machine frame to perform a forming operation on the work piece W in the particular work holder 21 which is indexed to forming position with respect to the forming mechanism by the previously described timing or indexing mechanism. In some stages, the die on the frame includes moving elements.

As a means of reciprocating the rams 191, 192, etc., housings 181, 182, etc. are arranged to rotatably support respectively therein shafts 201, 202, 203, 204, 205 and 206. Each of the shafts 201, 202 etc., has means as 207, 208, 209, 210, 211 and 212 forming an offset portion, which by appropriate connection with the respective plungers 191, 192, etc., serves to reciprocate the plunger in response to rotation of the shaft. According to the characteristics of the reciprocating motion it is desired to impart to the associated plunger, some of these offsets, such as those indicated by numerals 207, 209 and 210 may be in the form of appropriately contoured cams, while the other offset portions indicated by numerals 208, 211 and 212 may be plain cranks. The shafts 201, 202, etc., project generally radially from the axis 22 and the shaft 110, the inner ends of the shafts 201, 202, etc., having pinions 213, 214, 215, 216, 217 and 218 respectively appropriately secured thereon as by keys. These pinions 213, 214, etc., all mesh with the gear 130 carried by the shaft 110. Thus, rotation of the shaft 110 serves to simultaneously rotate all of the shafts 201, 202, etc., thereby causing reciprocation of the plungers 191, 192, etc. As previously described, rotation of the shaft 110 also serves to advance the work holders 21 by angular increments by means of the timing or indexing mechanism T about the axis 22. Hence, it will be apparent that by appropriate arrangement of the offsets 207, 208, etc. and of associated parts, the motion of each of the plungers 191, 192, etc., will be appropriately synchronized at all times with the advance of the work holders 21, so that the work holders will be properly positioned in time for the forming operations by the plungers.

FEEDING AND CUTTING MECHANISM AND EJECTING MECHANISM

*Stage A*

The mechanism for feeding the raw material or stock 20 to the machine and for cutting it to appropriate lengths W which is comprised in the first forming stage previously denominated as A will now be described. The mechanism which ejects the finished pieces is also included in this stage and hence will be described at this time. In this connection attention is invited to Figures 13, 14, 16, 18, and 26 to 44 inclusive.

Referring particularly to Figures 41 and 42, the shaft 201 is shown as rotatably supported in the casing 181 by anti-friction bearings 221 and 222. The offset 207 comprises a pair of axially adjacent cams 223 and 224 which may be formed integrally with the shaft 201. The cam 223 engages a cam following roller 225 rotatably supported above the cam on the ram 191 by a pin 226. The cam 224 engages a cam following the roller 227 rotatably supported below the cam by a pin 228 in a yoke 229 depending from the ram 191 and arranged to straddle the shaft 201. The profiles or faces of the cams 223 and 224 are so designed and the spacing between the rollers 225 and 227 is such that the ram 191 is positively held in a definite position in its stroke at all times, depending upon the rotation of the shaft 201. Furthermore, cams 223 and 224 are designed to give a rapid upward movement to the ram 191, and to cause the ram to dwell near the top of its stroke for a period sufficient to allow the operations at stage A to be carried out before the ram begins its downward stroke. The ram 191 is properly guided in its movement as by being of a generally rectangular section, with forwardly and rearwardly extending guiding lugs 191—a and 191—b, that portion of the housing 181 in which the ram slides being of a corresponding shape as shown in Figure 44.

A die member 231 is detachably secured on the upper end surface of the ram 191 as by screws 232, and is further held in position thereon by a tongue 233 engaging a groove 234 in the ram. In the lower position of the ram 191 (Figure 41), die member 231 is retracted within the housing 181 to provide a clear space above the housing for movement of the work holding means 21 laterally of the housing into and out of working position shown in Figure 43. Die member 231 is provided with a sloping face 235 which is inclined outwardly and in the direction of advance of the work holders 21, as well as a deep cross slot 236 and upwardly extending lugs 237 on its rear or inner edge. As clearly shown in Figures 16, 42 and 44, the outer end portions 241 and 242 of the fingers 51 and 52 are of reduced width, the portion 242 of the finger 52 being accommodated in the cross slot 236.

Since the work holding means 21 moving into operative position with respect to stage A and ram 191 carries a finished work piece, shown in Figure 26 but omitted from Figures 41, 42, 43 and 44 for the sake of clarity, the operation of ejecting such work piece must be performed before the loading operation can be carried out by the feeding and cutting mechanism. The ejecting mechanism is indicated generally by the numeral 240 and comprises a unitary structure detachably secured to the frame of the machine above the ram 191. This mechanism is shown as comprising an ejecting member 243 pivotally supported as by a pin 244 secured in a bracket 245 attached to the exterior of the skirt 77 as by bolts 246. The member 243 comprises a body portion 247 on the opposite ends of which are secured bell crank members 248 each of which has a depending arm 249 as well as a laterally extending arm 250. The outer end of each arm 250 is slotted as at 251 to receive a locking bolt 252 threaded into the body 247, which serves to secure the bell crank 248 to the body 247 in adjusted position with respect thereto about the axis of the pin 244. An operating link 254 is pivoted at 255 to the central portion of the body 247, at a distance from the pivot pin 244. The lower end of the link 254 is restrained by a shackle member 256 one end of which is pivoted at 257 to the link 254, the opposite end being pivoted at 258 to an extension 259 suitably attached to bracket 245. A light compression spring 260 is confined between the shackle 256 and the bracket 245 and urges the shackle 256 downwardly about its pivot 258, and due to the connection formed by the operating link 254 urges ejecting member 243 in a clockwise direction about the pin 244. This movement is stopped by the engagement of the arms 249 with the bracket 259. This is the normal position of the member 243 and as clearly shown in Figure 41 the arms 249 are between the slot 55 in work holder 21, which is adapted to carry the work, and axis 22, or behind the slot 55.

As the ram 191 moves upwardly in the housing 181, from the position shown in Figure 41, the narrow end portion 242 of the finger 52 enters the slot 236, the lugs 237 passing the lower finger 52 and engaging the underside of the upper finger 51, moving this finger upwardly about the pivot pin 50 (see Figure 44). The lower finger 52 is caused to move upwardly along with the finger 51 by the bolt 57 and spring 60. Thus the grip of the fingers 51 and 52 is maintained on the work in the slot 55. When the fingers 51 and 52 reach a substantially horizontal position, projections 262 on the opposite sides of the lower finger 52 engage stops 263 formed on the bracket extension 259, preventing further upward movement of the finger 52. However, the finger 51 continues to move upwardly a short distance, thus separating from the finger 52, and releasing the work piece from between the bottom of the slot 55 and the upper surface 56 of the finger 52.

Furthermore, this continued upward movement of the finger 51 causes the finger 51 to engage the lower end of the operating link 254 and to move said link upwardly against the force of the spring 260. This moves the ejecting member 243 counterclockwise about its pivot 244, causing the arms 249 to sweep outwardly along the sides of the finger 51. All parts are now in the position illustrated in Figures 43 and 27. The extremities of the arms 249 engage the coils 9 and 10 on the opposite end of the finished work piece 1 pushing it off the surface 56. To facilitate the ejection of the work the outer end portion of the lower finger 52 may be bevelled as indicated at 264, so that when the fingers 51 and 52 and the ram 191 are in ejecting position bevelled surface 264 forms a continuation of the surface 235 of the die 231. The finished work pieces may be guided or conveyed away from the point of ejection in any preferred manner. All parts are now in condition to receive a fresh work piece which is inserted between the slot 55 of the finger 51 and the surface 56 of the finger 52. After such insertion the ram 191 is retracted a small distance by means of the cooperating stepped portions 223—a and 224—a respectively on cams 223 and 224, allowing the finger 51 to aproach the finger 52 in response to the spring 60, so that the work piece is gripped by the fingers 51 and 52. At this point the work piece W is cut off to the required length, as hereinafter described. Further retraction of the ram 191 allows both fingers to swing downwardly about the pivot 50 until supported by the bolt 57 on the stop pin 61. The fingers 51 and 52 etc. comprising the work holding means 21 together with the work piece are now in position for angular advance to the next stage.

As previously mentioned, it is desirable to supply the stock to be formed from a continuous piece and to cut it to appropriate lengths in a cyclic manner as an incident to the operation of the machine. For this purpose, a continuously revolving feed roll is used to advance the stock to the machine, means being provided for rendering such roller ineffective to advance the stock during a portion of each revolution of the feed roll whereby to control the length of the stock, cutting means being provided for severing the stock after each period of advance. Means are provided for operating the feed roll and cutting means in synchronism with the advance of the work holders and operation of the forming stages.

Referring to Figures 30 to 37, the feed roll is indicated by the numeral 270 and is supported by a rotatable shaft 271 arranged to be continuously rotated during operation of the machine in a counterclockwise direction as viewed in Figure 30. The stock 19 is urged against the lower portion of the periphery of the roll 270, by a pressure roller 272, whereby the rotation of the roll 270 is effective to advance the stock 19 to the right in Figures 30 and 33. To determine the amount of advance of stock 19 for each revolution of the roll 270, means are provided for maintaining pressure roller 272 out of engagement with the stock 19 for a definite and adjustable portion of each revolution of the roll 270. Also, means are provided for cutting the stock 19 after each period of advance, thus supplying the work pieces W to the machine.

For maintaining the pressure roller 272 out of contact with the stock 19 means are provided forming a cam surface 273 extending about a portion of the circumference of the roll 270, the angular extent of this cam surface being adjustable to vary the portion of a revolution during which the roller 272 is held out of engagement with stock and hence the length of the stock advanced. Thus, the cam surface 273 is formed by a pair of cams, one of which as 274 is formed integrally with the roll 270, the other cam 275 being formed on a cam plate 276. The cam plate 276 is mounted on a feed roll 270 for adjustment about the axis thereof as by a circular lip 277 engaging an annular shoulder 278 on the roll 270. A plurality of screws 279 passing through the slotted holes 280 in the cam plate 276 and threadedly engaging the roll 270 serve to secure the cam plate 276 in adjusted position. In Figures 30 and 33 it will be noted that the cam surface 273 extends for nearly half the circumference of the roll 270, or approximately 180°. By loosening the screws 279 and moving the cam plate 276 clockwise with respect to the roll 270, to the relative positions of Figure 37, such angular extent of the cam surface 273 may be considerably increased. Conversely, by moving the cam plate 276 counterclockwise with respect to the roll 270, the extent of the cam surface 273 may be considerably reduced. After appropriate adjustment, screws 279 are of course tightened to maintain the adjustment. The cam plate 276 is adjustable to any position on the cam roll by means of the second group of threaded holes in the cam roll 270.

To properly guide the stock 19, as it is advanced to its position between the fingers 51 and 52 of the work holder 21, the periphery of the roll 270 is provided with a circumferential groove 281. As clearly shown in Figures 35 and 36, the groove 281 has a depth substantially less than the height or thickness of the stock 19, to insure engagement of the stock by the roller 272. On the other hand the groove 281 has a width substantially greater than the width of the stock 19, to avoid any possibility of the stock 19 sticking in the groove 281 so as to be advanced after release from the pressure roller 272 by the cam surface 273.

Feed roll 270 is arranged to be driven from the jack shaft 134. For this purpose a worm gear 283 is secured on the shaft 271 as by a hub 284 having a tapered bore for receiving the correspondingly tapered end 285 of the shaft 271 (see Figure 34). The gear 283 is driven by a worm 286 keyed or otherwise secured on an auxiliary shaft 287 which is rotatably supported, as by anti-friction bearings 288, 289, in an auxiliary gear case or housing 290 suitably supported on the main frame 30 of the machine and connected with the gear case 38 (see Figure 30). The shaft 287 terminates near one end of the shaft 134, the axes of the shafts being normal to each other. The shafts 134 and 287 are operatively connected by a pair of miter gears 291 and 292 respectively secured on adjacent end portions of the shafts 134 and 287 (see Figures 18 and 31).

One end of the shaft 271 is rotably supported in the auxiliary housing 290 by an anti-friction bearing 294 mounted on the hub 284 of the worm gear 283; the opposite end of the shaft 271 is supported in an anti-friction bearing 295 mounted in the member 296 formed on the casing 290 and spaced outwardly therefrom (see Figures 13, 14 and 34).

Pressure roller 272 is supported for movement toward and away form the feed roll 270. This roller is rotatably mounted on anti-friction bearings 299 carried on a pin 300 secured in one end of a lever 301. The lever 301 is pivotally mounted intermediate its ends on a pin 302 secured between an extension 303 of the member 296 and the gear case 290. The lever 301 is urged continuously about the pin 302 to cause the roller 272 to engage the roll 270, by a compression spring 304 confined between the bottom of a recess 305 formed in the extension 303 of the casing 290 and an adjustable abutment 306 threaded into the lever 301. A lock nut 307 serves to secure the abutment 306 in adjusted position.

To insure against undesired movement of the stock 19, means are provided for applying a frictional restraint to the stock 19 during periods when advance is not desired. Such restraint acts not only to prevent advance of the stock by frictional drag of the roll 270 thereon even when the roll 272 is not urging the stock into contact with the roll, but also insures against backward movement of the stock 19 due to its resilience, or to other causes.

Such restraining means is generally indicated by numeral 308 in Figures 26 to 30 and 33 and includes upper and lower guide members 309 and 310 carried by the extension 303, providing a passage 311 between them closely accommodating the stock 19 and aligned with the groove 281 of the feed roll 270. The upper block 309 has a cavity 312 formed therein opening into the passage 311 and within which is slideably mounted a headed pin 313 urged downwardly into the passage 311 by the spring 314 and arrested from contacting the stock 19 by engagement with the upper surface of the lower block 310. A brake pin 315 is slideable through a guiding opening 315—a in the lower member 310 and is adapted to engage the stock 19 below the pin 313 upon release of the stock 19 by the roller 272. The brake pin 315 is supported on adjustable supporting screw 316 carried by the lever 301 having a convex upper surface 317 as shown in Figure 30. A lock nut 318 holds the supporting screw 316 in adjusted position.

As clearly shown in Figures 30 and 32, the opening 315—a is smaller than the opening 312, thus providing a seat 315—b for supporting pin 313. The groove 311 is somewhat deeper than the height of the stock 19, and the pin 315 is adjusted to normally clear the bottom of the stock. Thus, when the stock 19 is being fed, the brake means 308 is without effect.

The arrangement is such that when pressure roller 272 rides onto the cam surface 273 the lever 301 is swung clockwise about its supporting pin 302 against the force of the spring 304. This movement urges the brake pin 315 upwardly against the stock 19 and the adjustment of the screw 316 is such that the stock 19 is forced against the bottom of the spring pressed pin 313, which serves to frictionally restrain the stock against movement. Downward movement of the pin 315 in response to rotation of the feed roll 270 releasing pressure roller 272 from the cam surface 273 frees the stock 19 for further movement.

The means for cutting the stock 19 is generally indicated by the numeral 325 (see Figures 13, 14, 16, 26–31, 38, 39 and 40) and includes a moving or upper cutter 326 and a lower or fixed cutter 327 between which the stock 19 is advanced in a direction transverse to that in which the upper cutter 326 moves (see Figure 39). When the stock 19 has been advanced a predetermined amount, it is held stationary by the brake means 308 just described and the upper cutter 326 is caused to move so that its cutting edge passes the cutting edge of the lower cutter 327, severing the stock by a shearing action. For this purpose the cutter 326 is mounted in a movable tool holder 328 which is reciprocably mounted in a tool holder guide 329 rigidly attached to the stationary tool holder 333 and auxiliary housing 290. The vertical position of the cutter 326 in the tool holder 328 may be adjusted by means of screw 330, a lock nut 331 being provided to maintain the screw 330 in adjusted position.

The lower cutter 327 is mounted in a transverse recess 332 in the stationary tool holder 333, which also has a longitudinal recess 334 for guiding the stock 19. The tool holder 333 is adjustably secured to the auxiliary housing 290 as by one or more bolts 335 passing through slotted holes 336. This adjustment is to properly position the cutting edges of the cutters 326 and 327 with respect to proper positioning of the work piece in stage A; that is, the position of the cut off determines the point at which the work holder 21 grips the work piece W.

The tool holder 328 has a projecting lug 338 into which is recessed a compression spring 339, the lower end of which is accommodated in a hole 340 in tool holder guide 329. A plunger 341 (Figures 13, 30 and 38) is vertically movable between guide members 342 and 343 formed on the auxiliary housing 290, a cover plate 344 being detachably secured to the guide members to prevent lateral movement of the plunger 341. The guide member 342 has an opening 345 for accommodating a block 346 secured on the plunger 341 and having a projecting finger 347 adapted to engage a step 348 on the tool holder 328, so that the tool holder and the plunger move together as a unit. The finger 347 and step 348 form a detachable connection, readily permitting lateral adjustment of the cut off mechanism 325 and simplifying the removal of the tool holder 328 for adjustment or replacement of the cutter 327.

The spring 339 acts at all times to urge the tool holder 328 and the plunger 341 upwardly. To limit such upward movement and to cause the plunger and tool holder with the cutter 326 therein to move downwardly to perform a cutting operation, a rocker arm 350 is pivotally mounted on a pin 351, supported by the housing 290 and a boss 352 formed on the member 296. One end of the arm 350 has an adjustable abutment member 353 threaded therein which engages the upper end surface 354 of the plunger 341, a lock nut 355 being provided to retain the member 353 in adjusted position (see Figures 30, 38 and 40). The other end of the rocker arm 350 is forked, a roller 356 being rotatably carried on a pin 357 extending through the fork (see Figure 34). The roller 356 forms a cam follower for cooperating with a cam 358 secured on the shaft 271. As just mentioned, the spring 339 urges the tool holder 328 and the plunger 341, by means of step 348 and finger 347, constantly upwardly; this movement causes the upper end 354 of the plunger 341 to engage abutment 353 of the rocker arm 350, thereby urging the rocker arm 350 counterclockwise about the pin 351, maintaining the roller 356 against the surface of the cam 358 at all times. The spring 349 is located between the lower end of the plunger 341 and a plate 349—a suitably secured to the lower ends of the guide members 342 and 343. The spring 349 is of sufficient tension to absorb the reaction load built up in the mechanism by the strain of shearing the work piece W from the stock 19 and released at the time shearing is completed. As the shaft 271 rotates, the high point of the cam 358 passes under the roller 356, causing the arm 350 to swing in a clockwise direction, moving the plunger 341, together with the tool holder 328 and the cutter 326, downwardly. Abutment means 353 and the screw 330 by appropriate adjustment serve to properly position the cutter 326 with respect to the cutter 327 when the plunger 341 and connected parts are at the upper limit of their movement, as well as to insure proper cutting action between the cutters 326 and 327.

The manner of securing the various parts on the shaft 271 is shown in Figure 34. As previously mentioned the shaft 271 has a tapered head 285 on which the worm gear 283 is mounted; a Woodruff key 360 forming a driving connection between the gear 283 and the shaft 271. The feed roll 270 is mounted on the shaft 271 next to the gear 283, the cam 358 being mounted next to the feed roll. A common key 361 provides a driving connection between the shaft 271, feed roll 270 and the cam 358. The inner race 362 of the bearing 295 is carried on a portion 363 of the shaft 271 having a reduced diameter. A nut 364 threaded on the outer end of the shaft 271 serves to secure the bearing 295, cam 258, feed roll 270 and gear 283 in assembled relation against the head 285 of the shaft 271. The outer race 366 of the bearing 295 is carried in a boss 367 of the member 296. The inner race 368 of the other bearing 294 is clamped on a reduced portion 369 of the hub 284 between the hub 270—a of the feed roll 270 and the shoulder 371 of the hub 284. The outer race 372 of the bearing 294 is secured in a recess 373 formed in one wall of the housing 290, between a lip 374 formed integrally with the housing 290 and a retaining ring 375 secured to the housing by screws 376.

The steps of ejecting the finished work piece and of feeding a piece of stock to the machine, constituting the operations of the first stage, or stage A of the machine are illustrated schematically in Figures 26, 27, 28 and 29. In Figure 26, the work holder 21 gripping a finished work piece 1, is shown as having been indexed into operating relation with the mechanism of the first stage A, as previously described. Ejecting fingers 249 are in their normal or retracted position, and the cutter 326 is in its upper position. The advance of the stock 19 has just started in response to rotation of the feed roll 270, since the cam surface 275 has released the pressure roller 272, allowing this roller to urge the stock 19 into driving engagement with the feed roll 270 and releasing the brake means 308 from engagement with the stock 19.

In Figure 27 the fingers 51 and 52 of the work holder 21 are shown as having been separated, by the upward movement of the ram 191 as illustrated in Figure 43 and described in connection therewith. This separation as previously described releases the grip on the work piece 1 and causes ejecting fingers 249 to swing to their outer position, such movement serving to eject the finished work piece 1 from between the fingers 51 and 52; at the same time the stock 19 has begun to advance due to the rotation of the roll 270, it having passed between the fingers 51 and 52 just after the ejectment of the completed work piece 1.

In Figure 28, the advance of the stock 19 has been stopped due to the engagement of the cam surface 274 with the pressure roller 272, such engagement releasing the stock 19 from driving relation with the roll 270, as well as causing the brake means 308 to engage the stock. Fingers 51 and 52 are gripping the work piece W due to the downward movement of the ram 191 and ejecting fingers 249 have returned to their normal or retracted position. The cutting means 325 has just severed the stock 19 to form a work piece W due to the advance of the cam 358 having brought the high point of the cam into engagement with the cam roller 356, such engagement swinging the rocker arm 350 in a clockwise direction and moving the plunger 341, tool holder 328 and cutter 326 downwardly. It is to be understood that the fingers 51 and 52 engage and grip the work piece W before it is severed from the stock 19.

In Figure 29, cutting means 325 is shown as having returned to its normal position in response to continued rotation of the cam 358, while the stock 19 is held against advance due to the engagement of the cam surfaces 274 and 275 with the pressure roller 272. During this period, the work holder 21 with the work piece W gripped therein is advanced to the next stage B while the succeeding work holder with the finished piece 1 therein is advancing from the previous stage F. The foregoing operations of ejecting and loading correspond to the operations described in connection with Figures 6 and 12 respectively.

OFFSETTING MECHANISM

Stage B

The mechanism for forming the offset or bow 3 in the work piece W will now be described, reference for this purpose being had to Figures 45 to 49 inclusive. The shaft 202 is rotatably supported in the housing 182 by antifriction bearings 381 and 380 respectively on opposite sides of the offset 208, and by an anti-friction bearing 382 mounted in an axial extension 383 of the housing 182. Since this stage involves merely a pressing operation requiring no period of dwell or other irregularity in the movement of the ram 192, the offset 208 may be simply a cranked portion 384 of the shaft 202. The ram 192 is appropriately restricted to reciprocatory motion by an upward extension 385 of the housing 182, and carries a wrist pin 386 joined to the crank pin 384—a by a connecting rod 387. A forming die 388 is suitably secured on the upper end of the ram 192 for cooperation with a stationary die 389 supported above the ram 192 by the brace member 39 (see Figure 45). Rotation of the shaft 202 reciprocates the ram 192 causing the die 388 to approach the die 389 and form the work held therebetween by a work holder 21 or to withdraw within the housing extension 385 to permit workholders 21 to be advanced out of and into operative relationship with the dies 388 and 389, as previously explained.

Die 388 comprises a block 396 suitably secured to the upper end of the ram 192 and provided with a deep cross slot 397. The sides of the slot 397 are joined to the upper face 398 of the block 396, as by oppositely inclined surfaces 399. The work piece W is supported by the work holder 21 so as to extend diagonally across the face 398 as shown in Figure 49, when the work holder is in operative position for this stage. To prevent lateral distortion of the work during the pressing operation, the face 398 is provided with raised portions 400, 401, providing aligned grooves 402, 402—a adapted to accommodate the end portions of the work W upon upward movement of the die 388. That portion of the surfaces 398 and 399 which perform the actual bending operation are formed as steel pins 403, 404 whose upper surfaces 405, 406, are ground to provide the desired bend or offset in the work W and appropriately hardened to resist wear. Forming pins 403 and 404 are accommodated in suitable bores 407 and 408 in the block 396. Each pin 403, 404 is provided with a flattened portion 409 adjacent its upper end forming an upwardly directed lip 409—a adapted to be engaged by a clamping plate 410 having an overhanging edge 411. Plates 410 are suitably secured to the block 396 and serve to detachably hold the pins 403 and 404 in the block 396 in correct position.

The upper die 389 comprises a rectangular block 414 suitably secured to a web 415 of the bracket 39 adjacent the skirt 77 of the gear case 38. Pins 417 and 418 are positioned above the forming pins 403 and 404 respectively and are threaded through the web 415 and block 414, so that their distances above the forming pins 403 and 404 may be readily adjusted. The pins 417 and 418 are provided with hardened faces 419 and 420 at their lower ends. Their upper ends are slotted as at 421 to facilitate adjustment, check nuts 422 being provided to hold the pins 417 and 418 in adjusted position. A stop pin 423 similarly threaded through the web 415 and block 414 is provided, having a flattened lower end surface 424, and a flat sided upper end portion 425. A check nut 426 is provided to hold the pin 423 in adjusted position.

The operation of this stage is as follows. The timing or indexing mechanism T serves to position a work holder 21 in operative relation to the mechanism as previously explained. Thus, the work holder 21 is positioned above the slot 397 and beneath the stop pin 423 as shown in Figure 47. However, the shaft 202 is continuously rotating and it is to be understood that the advance of the work holders 21 is so timed with relation to the rotation of the shaft 202 and the movement of the ram 192 that such advance occurs while the ram 192 is near the bottom of its stroke, providing ample clearance for the passage of the work holders 21 above the die 388.

Upward movement of the ram 192 first causes the end portion of the work piece W to be engaged by the horizontal surface 398 on top of the die 388 at the bottoms of the grooves 402. Further upward movement of the ram 192 then causes the work piece W to swing the work holder 21 upwardly about its pivotal support 50, until the upper finger 51 engages the end 424 of the stop pin 423, the work piece remaining substantially straight. The lower finger 52 also moves upwardly about the pin 50 due to the spring connection between the fingers formed by the bolt 57 and the spring 60. The slot 397 serves to accommodate the end of the finger 52, the slot being of such size as to provide ample clearance about the finger. Continued upward movement of the ram 192 and the die 388 will bend the end portions of the work piece W upwardly about the ends of the groove 55 in the finger 51 until such end portions engage the faces 419 and 420 of the pins 417 and 418. As soon as the end portions are bent up even slightly, they are out of contact with the surface 398 of the block 396 and rest solely on the convex portions of the hardened surfaces 405 and 406 of the forming pins 403 and 404. As the surfaces 405 and 406 cooperate with the hardened faces 419 and 420 to do substantially all of the forming, excessive wear on either die 388 or 389 is avoided. The engagement of the end portions of the work piece W with the pins 417 and 418 serves to direct the extremities of such end portions downwardly, until at the end of the upward stroke, the end portions are substantially aligned and parallel with the offset portion 8. After the offset has been formed continued rotation of the shaft 202 serves to retract the ram 192 to permit advance of the work holder 21 to stage C for a further forming operation, while another work holder is advanced from the loading stage A.

An important feature of this forming machine is its ability to turn out work which will meet close tolerances. As previously mentioned, in the particular article being described by way of example of the work of the machine, the depth of the offset 8 must be accurately maintained. Since forming surfaces 405 and 406 of the pins 403 and 404 always rise accurately to the same position, it follows that adjustment of stop pin 423 limiting the upward movement of the finger 52 and hence the center portion of the work piece W will determine the distance the end portions are raised above the center portion, accurately determining the depth of the offset 8. Pins 417 and 418 may be adjusted to provide appropriate clearance for the work W between their faces 419, 420 and faces 405, 406 of the forming pins 403 and 404.

An important detail of this operation is the continuation of the groove 55 upwardly on the inclined sides of the finger 52 as shown at 55—a in Figure 45. In this way, after formation of the offset 8, the work piece W is securely held between fingers 51 and 52 against both axial and angular displacement with respect to the fingers in the subsequent forming operations.

COIL FORMING OPERATION

*Stages C and D*

The mechanisms for winding the coils 9 and 10 respectively on the opposite ends of the work piece W will now be described. These coils or springs on the particular article 1 used as an example of the work done by the machine are quite similar and are formed as independent operations in stages C and D, that coil 9 which may be considered as on the left end of the work piece W being formed in stage C, the coil 10 on the other end of the work being formed in stage D. The mechanisms of these stages C and D are substantially identical and are arranged for simultaneous operation, since all of the forming operations of the machine proceed substantially simultaneously.

Each winding mechanism includes a winding form 435 or 436 (Figure 16) detachably mounted respectively on the ram 193 or 194 of that forming stage of which the said mechanism is a part, and arranged to be moved by upward movement of the ram into operative relation with the work piece W which has been indexed into forming position with respect to stage C or D (Figures 16, 55, 56 and 61). Such movement also serves to raise the work holder 21 to position the work in operative relationship with the winding spindle 437 or 438 as the case may be, at the same time actuating locking means 439 and 440 to prevent the work holder 21 from moving upwardly under stress of the winding operation. The winding spindles 437, 438 each rotate through a definite angular distance, while the work is in operative relation with them, to wind the coil, after which the direction of their rotation is reversed and the spindles 437, 438 return to their original positions as the rams 193, 194 descend. To insure disengagement of the wound coil 9 or 10 from the respective spindle 437 or 438, an element of the locking means 439 or 440 is arranged to urge the work holder 21 downwardly into engagement with its supporting stop 61 as the ram moves down (see Figures 15, 56). Since the mechanism of stage C operates to form a coil on the left hand end of the work piece W the winding spindle 437 and form 435 must be on the left of the work holder 21 indexed to forming position for this stage; similarly, since the mechanism of stage D operates on the right hand end of the work piece W, the spindle 438 and the form 436 must be on the right of the work holder 21 indexed to forming position for stage D.

The driving mechanism for winding spindles 437 and 438 will now be described, reference being had for this purpose to Figures 14, 15, 18 and 25. These spindles are driven simultaneously from the jack shaft 134. For this purpose the shaft 134 has a worm 443 mounted thereon, adjacent the worm 133, and meshing with a worm wheel 444. The worm gear 444 is suitably secured on a shaft 445 which is rotatably supported in the gear case 38 and extends upwardly out of the casing 38. The upper end of the shaft 445 has a crank 446 secured thereon, axially adjustable about the axis of the shaft 445. The crank 446 carries a crank pin 447 to which is attached a connecting rod 448 having a rack 449 thereon (Figure 14). Guide means 450 are provided for maintaining the rack 449 in mesh with a pinion or gear wheel 451 mounted on a shaft 452 supported in the gear case 38 for rotation about the axis 22, thus the shaft 452 is coaxial with the main shaft 110. The shaft 452 has a gear wheel 453 secured thereon which engages a pinion 455 on the winding spindle 437 (see Figures 15, 25 and 57) and a similar pinion 456 on the winding spindle 438. As the crank 446 revolves, it imparts a reciprocatory motion to the connecting rod 448, which due to the engagement of the rack 449 with the pinion 452, imparts an oscillatory motion to the shaft 451, pinion 452 and gear 453, which movement in increased angular extent is imparted to the spindles 437 and 438 by the engagement of the pinions 455 and 456 with the gear 453. The speed at which the spindles rotate, in either direction, is high with respect to the rate of movement of the cooperating rams 193 and 194 due to the relative diameters of the gears 451, 453 and pinions 455 and 456, and to the use of a worm 443 having a large lead with respect to the worm 133. The arrangement is such that the spindles rotate in a winding direction when the rams are at the upper limit of their strokes. During the retraction period of the rams in stages C and D, the indexing period of the fingers 21, and the lifting period of the rams in said stages, rotation of the spindles in the reverse direction occurs. To permit adjustment of the instant at which the spindles 437 and 438 start rotating in a winding direction with respect to the movement of the rams 193, 194, provision is made for angularly adjusting the position of the crank 443 on the shaft 445, and to permit alteration of the extent of rotary movement of the spindles 437 and 438, provision is made for adjusting the throw of the crank 446. The shaft 445 is mounted on anti-friction bearings 458 and 459 (see Figure 15), the bearing 458 acting as a combination radial and thrust bearing, the outer race 460 thereof being supported on annular seat 461 in a cylindrical pocket 462 formed in the bottom wall 136 of the gear case 38. A retaining ring 463 secured about the opening of the pocket 462 as by cap screws 464 serves to maintain the bearing 458 on its seat 461. The inner race 465 of the bearing 458 is secured on a reduced portion 466 of the shaft 445 as by a castellated nut 467, which urges the race 465 axially against the hub 468 of the gear 444. Axial movement of the gear 444 on the shaft 445 is prevented by the provision of a tapered seat 469 on the shaft for the hub 468. A key 470 serves to prevent relative rotation between the gear 444 and the shaft 445.

The upper end of the shaft 445 also has a tapered seat 472, the taper being relatively steep, such as 10° for example. The crank 446 for driving the winding spindles 437 and 438 is provided with a hub 473 having a similarly tapered bore 474 for mounting the crank 446 on the shaft 445. A nut 475 threaded on the end of the shaft 445 serves to secure the crank 446 in adjusted position on the shaft 445. Frictional engagement between the crank 446 and the shaft 445 is relied on to drive the crank, no key being provided. Thus, it is possible to alter the angular position of the crank 446 on the shaft 445 by small increments. The bearing 459 for the upper end of the shaft 445 supports the shaft in a radial direction only. Thus, the bearing 459 is secured to the shaft 445 by having its inner race 476 pressed onto the hub 473 of the crank 446, the outer race 477 being slideable in a bore 478 formed in the cover member 149 of the gear case 38.

As just mentioned, the throw of the crank 446 is also adjustable. Thus, referring to Figures 14, 15 and 24, the crank pin 447 is provided for engaging the end of the connecting rod 448, a suitable anti-friction bearing 483 being interposed. The crank pin 447 is adjustable toward and away from the axis of the shaft 445 by being formed on a base 480 slideable in a guideway 481 on the crank 446. Oppositely disposed clamping plates 482 secured to the crank member 442 by bolts 442—a retain the base 480 on the crank 446. A rod 484 extending radially of the crank 446 is threaded through the block 480 and is restrained against axial movement by a keeper plate 485 secured to the end of the crank. The rod 484 has a head 486 adapted for engagement by a wrench to rotate the rod and a collar 487 spaced from the head. The keeper plate 485 has a slot 488 for accommodating that portion of the rod 484 between collar 487 and the head 486. The collar 487 and the head 486 engage opposite sides of the plate 485 restraining the rod axially. Rotation of the rod 484 serves to adjust the position of the block 480 with respect to the axis of the shaft 445. Thus altering the throw of the crank. To adjust the crank pin 447, it is necessary to loosen the bolts 442—a to release the clamping plates 482 so that the block 480 may be moved by adjusting the rod 484. To maintain adjustment, the bolts 442—a are again tightened. To improve the operation of the machine, the crank 446 may be provided with a counter weight 489.

As shown in Figures 14 and 15, the guide means 450 for maintaining the rack 449 engaged with the pinion 451, is supported for free rotation about the axis of the shaft 452 and comprises similar upper and lower halves 490 and 491 having bearing bosses 490—a and 491—a respectively for supporting the guide 450. The boss 490—a of the upper half 490 rotatably engages the hub 493 of the gear 451, while the boss 491—a of the lower half 491, bears directly on the shaft 452. Thus the guide means 450 is positioned about the pinion 451 which in turn is mounted on the tapered end of the shaft 452. Each guide half or member 490, 491 has a guide roller 496, 497 pivotally mounted therein as by pins 498 and 499 respectively, these pins being so spaced with regard to the bosses 490—a and 491—a that connecting rod 448 may pass freely between the rollers 496 and 497 and the gear 451 while the rack 449 is maintained in mesh with the gear 451 at all times. Since the guide 450 is freely rockable about the shaft 452, the connecting rod 448 is free to move angularly about the shaft 452 in response to rotation of the crank 446, the guide 450 rocking about the shaft 452 to accommodate such movement. The two halves 490, 491 of the guide 450 are secured together as by cap screws 500.

The shaft 452 is rotatably supported coaxially with the main shaft 110 by an anti-friction radial and thrust bearing 503, the inner race 504 of which is secured on the enlarged portion 494 of the shaft 452 by being clamped against an annular flange 505 at the end of such enlargement and a nut 506 threaded on the upper part of the enlargement 494. The outer race 507 of the bearing structure 503 is mounted in a bore 508 formed in the cover member 149 of the gear housing 38. The bore 508 has a lower annular lip 509 for engaging the race 507, a bearing retaining ring 510 secured to the cover as by cap screws 511 serves to maintain the race 507 on the lip 509. The gear 453 is secured on the shaft 452 and against the underside of the flange 505 as by a nut 512 threaded on the shaft, a key 513 preventing relative rotation between the shaft and the gear. The gear 451 is similarly secured on the shaft 452 as by the nut 514 threaded on the shaft and a key 515.

The shaft 452 is additionally guided by another anti-friction bearing 516 mounted on a downward extension 517 of the shaft 452. The outer race 518 of the bearing 516 is mounted in a ring 519 suitably secured to the upper face of the worm gear 132, as by cap screws 520. The bearing 516 is solely a radial bearing, the weight of the shaft 452 and connected parts being carried by the upper bearing 503.

As previously mentioned, the winding spindles 437 and 438 are duplicates, hence only one of them (that adapted to form the coil on the left hand end of the work 20 and designated by numeral 437) will be described, it being understood that such description applies equally well to the winding spindle 438 adapted to form the coil on the right hand end of the work, wherein parts corresponding with those of the spindle 437 are indicated by the same numerals with the addition of a prime ('). Referring to Figures 57 and 58, it will be seen that winding spindle 437 comprises a pair of rotatably supported members 525 and 526 joined by a coupling device 527 which allows lateral displacement of the lower member 526 or winding head, with respect to the upper member or driver 525. This permits proper positioning of the head 526 which actually does the coil winding, with respect to the coil form 435, and allows use of other types of coil forms than that disclosed, to suit different designs of work 1, which it may be desired to produce.

The upper portion of driver 525 of the spindle 437 includes a long relatively steeply tapered shank 528 upon which the pinion 455 having a correspondingly tapered bore 529 is secured by a nut 530 threaded on the upper end of the driver shank 528. The shank 528 is rotated by frictional engagement with the tapered bore 529 of the pinion 455, no key being used. Thus, by loosening the nut 530, the angular position of the pinion 455 with respect to the shank 528 and winding head 526 may be altered. To facilitate such adjustment, the shank 528 is provided with a flat sided upper end portion 531 adapted to be gripped by a wrench or the like. The driver 525 is rotatably mounted in an extension 538 of the gear case cover 149 by an anti-friction radial and thrust bearing 532, the inner race 533 of which is secured on the hub 534 of the pinion 455 by a nut 535 threaded on the hub. The outer race 536 of the bearing 532 is mounted in a bore 537 formed in the extension 538 of the cover 149. The bearing race 536 is supported in the bore 537 by a lip 539 extending about the lower end of the bore, a retaining plate 540 secured to the extension 538 as by cap screws 541 securing the bearing race in position. The lower end of the driver 525 is radially guided by an anti-friction bearing 542, the inner race 543 of which is mounted on the shank 528 above the coupling 527, the outer race 544 being supported in a bore 545 in the extension 538.

The winding head 526 is rotatably supported in a bracket member 548 which is adjustable to alter the position of the winding head with respect to the work. Thus, the bracket 548 has a flange 549 by which the bracket is secured to a flat face 550 formed on the gear case 38 (see Figure 18) as by a plurality of cap screws 551 threaded into the gear case 38 and passing through slotted holes 552 in the flange 549. By loosening the cap screws 551, the bracket 548 together with the winding head 526 may be shifted in a horizontal direction. Figure 57 shows the heads 526 and 526' in intermediate adjusted positions while Figure 58 shows the head 526 at the extreme left of its adjustment.

As clearly shown in Figure 57, winding spindle 526 comprises a shaft 554 rotatably supported in the bracket 548 as by anti-friction bearings 555 and 556 mounted on portions of the shaft 554 of reduced diameter 557 and 558 respectively adjacent its upper and lower ends. The lower end portion 559 of the shaft 554 is threaded to receive a short hollow mandrel 560 which carries the winding pin 561 radially spaced from the axis of the shaft 554 as shown in Figures 55 and 56. This pin 561 is adapted to appropriately engage the work piece W and wind it about the coil form 435 as the shaft 554 rotates. The mandrel 560 serves to secure the inner race 562 of the bearing 556 on the reduced portion 558 of the shaft 554, the outer race 563 being mounted in a counter bore 564 formed in an elongated hub 565 of the bracket 548. The inner race 566 of the upper bearing 555 is similarly secured on the shaft 554 by one member 567 of the coupling 527, the outer race 568 being accommodated in a counter bore 569 of the hub 565.

The means 527 connecting the driver 525 and spindle 526 may conveniently be of the type known as an Oldham coupling. This comprises upper and lower coupling members 570 and 571 secured respectively to the shank 528 and shaft 554 (see Figure 58). The member 570 may be formed integrally with the shank 528, while the member 571 is shown as secured on a tapered seat 554—a on the shaft 554 by a nut 571—a. The opposing faces of the members 570 and 571 are spaced apart to accommodate a connecting ring 572 between them and are provided respectively with diametrically aligned driving lugs 573—574, 575—576. The upper surface of the ring 572 is provided with a diametrical slot 577 for engaging the lugs 573 and 574, on the coupling member 570, the lower surface having a similar slot 578 arranged at right angles with respect to the slot 577 for engaging the lugs 575 and 576, on the coupling member 571. The manner in which such a coupling operates is well understood and should be apparent from an inspection of Figures 58 and 59.

The structure of the winding form together with the means for moving it into and out of operative relation with the winding spindle and the operation thereof will now be described. For this purpose attention should be directed to Figures 15, 16, 55, 56, 60, 61 and 62. The winding form 436 and associated mechanism which cooperates with the winding spindle 438 to form the right hand coil 10 on the work piece W and constitutes stage D will be shown and described, it being understood and as previously pointed out, that this winding form 436 and mechanism is substantially identical with the winding form 435 which cooperates with winding spindle 437 to form the coil 9 on the left hand end of the work piece W and constituting the previous stage, C. In this connection it is to be noted that Figure 15 illustrates stage C.

The ram 194 is guided for reciprocating motion in the housing 184 in response to rotation of the shaft 204. The shaft 204 is rotatably supported in the housing 184 as by anti-friction bearings 590 and 591 respectively adjacent opposite ends of the shaft. The offset intermediate portion 210 of the shaft 204 comprises a pair of axially spaced cams 592 and 593 cooperating respectively with the cam following rollers 594 and 595 and pivotally carried by the ram 194 respectively above and below the cooperating cams. The upper roller 594 is carried on a pin 596 supported in the ram 194. For attaching the lower roller 595 to the ram 194 a yoke member 598 arranged to span the shaft 204 is suitably secured to the ram 194 and is provided with a pin 599 at its lower end on which the cam roller 595 is mounted. The cams 592 and 593 are so formed with respect to the spacing of the rollers 594 and 595 that the cam surfaces maintain contact with their respective followers at all times, thereby positively positioning the ram 194 and obviating the need of spring mechanism for returning the ram. Furthermore, the cams 592 and 593 are so designed as to raise the ram 194 rapidly to its upper position from which it gradually recedes so as to impart the required lead to the helix of the coil, and permit the work piece W to properly position itself about the winding form 436 as it is being formed by the winding pin 561'. After completion of the winding operation the ram 194 is rapidly lowered to its retracted position and immediately again raised (see Figures 50 and 61).

The ram 194 has a pair of upstanding parallel lugs 601, 602 on its upper surface defining a space or slot 603 between them and having forming dies 605 and 606 respectively secured thereto as by screws 607. The right hand die 606 has the winding form 436 formed on its upper surface, the upper surface 608 of the left hand die 605 being arranged to support the previously formed coil 9 on the left hand end of the work piece W during the winding of the coil 10 on the right hand end.

With the ram 194 in its lower or retracted position, form 436 does not extend above the top of the housing 184, and a clear space is provided between the housing 184 and the winding head 560' to permit advance of the work holders 21 therebetween (see Figure 55). When a work holder 21 has been indexed to operating position with stage D (the one now under consideration), the fingers 51 and 52 are disposed centrally of the ram 194. Rotation of the shaft 204 causes the cam 592 to rapidly raise the ram 194 to its forming position, the portions of the work piece W which project on opposite sides of the work holders 21 engaging the dies 605 and 606 and swinging the work holder with the work piece W gripped therein upwardly about the pivot pin 50 to the position shown in Figures 56 and 61. As shown in Figure 61, the work W gripped between the fingers 51 and 52 now has its left end portion with the coil 9 formed in the preceding stage C supported on the die surface 608, while the right hand end portion of the work piece W is adjacent the winding form 436 and in position to be engaged by the revolving winding pin 561' (see also Figure 61).

It is obviously necessary that the winding form 436 after engaging the work piece W, be brought, together with the work piece W, into operative relation with the moving winding pin 561' when the latter is in a particular part of its path of movement, to insure that the work does not strike the bottom of the pin 561', as well as to insure that the pin 561' engages the opposite side of the work from that adjacent the form 436. The position of the pin 561' when the ram 194 reaches the tip of its stroke is a function of the relative movements of winding spindle 438 and the ram 194, and depends on the angular position of the crank 446 with respect to the shaft 445. As previously pointed out, provision is made for adjusting the position of the crank 446 about the axis of the shaft 445, hence the relative positions of the pin 561' and the ram 194 at any instant can be fixed. Due to the multiplication of angular movement between the crank 446 and the winding spindle 438, and the resulting rapid movement of the pin 561' and the ram 194, such adjustment of the crank is in the nature of a rough adjustment only, and to accurately position the pin 561' the nut 530' is loosened to release the shank 528' from the pinion 456, whereupon the shank 528' and the winding head 526' may be turned to a desired position by means of extension 531', after which the nut 530' is tightened to maintain the parts in adjusted position. Similar considerations apply to the pin 561 and the ram 193 of the other winding stage, stage C. Adjustment of the crank 446 to alter the position of the pin 561' also alters the position of the pin 561; however, the positions of the pin 561 and 561' may be adjusted independently by appropriate manipulation of the nuts 530 and 530' and shanks 528 and 528'.

The foregoing considerations relate to the beginning of the winding operation. To produce a coiled spring of predetermined characteristics it is necessary that the rotational movement of the winding spindle 438 be such as to produce a coil of a definite number of turns or fractions thereof. For this purpose the throw of the crank 446 is made adjustable. If the crank pin 447 is positioned closely to the axis of the shaft 445 to reduce the throw of the crank, the angular movement or amount of rotation imparted to the spindles 437 and 438 by movement of the crank will be less than if the crank pin 447 is positioned farther from the shaft 445. By appropriate adjustment of the throw and angular position of the crank 446, together with adjustment between the pinions 455 and 456 and the associated shanks 528 and 528', the winding movement of each winding spindle 437 and 438 may be altered.

To compensate for the "spring back" or tendency of the spring to unwind when the winding movement of the spindle stops, it is necessary for such winding movement to continue to wind stock additionally after the predetermined desired number of coils or fractions thereof have been formed. Thus, when the movement of the winding spindle reverses leaving the coil free to unwind, the amount which the coil unwinds will leave a spring of the required number of coils.

It will be understood that by appropriate adjustment of the throw and position of the crank 446 and the use of other than the conical spring forms 435 and 436 disclosed, modified forms of the springs may be wound, and further that the springs formed respectively in stages C and D need not be identical.

As shown in Figures 50 and 61, the winding form 436, which is preferably formed of hardened tool steel or the like has an upwardly and inwardly curved supporting surface 610 as well as a correspondingly curved vertical surface or wall 611. When the form 436 is brought into operative relation with the work piece W the work is supported on the lowest reach of the supporting surface 610 as well as closely enclosed between the pin 561' and an area of the wall 611 adjacent the low reach of the supporting surface and having a relatively large distance from the center of the form. Then as the pin 561' revolves (in a clockwise direction and substantially about the center of the form 436) the appropriate portion of the work piece W is forced inwardly against the wall 611 so that such portion is formed into a spiral and at the same time the form is lowered by downward movement of the ram 194 as previously mentioned, so that the coil is wound in a helical like manner.

The coil 10 is thus formed to have a pitch and diameter determined by the winding form; in the example under consideration, the diameter varies, resulting in a generally conical spring.

The winding operation may be visualized by the aid of diagrams, Figures 51 to 54 inclusive. Thus, Figure 51 shows the work piece W after the work holder 21 has been indexed into position and the winding operation is about to start. The work piece W has the left hand coil 9 already formed in the preceding operation. The winding pin 531' revolves about the coil form 436 in a clockwise direction to successively assume the broken line position of Figure 51 and the positions of Figures 52 and 53, the stock W being bent as indicated. As previously mentioned, as the winding progresses, the form 436 is lowered to present progressively a new surface of the form to be occupied by the stock. Figure 53 shows the approximate limit of clockwise movement of the pin 561', after which it returns in the opposite direction. As indicated in Figure 54, the newly wound coil 10 springs back to a certain extent. Hence the final position of the pin 561' in winding direction must be such as to give a certain amount of overwind to allow for this spring back, and insure a finished coil of the desired number of turns.

The winding operation exerts a considerable force on the work piece W which might cause separation of the fingers 51 and 52 of the work holder 21 and release or movement of the work piece. Accordingly, locking means 440 are provided to secure the fingers 51 and 52 against separation during the winding operation (see Figures 55, 56 and 57). Thus, a latch finger 615 is pivotally mounted on a pin 616 carried by the ram 194 and has an upward extension 617 terminating in an inwardly directed tooth 618. The tooth 618 has inclined lower surface 619 adapted to engage a correspondingly inclined surface 620 formed on the upper work gripping finger 51 when the ram 194 is near its upper position. This engagement prevents separation of the fingers 51 and 52 during the winding portion of the cycle of events. When the ram 194 is not near its upper position, the finger 617 is maintained in such position that the tooth 618 will freely pass the ends of the work holding fingers 51, 52. For this purpose a light spring 621, accommodated in suitable recesses, is interposed between latch finger 617 and the ram 194 and urges the latch finger outwardly about the pin 616 and against a stop 622.

An operating member 623 is provided for urging the latch finger 617 into engagement with the finger 51 when the ram 194 and the work holder 21 have moved up into forming position. Operating member 623 is pivoted at 624 to a bracket 625 attached to the outside upper portion of the housing 184. A clevis rod 626 is pivoted to the member 623 by a pin 627 and passes through a clearance hole in an upward projection 628 of the bracket 625. A compression spring 629 interposed between the member 623 and the projection 628 urges the member 623 inwardly. Such movement being stopped by a limiting nut 630 threaded on the outer end of the clevis 626. A cam surface 631 is provided on the inner face of the member 623 for engaging the upper end of the latch finger 617 when the finger 617 is near its upper position.

The locking means operates as follows: as the ram 194 moves upwardly from its lower position (Figure 55), the latch finger 618 passes between the operating member 623 and the outside ends of the fingers 51 and 52 of the work holder 21 (tooth 618 clearing the ends of the fingers 51 and 52), until the tooth 618 is slightly above the latching surface 620 on the finger 51, when the end of the finger 617 contacts the cam surface 631. At about this time the work piece W contacts the dies 605 and 606, swinging the work holder 21 and the work upwardly about the pivot pin 50. The arrangement is such that as the ram 194 moves to the upper limit of its stroke, the fingers 51 and 52 and the latch finger 615 also move upwardly, the cam surface 631 acting to force the finger 615 inwardly about the pivot 616 against the spring 621 so that the surface 619 of the tooth 618 is in wedging relation with the surface 620 to urge the fingers 51 and 52 together against the bottom of the slot 603. The spring 629 yields to allow the tooth 618 to engage the surface 620, the parts being so proportioned that when in locking position as shown in Figure 56, the spring 629 is not compressed, but exerts a force opposing movement of the clevis 626 to the right. This force opposes movement of the lever 617 to the right and maintains the surface 619 of the tooth 618 on the surface 620 and due to the inclination of these surfaces a wedging action results upon any tendency of the finger 51 to rise, thus securing the finger 51 against upward movement incident to the winding operation and clamping the inclined sides of the offset 8 against the correspondingly inclined portions of dies 605 and 606. To assist this clamping action each die 605 and 606 may be provided with a shallow groove 605—a for accommodating the inclined portion of the offset 8. When the ram 194 moves downwardly, the cam surface 631 is effective to maintain the tooth 618 on the surface 620 for a small portion of such downward movement, whereby latch finger 617 is effective to exert a positive downward pull on the work holder 21, to insure disengagement of the end of the coil 10 from the winding pin 561'.

The operations of stage D will now be described. The work piece W gripped by the work holder 21 is indexed into operation relationship with the mechanism constituting the stage, the ram 194 moves upwardly in response to rotation of the shaft 204 and cams 592, 593, to engage the work holder 21, such movement causing locking means 440 to lock the finger 51 and 52 against upward movement. This upward movement continues until the high portion of the cam 592 is reached by the follower 594 when the work will be positioned with its free and unformed end portion between the form 436 and winding pin 561' of the spindle 438. The spindle 438 at this time is revolving in coil forming direction, causing the winding pin 561' to wind the end portion of the work about the coil form 436 a desired number of turns, such winding movement exceeding the number of turns desired in the finished coil by an appropriate amount to allow for "spring back" in the coil. As before mentioned the high portion of the cam 592 is of such angular extent and so arranged as to maintain the ram 194 near its upper position during such winding, but to lower it substantially the height of the coil as the winding progresses. At the conclusion of the winding the direction of rotation of the spindle 438 is reversed due to the passage of the crank 446 over center, and the ram 194 starts its return stroke due to the rotation of the cam 592 causing the high portion of the cam to ride from under the cam follower 594. The cam 593 by its engagement with the follower 595 insures positive downward movement of the ram 194, such movement being imparted to work holder 21 by latch finger 617 to insure disengagement of the end of the newly wound coil from the pin 561'. The latch finger 617 releases the work holder 21 to allow the work holder to be supported by the bolt 57 on the stop 61 as in the preceding stages, the ram 194 continuing downwardly to clear the work holder 21 as it advances to the next stage and its place taken by the work holder from the preceding stage. At an appropriate time the direction of rotation of the winding spindle 438 is again reversed by passage of the crank 446 over the other center, so that the spindle 438 is again rotated in winding direction, and the operation is repeated when the next work piece W is indexed into position.

NIPPING OR TRIMMING STAGE

Stage E

It is not in general feasible to cut the stock to the exact length required for the finished article in the initial feeding and cutting operation; further, the winding mechanism previously described for forming the coils 9 and 10 on the end of the work piece W requires stock in excess of that wound into the coils, such excess stock forming tails on the coils for engaging the winding pins 561 and 561'. In the present article 1 it is required that there be no such excess stock, and that any excess stock be removed accurately so that the finished articles will meet close tolerances. Accordingly, the stage following the second winding stage D includes mechanism arranged to trim the ends of the coils, both ends being trimmed simultaneously in a single operation. This stage for performing such trimming operation is indicated by the letter E on the drawings. Thus, a pair of appropriately spaced fixed cutting members 645 and 646 are provided for cooperation respectively with the moving cutters 647 and 648 secured on the ram 195, the advance of the work holders 21 serving to successively position the work pieces W gripped by each holder in position to be trimmed by the next upward stroke of the ram 195. In order to eject the trimmings, an air jet is arranged to be operated as the ram 195 reaches the top of its stroke, to blow the trimmings into a suitable discharge chute leading away from the machine. This nipping mechanism is best shown in Figures 63 to 68 inclusive.

The ram 195 is guided for vertical reciprocating movement in the upper portion of a housing 185, as in the other stages, the lower portion of the housing rotatably supporting an operating shaft 205 as by anti-friction bearings 650, 651 and 652. The shaft 205 is rotated by a pinion 217 suitably secured on the inner end of the shaft and meshing with the gear 130 on the shaft 110, since a simple harmonic motion suffices for the cutting operation, the offset 211 of the shaft 205 is formed as a crank 653 operatively connected to the ram 195 by a connecting rod 654 and a wrist pin 655 in the ram 195. The cutters 647 and 648 are secured to the ram 195 as by being clamped respectively in the die blocks 657 and 658 secured on the ram 195 by plates 659 and 660. Each of the plates 659 and 660 has an upward extension 661 and 662 for a purpose to be presently described, and cross slot 663 is provided in the ram 195 to accommodate the work holder 21 when the ram is in its upper position.

The die block 657 has an upwardly projecting crescent shaped wall or mandrel 657—a defined by semi-circular surfaces 657—b and 657—c and adapted to enter between the first and second turns of the coil 9 of a work piece W in operative position in the stages upon upward movement of the ram 195 (see Figures 66 and 68). The wall surface 657—b is of such radius and so positioned as to engage a substantial portion of the inner periphery of the first or bottom turn of the coil 9, while the wall surface 657—c is arranged to embrace a portion of the outer periphery of the second turn of the coil 9. In this way the coil 9 is held against any lateral movement or distortion incident to the nipping operation by the cutters 645 and 646. There is no possibility of distorting the coil in a vertical direction since it is supported on the cutter 647 and the cutter 645 is so spaced with relation thereto as to have a shearing action. By the provision of such a shearing action, the end of the coil is left smooth and true after the tail has been trimmed therefrom. The other die block 658 has a similar projecting wall or mandrel 658—a, facing in the opposite direction for engaging the coil 10 of the work piece W for holding it laterally while the cutting operation is performed by cutters 646 and 648.

The fixed cutters 645 and 646 are secured in a tool holder 664, suitably secured to the under surface of the bracket 40, by the holding plates 665 and 666. The upthrust of the cutters 645 and 646 incident to a cutting operation is taken by the filler block or shim 667 (Figures 63 and 64), the cutters being adjustable downwardly to compensate for wear by the insertion of additional shims or a thicker block 667 between the ends of the cutters 645, 646 and the bracket 40. Each holding plate 665, 666 has a depending lip 669 and 670, the inner faces of which are aligned with the outer surface of the extensions 661 and 662 of the lower holding plates 659 and 660. The lips 669 and 670 are so arranged with respect to the extensions 661 and 662 that the faces of the lips respectively slidingly engage the surfaces of the extensions just before the actual trimming operation takes place thereby assisting in maintaining the cutters 645 and 646 in proper operative relation to the cutters 647 and 648 and assuring a smooth and accurate trimming of the coils 9 and 10.

This stage operates as follows: with work holder 21 indexed to position the work W in forming position with relation to the mechanism of the stage, the ram 195 moves upwardly bringing the portions or tails which are to be trimmed from the coils 9 and 10 of the work piece W into contact with the cutting edges of the cutters 647 and 648 respectively, as clearly shown in Figures 67 and 68. At the same time the fingers 51 and 52 of the work holder 21 and offset 8 are accommodated in the slot 663. Continued upward movement of the ram 195 to the upper limit of its stroke swings the work piece W and the work holder 21 upwardly about the pivot pin 50 until the cutters 647 and 648 meet the cutters 645 and 646, and cooperate to sever the tails. As shown in Figures 65, 67, and 68, the cutting edges of the cutters 645 and 647 are aligned, and it is to be understood that the cutters 646 and 648 are similarly arranged. After the cutting operation the ram 195 returns to its lower position freeing the work piece W and the work holder 21 for advance to the next stage.

It is obviously necessary to appropriately dispose of the material trimmed from the work pieces. For this purpose a chute 672 for conveying such trimmings away from the cutters, and means are provided for delivering the scrap material into the chute as it is severed. Thus, the die block 664 is provided with a port 673 having an upwardly directed seat 674 therein controlled by a spring pressed valve 675. The valve 675 has a downwardly extending stem 676 adapted to be contacted by the finger 52 as the work holder 21 approaches its upper position. The port 673 communicates with the small discharge ports 677 and 678 respectively adjacent the cutting blades 645—647 and 646—648, by way of transverse port 679. Air under pressure is supplied through a suitable conduit (not shown) and the passage 671 to the port 673 and above the valve seat 674 and is effective at all times to urge the valve 675 to its seat 674. A light spring 675—a may be provided to assist in maintaining the valve 675 in normal seated position.

As the work holder 21 approaches the upper limit of its movement in response to movement of the ram 195 and the trimming operation is being performed, the finger 52 contacts the valve stem 676 and unseats the valve 675, causing a blast of air to be discharged from the port 677 and 678. As soon as the ends of the work piece are severed, they are blown by this air into the chute 672 and thus removed. This action is illustrated in Figure 65 wherein the severed tails of the coils 9 and 10 are indicated by 9—b and 10—b. Substantial force is necessary to shear these tails, and after severance they tend to fly and become entangled in various parts of the machine. To appropriately restrict their movement and guide them to the chute 672, cavities are formed adjacent the cutters 645, 646 and 647, 648 to receive the severed pieces 9—b and 10—b and into which the ports 677 and 678 open respectively. These cavities 750 and 751 are formed by recesses in the bottom of the tool holder 664, the lugs 752 and 753 respectively on the holding plates 665 and 666 cooperating with the lip 754 on the tool holder 664 to direct the trim portions 9—a and 10—a to the chute 672 under the influence of air jets from the ports 677 and 678.

As the finger 52 moves downwardly in response to lowering of the ram 195, the valve 675 closes under the influence of the spring 675—a and the air pressure, and no more air will be discharged until the next trimming operation is performed.

Setting or Finishing Operation

Stage F

As pointed out in the general discussion of the article 1 which is formed by the various stages under discussion, it is necessary that the overall height from the bow or offset 8 and the outside faces of coiled springs 9 and 10, as well as the center distance between these coils meet close tolerances. Accordingly, after the trimming operation of stage E, which leaves the work piece W in a virtually completed state, the work piece is subjected to a seating operation which involves compressing the coils 9 and 10 in such a manner as to form seats 9—a and 10—a to the required flatness and angular extent. It is possible to vary the overall height of the spring 1 to a minor degree by slightly changing the angular extent of the seats. In this connection, it is to be understood that in the winding operations of stages C and D springs 9 and 10 are wound to have a height somewhat in excess of the desired height to provide for such pressing or seating.

For this purpose a pair of dies 680, 681 is provided having forming surfaces 682 and 683 thereon. Means are also provided forming die surfaces 684 and 685 for cooperating respectively with the surfaces 682 and 683. The die surfaces 682, 684 and 683, 685 are relatively movable. They are moved apart to permit the work holder 21 carrying the work piece W to advance to forming position and to be indexed to place the coils 9 and 10 between the respective surfaces 682, 684 and 683, 685 in substantially the same manner as previously described for stages B and E. The surfaces are then caused to approach to a predetermined separation, compressing the coils 9 and 10 to a predetermined height (see Figure 70). Figure 70 is shown without the work piece in place in order to better show the relationship of the die parts.

For properly locating the loops or eyes 11 and 12 of the coils 9 and 10 with respect to the die surfaces 682 and 683 one die surface of each pair, for example as 684 and 685 is provided with a pin 686, 687 adapted respectively to enter the eyes 11 and 12. To facilitate the entry of the pins 686 and 687 into the respective eyes 11 and 12, each pin 686, 687 has its outer end portion tapered or coned as at 688, 689. These conical end portions 688, 689 are adapted to pass entirely through the eyes 11, 12 and into the guide ways 690, 691 formed respectively in dies 680, 681. Thus, the eyes 11 and 12 are forced, by the approach of the dies to each other, onto the cylindrical portions of the pins 686 and 687 respectively. Furthermore, the parts are so proportioned and arranged that near the end of the seating operation these cylindrical portions enter the guide ways 690 and 691 which closely confine them. Thus the accuracy of location and consequently of the article, is assured.

The mechanism of this stage (stage F) will now be described, reference being had to Figures 69, 70, 70a, 71 and 72. The dies 680 and 681 are shown as being stationary, the means providing die surfaces 684 and 685 being movable with respect thereto for the seating operation. The stationary dies 680, 681 are formed as threaded pins, clamped into a die block 695 suitably attached to a mounting block 695—a secured to the gear case 38 of the machine by bolts 695—b. The outer end face of each die pin is appropriately formed and hardened, and constitutes the die surface 682 or 683 as the case may be. Each die 680 or 681 has flat surfaces as 696 by which the die is positioned with respect to the die surfaces 684 and 685. The die surfaces 682 and 683 are adjusted by nuts 697 which, in conjunction with the clamping member 695—c, serve to position the dies 680 and 681 both radially and axially with respect to moving the die surfaces 684 and 685 respectively, the working position of the latter not being adjustable.

The other die surfaces 684, 685 are formed on the upper ends of the pins 700 and 701 respectively. The pins 700 and 701 are freely slideable in suitable openings 700—a and 701—a formed in a die block 702 secured on the top of the ram 196, and are prevented from rotating in their openings as by being of square cross section. The pins 700 and 701 are urged upwardly in the die block 702 as by compression springs 704 and 705 accommodated in recesses 706 and 707 formed in the ram 196 and guided by pins 708 and 709 seated respectively in the recesses. The upward movement of each of the pins 700 or 701 is limited by the engagement of a lug 710 formed on each of the pins 700 and 701 with the upper face 712 of a recess 713 formed in the die block 702 to accommodate the lug 710 (see Figure 71). The downward movement of each pin 700, 701 during a forming, or seating, operation is limited by the engagement of the lower end of the pin 700 or 701 with the upper end of the corresponding guide pin 708 or 709 (see Figure 70).

The die block 702 is provided with a cross slot or recess 714 to accommodate the work holder 21, the upper edges of this slot being bevelled as 715 to provide clearance for the bowed or offset portion 8 of the work piece W.

The ram 196 is guided for vertical movement in the upper portion of a housing 186 and carries a wrist pin 718. The operating shaft 206 is rotatably supported in the lower portion of the housing 186 by anti-friction bearings 719, 720, and 721. The shaft 206 is driven by a bevel pinion 218 keyed on its inner end and engaging the gear 130 on the shaft 110. The offset 212 of the shaft 206 is formed as a simple crank 722 joined to a wrist pin 718 carried by the ram 196 by a connecting rod 723.

The setting mechanism operates as follows: With the ram 196 in its lower position, sufficient clearance between the dies 680, 681 and 700, 701 is provided to allow the work holder 21 and the nearly completed work piece W to advance to forming position between the dies. As the ram 196 moves upwardly, the lower finger 52 of the work holder 21 is accommodated in the slot 714 and the die surfaces 684 and 685 of the dies 700 and 701 engage the bottoms of the inner convolutions of the coils 9 and 10, that is, the portion of the coil which forms the seat as at 9—$a$ and 10—$a$, moving the work piece and the gripping means upwardly about the pivot pin 50, and bringing the upper ends of the coils 9 and 10 against the die surfaces 682 and 683 respectively. Continued upward movement of the ram 196 will cause the portion of the coils 9 and 10 designated as 9—$a$ and 10—$a$ to deflect against the die faces 684 and 685 to form a partial seat, the dies 700 and 701 being restrained from movement with respect to the ram 196 by the resistance of the springs 706 and 707. Further movement of the ram 196 forces the pins or dies 700, 701 downwardly against the springs 706 and 707 until stopped by engagement of the dies 700, 701 with the pins 708 and 709. Up to this point, deflection of the coils 9 and 10 has acted as a steadying agent for seat portion of coils 9—$a$ and 10—$a$. Further upward movement will now cause the die surfaces 684, 685 to compress the coil portion 9—$a$ and 10—$a$ against the die surfaces 682 and 683 to a height determined by the separation of these surfaces, such height resulting in the required flat seat of required angular extent. As previously mentioned, the surfaces 682 and 683 are adjustable toward and away from their cooperating surfaces 684 and 685, whereby the finished heights of coils 9 and 10 and the angular extent of the seats 9—$a$ and 10—$a$ may be altered to a limited extent. Retraction of the ram 196 from its upper position allows the work holder 21 to return so that it is supported by the stop 61 as in the preceding stages and withdraw the dies 700 and 701 and the die block 702 to permit advance of the work holder to the next stage, and a succeeding work piece W to be indexed into the seating stage.

The operation of the machine as a whole may now be described. With the prime mover or motor 144 energized, the jack shaft 134 will be rotated by means of the pulley 143, belt 142 and the clutch pulley 141, assuming that no mishap such as an improperly formed piece of work W, has occurred to cause the safety clutch 162—163 of the pulley 141 to slip. The rotation of the jack shaft 134 is imparted by mitre gears 291 and 292 to the auxiliary drive shaft 287 which operates the feeding and cutting mechanism adjacent to stage A; by the worm 133 to the worm gear 132 and to the main shaft 110; and by the worm 443 to the worm gear 444 which operates the coil winding mechanism of stages C and D. The rotation of the shaft 110 causes the cam 108 secured thereon to rotate with it, the rotation of the cam 108 serving to actuate the timing or indexing mechanism T which causes advance of the work holders 21 by angular increments about the axis 22 to advance the work W gripped by the work holders to cooperative relationship with the successive forming stages. The rotation of the shaft 110 is also imparted simultaneously to all of the operating shafts 201, 202, 203, 204, 205 and 206 of the forming stages A, B, C, D, E and F respectively by the bevel gear 130 on the shaft 110 meshing with the bevel pinions 213, 214, 215, 216, 217 and 218 respectively on operating shafts 201, 202, etc. The operation of the indexing mechanism is accurately controlled by the cam 108, and as this cam is in fixed angular relationship with respect to the operating shafts 201, 202, etc., the movements of the rams 191, 192 etc., controlled by their respective operation shafts 201, 202, etc., bear a fixed and definite relationship to the movement of the work holders 21. Thus, by appropriate adjustment it is possible to have the work W properly positioned for the successive forming operations by the rams 191, 192, etc.

The manner of such adjustment or timing contemplates that all of the rams be at substantially their lowest positions when the indexing or advance of the work holders occurs, to insure adequate clearance as the work holders enter and leave the forming stages. In the case of the cam actuated rams, an appropriate period of dwell at the top and bottom of the stroke is provided by the contour of the cam. In the crank operated rams the movement near the ends of the stroke is very small compared to the angular movement of the crank, and it is possible to position the cranks so that they are a substantial distance off dead center without elevating the ram sufficiently from its low point to interfere with the advance of the work holder. Since in the crank operated stages (stage B, stage E and stage F) operations are performed which require the exertion of considerable force by the ram it is desirable to stagger the cranks operating these stages in order to distribute the load on the machine to some extent and to provide smoother operation. Thus, the cams are all arranged so that their mid points all reach the top center at the same time, and the crank operating the nipping stage (stage E) also reaches the top center at this time. However, the crank operating the offset forming stage (stage B) is timed late so that it does not reach its top center until the cams and the crank of stage E have passed about 15° to 18° beyond the center. Similarly the crank of the setting stage (stage F) is timed early so that it reaches its top center about 15° in advance of the cams and the crank of stage E. In this way the load on the drive mechanism is distributed over a substantial angle instead of being concentrated at one point.

The rotation of the auxiliary shaft 287 causes, by engagement of the worm 286 with the worm wheel 283 continuous rotation of the feed roll 270 and the cam 358 operating the cut-off mechanism 325. When the machine is in operation, the work holder 21 advancing from stage F to stage A carries a completed article 1 which must be ejected before the work holder 21 can be loaded with the stock 19 or work piece W for another article. Thus, the ram 191 is moved to the upper end of its stroke separating the fingers 51 and 52 of the work holder 21 to release the finished article 1 and operating the ejecting fingers 263 to positively remove the article 1 from between the fingers. At about this time, rotation of the feed roll 270 has carried the cam surface 273 out of contact with the pressure roller 272, so that the pressure roller urges the stock 19 against the feed roll, and the stock 19 is advanced toward the work holder 21 in stage A and between the fingers 51 and 52 thereof. Continued rotation of the feed roll 270 will cause the advancing edge of the cam surface 273 to engage the pressure roller 272 after a predetermined angular movement of the feed roll 270 corresponding to a definite length of the stock 19 (forming a work piece W). This urges the feed roller 272 out of contact with the stock 19 and causes the brake mechanism 308 to engage the stock and prevent its further advance as well as to hold it against movement backward, due to its resilience. Further rotation of the feed roll 270 causes the adjacently mounted cam 358 to operate the cutting mechanism 325, to sever the work piece W from the stock 19. Immediately preceding the cut off, but following the completion of the feed, the ram 191 starts downward allowing the finger 51 to move downward and grip the work piece W against the finger 52 in response to the force of the spring 60, and allowing the ejecting fingers 263 to return to their initial positions. Further downward movement of the ram 191 serves to withdraw the die 231 out of the way of the work holder 21 which together with the work piece W is now indexed ahead to operative relation with stage B, a succeeding work holder 21 together with a finished article 1 gripped therein being advanced into stage A where the article 1 is ejected as before and the holder loaded with a new work piece W.

When the work W gripped in the work holder 21 is indexed to the operation position in stage B, the ram 192 moves upwardly and causes the dies 405, 406 to force the opposite end portions of the work piece W upwardly about the upper finger 52 of the work holder, which is restrained against upward movement. After a predetermined movement these end portions contact fixed die surfaces 419 and 420 which bend them down into alignment. After formation of this offset 8 the ram 192 is retracted to clear the work holder 21, which is indexed ahead to stage C wherein one of the coils as the left hand coil 9 is formed on the work piece W.

As described in detail in connection with the winding operation, stage D, rotation of the gear 444 serves to impart oscillatory motion to the winding spindles 437 and 438. Each spindle rotates a definite number of revolutions in winding direction to properly wind the coil and then reverses and rotates the same number of revolutions in the opposite direction to its initial position for each revolution of the gear 444. The winding motion must be accurately timed as to its starting and to its termination to properly form the coil, but the reverse motion is of no use except initially to free the winding pin 561 carried by the spindle 437 from the newly wound coil. In the example under consideration, the coils at the opposite ends of the article 1 are identical, hence the motions of the spindles are identical, but it is to be understood that this is not necessarily the case, as either could be appropriately varied.

With the work piece W indexed into operative position in stage C the ram 193 is moved upwardly, positioning the winding form 435 adjacent the work piece W, causing the lock means 439 to lock the fingers 51, 52 of the work holder 21 together and swinging the fingers 51 and 52 and the work W upwardly about the pin 50 to position the work in proper relation with the spindle 437 which is now rotating in winding direction. The cam means 209 on the operating shaft 203 maintains the ram 193 appropriately near its upper position until the winding operation is completed, when the cam means 209 positively pulls the ram 193 downwardly. This downward movement for a short distance is imparted to the work holder 21 by the lock 439, the work holder pulling the finished coil away from the winding spindle. This is facilitated by the reverse rotation of the spindle after completion of the coil, such reverse rotation serving to free the winding pin 561 from the free end of the coil 9 as it springs back due to the resilience of the stock W.

The work holder 21 with the work W with the coil 9 formed on the left hand end is now indexed ahead to stage D. As previously pointed out, the mechanism of this stage is substantially identical with the mechanism of stage C and functions in the same way. Thus, with the work piece W held in operative relation to the mechanism of this stage by the work holder 21, the ram 194 is moved upwardly bringing the winding form 436 adjacent the work piece W, locking the fingers 51 and 52 of the work holder 21 together by lock means 440 and swinging the fingers upwardly to position the work in winding relation to the rotating spindle 438. This rotates to wind the right hand coil 10; after rotating to wind the required number of turns, the direction of rotation of the spindle is reversed and the ram 194 is moved downward, freeing the newly wound coil 10 from the winding spindle 438 and positioning the work holder for advance to the next stage (stage E) where the surplus material is trimmed from the ends of the coils 9 and 10. It is to be understood that in the present case, the axes of the eyes 11 and 12 are, at this point in the required relationship with each other and with the bow or central member 8 of the article 1.

When the work holder 21 is indexed to operating position in stage E, the work piece W is correctly positioned with respect to the cutting means for properly trimming both ends of the work piece W. The ram 195 carrying the cutter blades 647 and 648 lifts the work piece W so that the free ends of the coils 9 and 10 are clipped off respectively by engagement of the blade 647 with the blade 645 and the blade 648 with the blade 646. As these blades perform the cutting operation the air valve 675 is opened, causing a blast of air to be discharged from the ports 677 and 678 blowing the severed ends into the chute 672. After the trimming operation, the ram 195 descends and the work holder 21 is advanced to the next stage, stage F.

With the work holder 21 indexed to operating position in stage F, the ram 196 is moved upwardly causing the pins 686 and 687 to enter the eyes 11 and 12 of the coils 9 and 10 respectively. Also the coils 9 and 10 are compressed respectively between the die surfaces 682, 684 and 683, 685 to a predetermined height to form the seats 9—a and 10—a. Since that portion of the coil 9, 10 engaging the die surface 684, 685 is at a distance from the bow 9 accurately determined by the forming of the bow or offset 8 in the stage B in conjunction with the correct forming of the helix of coils 9, 10 in subsequent winding stages, the accurate seating of the coil portions 9—a and 10—a serves to accurately determine the overall height of the article 1 from the face or seat of the coils 9—a, 10—a to the bow 8. As pointed out in the general discussion of the article 1, this dimension must meet close tolerances. This step completes the forming operations on the work piece W and results in the finished article 1, which is retained in the work holder 21 and indexed ahead to stage A where it is ejected, as described in connection with the loading operation of that stage.

Since the forming press is designed for continuous operation and many of the parts move at high speed, a circulating oiling system is provided for continuously supplying lubricant to the moving parts. For this purpose, a conventional rotary pump 730 (Figures 13, 15, 16, and 17) is arranged to be driven by one of the operating shafts, for instance operating shaft 206 of the stage F, through a suitable coupling 731. The pump 730 discharges through a flexible conduit 732 into the top of the gear case 38 as by a connection 733 extending through the gear case cover 149 (see Figure 13). The lubricant thus discharged falls onto the gear 453 which by its rapid oscillatory motion distributes the lubricant throughout the housing 38 in the form of a fine spray or mist. The lubricant collects as a liquid on the bottom of the gear case 38 from where it freely drains through an outlet connection 734, through the conduit 735 connected therewith and a T connection 736. One branch 737 of the T 736 leads into the lower portion of the housing of one of the forming stages, for instance the housing 186 of stage F. The other branch 738 of the T 736 is connected with the intake of the pump 730 by a conduit 739 (see Figure 15). The arrangement operates as follows: The housings 181, 182, 183, 184, 185 and 186 together with the space 740 formed by the hexagonal member 33 are filled with lubricant at an appropriate level such as indicated by 741 through a suitable filler opening 743 (Figure 14). Upon operation of the machine, a certain proportion of this lubricant will be extracted by the pump 730 through the conduit 734 and circulated through the conduit 732, housing 38, and conduit 735 back to the housing 186, it being noted that the spaces within the housings 181, 182 etc., and space 740 are in free communication with each other. Thus the level of the lubricant in these housings and the space 740 will be lowered below the point at which it stands with the machine not running by the amount circulated through the housing 38, but will remain substantially constant at such lower point. The rotation of the operating shafts 201, 202, etc., serves to distribute the lubricant over the operating parts of the forming mechanisms, while the operation of the pump 730 will also impart some turbulence and circulation to this body of lubricant. The lubricant may be drained from the machine by a conduit 742 leading from the space 740 to a desired point and provided with a suitable closure 744 (Figure 15).

As has been mentioned previously it is intended to have this machine optionally adaptable to form modified forms of springs or other articles from stock which the machine is capable of handling. It is contemplated that machines embodying many or all of the features, modes of operation and such can be designed and built to form articles quite different from the one so far described, and it is of course the intention that such machines fall within the purview of the present specification and claims. However, what is referred to at the present time is the adaptation of a machine arranged to produce a particular article to produce another article differing in important characteristics therefrom, by the removal of certain operating parts and their replacement with others, and/or the rendering of one or more forming stages inactive. In this way, the same machine may be arranged to form a wide variety of articles.

Figure 5:
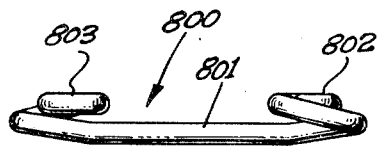
Figure 5 is a view similar to Figure 2, showing a modified form of spring fastening element.

Thus, for example, it may be desirable to produce a spring fastening element similar to that shown in Figures 1 to 5 but wherein the offset or bowed portion 8 is of different proportions. For instance a spring element may be desired in which the length or depth of the offset, or both, are different. Within certain limits, a spring element in which the offset 8 has different dimensions and in which the general shape of the bow, such as the inclination of the sides is different, may be formed by substituting appropriately formed die members in the offsetting stage B for those shown therein in Figures 45–49, and by installing new gripping fingers appropriately formed to accommodate the different offset in place of the fingers 51, 52, and by substituting appropriate parts for those in other of the stages which engage the sides of the bow. In the event that the desired bow is quite long or non-existent, or even extremely shallow so that the spring element is practically straight between the coils, it will be difficult to use the type of gripping means so far disclosed, since in this form the sides of the offset are relied on to maintain the work piece W against longitudinal movement between the fingers during the forming operations. By way of example a modified form of spring fastening element 800 having no offset portion, is shown in Figure 5. Therein it will be seen that the intermediate portion 801 which joins the coiled or spring portions 802 and 803 is substantially straight. A spring element of modified form such as shown in Figure 5 is intended for use in an application similar to that of the other form of spring element disclosed, but in which the height of the rotating fastening element and possibly other dimensions have been modified to suit a different environment. Thus, when a spring element of such form is to be made, a modified form of gripping mechanism or work holder, indicated generally by 815 disclosed in Figures 73, 74, 75, 77, 80 and 81 is used in place of the gripping means 21 including fingers 51 and 52 and previously discussed. Additionally a modified ram 816 and operating cam 817 therefor, and a somewhat different work ejecting mechanism 818 arranged to cooperate with the modified work holder 815 are substituted for the previously described corresponding parts in the loading stage A. This work holder includes a pair of relatively slideable fingers having jaws between which the work piece is normally gripped with sufficient pressure so that the work piece is adequately secured by friction against longitudinal movement due to forces exerted in the subsequent forming operations. Means are provided whereby upward movement of an auxiliary ram 819 serves to urge these jaws apart to permit removal of a finished work piece by the continued upward movement of the main ram 816 and ejecting mechanism 818 and insertion of a piece of stock to be formed by the previously described cutting and feeding mechanism. However, since it is necessary in this type of work holder for the ram to lift the finished work from the work holder after the grip is released, the auxiliary ram 819 is movable independently of the ram and provides for operating the work holder to free the work.

Referring to Figures 73, 74, 75 and 76, the work holder 815 includes a main finger 821 secured to the sleeve 43 so as to be advanced thereby into operative relation with the forming dies of the different stages. The finger 821 is attached to the fulcrum block 47 on the sleeve 43 by a pin 822 for free limited movement in a vertical direction in response to movement of the particular ram with which the finger is in operative relation. A clamping finger 823 is slideably secured to the finger 821 as by dovetails 824 (see Figure 76) for movement in a direction transverse to that in which the work holder advances. The main finger 821 is provided with a jaw forming surface 825 extending transversely of the finger near its outer end from the opposite sides of the clamping finger 823. The finger 823 is T-shaped in plan as clearly shown in Figure 75, the head 826 of the T being formed by thin extensions 827 and 828 extending from opposite sides of the finger and overlying the outer end of the finger 821 which is of reduced thickness (see Figure 74). The head 826 is provided with a jaw surface 829 opposite the jaw surface 825, the jaw surfaces 825 and 829 and the portions of the fingers between them cooperating to form a groove 830 for accommodating the work piece W when the clamping finger 823 is moved inwardly along the main finger 821, the jaw surface 829 approaches the jaw surface 825 and clamps the work piece W between them. Means are provided for normally urging the fingers to clamping position, and for releasing them at the proper time. To insure proper holding of the work piece by these jaw surfaces, these surfaces incline downwardly away from each other so that the groove 830 is wider at the bottom than at the top.

A bell crank 832 is provided for moving the clamping finger 823 to and from clamping position, and is pivotally mounted on the finger 821 by a pin 833 the bell crank 832 being accommodated in a longitudinal slot 834 formed in the finger. The bell crank 832 has a short upwardly directed arm 835 terminating in a rounded surface which engages a suitable slot 837 formed in the underside of the finger 823. The other arm 838 of the bell crank 832 extends generally horizontally and inwardly of the finger 821 terminating near the fulcrum block 47. A compression spring 839 is interposed between the inner end of the arm 838 and the flange 63 urging the bell crank 832 in a counterclockwise direction about its pivot 833 and urging the finger 823 inwardly of the finger 821 so that the jaw surface 829 approaches the jaw surfaces 825, clamping the work piece W between them. Since the arm 838 is several times as long as the arm 835, the spring 839 is enabled to exert a substantial force urging the jaws together, which results in firmly holding the work piece against longitudinal displacement.

The spring 839 is appropriately guided by a headed pin 840 the lower end of which passes through a clearance hole 841 in the end of the bell crank 832. The upper end of the pin 840 carries a convex head 842 which engages a suitable depression formed in the flange 63. As the work holder 815 swings about its pivot 822 the pin 840 rocks on its head 842 in depression 843, the hole 841 providing sufficient clearance to accommodate the angular movement of the outer end of the pin 840. The spring 839 also urges the assembly 815 downwardly about the pivot 822, such downward movement being limited by the engagement of the underside of the finger 821 with the edge of the block 47 as indicated at 844, Figure 73.

The ram 816 has a die 820 secured on its upper face (to be described in more detail presently) and is moved vertically in a positive manner by the cam sections 850 and 851 of the cam 817 cooperating respectively with cam followers or rollers 852 and 853 respectively on the ram 816. These cam sections are arranged to maintain the ram 816 at the top of its stroke for approximately 180° (see Figure 74). The supplemental ram or plunger 819 is moved independently of the ram 816 by means of the cam section 854 on the cam 817, and a follower 855 on the plunger. As clearly shown in Figure 75 the plunger 819 is of rectangular cross section and is accommodated in a rearward extension 181—a of the ram guide 181. The plunger 819 is hollow at 856 for the reception of a compression spring 857, confined between a finger 858 mounted on top of the ram 816 and projecting into the plunger 819 through an opening 859 in one side thereof, and a surface at the lower end of said hollow portion 856. The upper end of the plunger 819 has a rounded projection 861 adapted to engage the bell crank 832 upon appropriate travel of the plunger 819.

The ejecting means 818 is quite similar to the first described form of ejecting means 243 and is clearly shown in Figures 73, 74 and 77. This ejecting means 818 is formed as a unit as before being mounted on a bracket 865 similar to the bracket 245 and adapted to be secured in position on the skirt 77 by cap screws 246 and comprises a body portion 867 pivotally mounted on the bracket 865 by a pin 868. At the opposite ends of the body 867 are ejecting members 869 in the form of bell cranks, also pivoted on pin 868, adjustably secured to the body member 867 through slotted holes 872 by locking bolts 873. Extending downwardly to a point adjacent to the work holder 815 are ejecting arms 870. One end of an operating link 875 is pivoted to the body 867 by a pin 876, the other end being joined by a pin 877 to an operating member 878. Operating member 878 is pivotally supported on a block 879, forming an extension of the bracket 865, by a pin 880. The block 879 also forms a stop providing a surface 861 for limiting upward movement of the assembly 815. The operating member 878 carries a lug 882 adapted to be engaged by the upper surface of the die 820 on the ram 816 as the ram approaches the upper limit of its movement.

The compression spring 878—a serves to swing the ejecting means 867 including arms 870 counterclockwise about the pin 868 in substantially the same manner as in ejecting means 243, such movement being stopped by the engagement of one of the ejecting arms 870 with a shoulder 883 on the block 879. When the ram 816 approaches the upper limit of its stroke the die 820 engages the lug 882, further upward movement of the die 820 swinging the member 878 upwardly and causing the arms 870 to sweep outwardly adjacent the sides of the work holder 815, as shown in Figures 78, 80. When the ram moves down, the member 878 follows it down under the influence of the spring 878—a, causing the extensions 870 to swing inwardly (Figure 81) to their normal position (Figure 73). It will be noted, by reference to Figures 74 and 77, that the operating member 878 is placed unsymmetrically with respect to the ejecting member 867 and the bracket 865. The reason for this will appear from the discussion of the ejecting and loading operations of this form of the invention which follows, reference being had particularly to Figures 74, 78, 79, 80 and 83.

The work holder 815 is indexed into operative position with the ram 816 by movement from the left, referring to Figure 83. In this position the fingers 821 and 823 are directly above the slot 896 of the die 820, and the coils 801 and 802 are above the lugs 897 and 898, thus as the ram 816 rises to the limit of its movement, the fingers 821 and 823 are accommodated in the slot 896 so that they are not affected by movement of the ram, the lugs 897 and 898 respectively engaging the coils 801 and 802 and lifting the finished spring element 800 clear of the groove 830, for removal by the ejecting means 867. The lug 882 for operating the ejecting mechanism is in the path of movement of the finished work piece. By placing it on the right hand side of the mechanism, it does not interfere with the advance of the work from the left into operative relation with the ram. The finished work piece leaves the ram in a transverse direction, thus avoiding the lug 882, while the new stock is in grooves 899 and 900 and thus below it.

As the cam 817 rotates clockwise from the position of Figure 74, the ram 816 and the plunger 819 move upwardly together since the respective cam followers 852 and 855 are engaged by the coextensive portions 890 of the cams 850 and 854. The upward movement of the plunger 819 brings the projection 861 on top thereof into contact with the arm 838 of the bell crank 832, continued upward movement of the plunger 819 serving to swing the work holder 815 upwardly about the pin 822 against the force of the spring 839 until the upper surface of the finger 821 engages the surface 881, further upward movement swinging the bell crank 832 clockwise against the force of the spring 839 and thereby moving the clamping finger 823 outwardly of the finger 821 to release the work piece W from between the jaws 825 and 829.

As indicated in Figures 78 and 79, the lifting portion of the contour 890 which lies on the cam 854 is so proportioned as to terminate after such movement of the finger 823, changing to a substantially circular contour to maintain the jaws 825 and 829 in their open position. However, the cam contour 850 continues as indicated at 850—a so that continued clockwise rotation of the cam 817 imparts additional upward movement to the ram 816. The purpose of this movement after release of the work piece is two fold: it lifts the work piece out of the groove 830 so that it may be ejected by movement of the ejecting arms 870 past the work holder, and it serves to cause such movement of these fingers as just described. Figure 78 shows the work piece W as lifted clear of the groove 830 by engagement with the upper surface of the die 820 (see Figure 83) and the ejecting arms 870 have just started their ejecting movement. The corresponding positions of the cam 817 and the cam followers are shown in Figure 79. Therein the cam follower 855 of the plunger 819 has just left the lifting portion of the contour 890 and moved onto the holding contour of the cam 854, while the cam follower 852 of the ram 816 is still on the lifting contour 850—a, so that further rotation of the cam 817 will provide the additional upward movement required of the ram 816 to swing the ejecting arms 870 to the position of Figure 80 and complete the ejection of the finished work piece W. Further rotation of the cam 817 will cause the cam follower 852 to engage the substantially cylindrical holding contour of the cam 850. Both holding contours of the cams 850 and 854 extend substantially 180°, so that after the ram 816 and the plunger 819 reach the upper limits of their respective strokes, they remain there or "dwell" for substantially a half revolution of the cam 817, during which time the loading of the work holder 815 with a fresh piece of stock is accomplished. This loading is accomplished by the same mechanism and in a generally similar manner to that previously described.

The die 820 (see Figures 73, 74 and 77) comprises a generally rectangular block suitably secured to the top of the ram 816 and provided with a deep central transverse slot 896 for accommodating with suitable clearance the work holder 815 when the ram is near the upper end of its stroke. The opposite ends of the die 820 are provided with upwardly extending lugs 897 and 898 which are adapted to engage under the coils 801 and 802 of the finished work piece 800 and raise the work from the slot 830 preparatory to ejectment (see Figure 83). Since the loading operation of the work holder 815 involves a longitudinal insertion of the new work piece W into the groove 830, and since the plunger 819 must be in its upper position to maintain jaws 825 and 829 apart for the reception of the new work piece, provision must be made for passing the work piece through lugs 897 and 898. For this purpose grooves 899 and 900 are provided respectively in lugs 897 and 898, these grooves being in substantial alignment with the groove 830 between the jaw surfaces 825 and 829 (see Figure 75). These grooves 899 and 900 provide ample clearance for free passage of the work piece; at the same time they serve to support it and guide it appropriately with respect to the groove 830. To facilitate entry of the work piece, the groove 899 is provided with a bell shaped mouth 901.

As was previously mentioned approximately 180° of dwell is provided by the cam 817 during which the ram 816 and the plunger 819 remain at the top of their stroke to permit the loading operation. Figures 81 and 82 illustrate the relative positions of the parts while the ram 816 is still at the top of its stroke, the plunger 819 having been lowered sufficiently to cause the return of the finger 823 to its initial position with respect to the finger 821, that is with the jaws 825 and 829 clamping the work piece W. Thus, continued clockwise rotation of the cam 817 after the cam followers 852 and 855 are respectively on the circular cam contours 850 and 854 will maintain the ram 816 and the plunger 819 at the top of their respective strokes until the portion 903 of reduced radius of the cam 854 passes under the cam follower 855. This allows the plunger 819 to move downwardly under the influence of the spring 856 until the upper end of the opening 859 engages the finger 858 (see Figure 81). The parts are so proportioned that although in this position the fingers 821 and 823 are supported by the plunger 819 engaging the bell crank 832, sufficient pressure is exerted by the spring 839 to effectively clamp the work piece between the jaws 825 and 829. It is substantially at this point that the work piece W is severed from the stock 19 substantially as in the previously described form of stage A. Continued clockwise rotation of the cam 817 from the position of Figure 81 will first cause the cam follower 852 to engage the retrograde surface 906—a of the cam 850, causing the ram 816 to move down with respect to the plunger 819, which is still held against downward movement by contour 903, until the follower 855 leaves the contour 903 and engages the retrograde contour 906 of the coextensive surfaces 890. The ram 816 and the plunger 819 will now be in their original positions with respect to each other and will move downwardly in this relation to their initial position of Figure 73, since the cam followers 852 and 855 are on the same cam contour 906. The cam 851 and its follower 853 serves to positively move the ram 816 downwardly; this cam is so proportioned with respect to the cam 850 that the ram 816 is positively positioned at all times.

The general mode of operation of a forming press utilizing the modified form of the work holders just described, in the event the same forming steps are required, is of course the same as in the first described form. Thus, it is to be noted that a tooth 908 is provided on the work holder 815 for cooperation with the locking means 439, 440 in the winding stages C and D in the manner heretofore discussed. However, in the present variant shown in Figure 5, no offset is provided. Thus, the forming operation performed by the stage B is not required, and is simply rendered inoperative in any convenient manner, for example by removing the ram 192. Thus, the work piece after loading is indexed into operative position with stage B as before, but leaves it in the same condition as when it entered.

I claim:

1. In indexing mechanism, an advancing member and a driven member, latch means for preventing movement of the driven member, means forming a one way clutch between the advancing member and the driven member, means for cyclically imparting restricted movement in one direction to the advancing member, energy storing means energized in response to said movement of the advancing member, said one way clutch being arranged to be disengaged in response to such movement, and means whereby said one way clutch means disengages said latch at the end of said movement, said one way clutch operatively connecting said members for movement upon reverse movement of said advancing member in response to the energy storing mechanism, whereby said energy storing mechanism is effective to advance the driven member.

2. In indexing mechanism, an advancing member, a stationary member and a driven member, a gear wheel engaging said advancing member and said stationary member, and disposed between them for movement in a planetary manner, means positively urging said gear wheel to advance between said members whereby movement is imparted to the advancing member, resilient means energized by the advance of the gear wheel, means permitting said gear wheel to return to its initial position in response to the energy stored in said resilient means, whereby movement in the opposite direction is imparted to the advancing member, and means whereby said last mentioned movement is imparted to said driven member.

3. In indexing mechanism, a driving member, an advancing member, and a driven member, means whereby said driving member cyclically imparts limited movement from a definite starting point to said advancing member, energy storing means energized by said movement of the advancing member and operative to return said member to its starting point in response to movement of the driving member, latch means for securing said driven member against movement, means adapted to operatively connect said advancing member and said driven member whereby movement of the advancing member towards its starting point is effective to move the driven member, and means whereby said connecting means acts to release said latch means.

4. In indexing mechanism, a driving member, an advancing member, and a driven member, said members being arranged concentrically with respect to each other, cam and lever mechanism operated by the driving member for positively imparting limited movement in one direction from a definite starting point to the advancing member, energy storing means energized in response to movement of the advancing member in said one direction and effective to return said member to its starting position in response to movement of said cam, latch means for securing said driven member against movement, means on said advancing member adapted to operatively connect said advancing member and said driven member for movement together during return movement of the advancing member, said connection becoming effective at the end of the movement of the advancing member from starting position, and means whereby movement of the connecting means to operatively connect said members serves to release said latch.

5. In indexing mechanism, a rotatable driven member having means forming angularly spaced teeth thereon, an oscillatable advancing member, a pivoted dog on said member adapted to engage successively with said teeth upon movement of said advancing member in one direction for advancing said rotatable member in accordance with the movement of said advancing member, a pivoted latch for engaging said teeth and securing the driven member against movement, interengageable means respectively on said dog and said latch said means being adapted to engage when said dog is out of engagement with said teeth and when the advancing member is near one limit of its movement, movement of said member to the said limit permitting said dog to move into engagement with a tooth, said engaging means causing the dog upon movement into engagement with a tooth to free the latch from tooth engagement to permit movement of the driven member by said dog and said advancing member.

6. In cutting and feeding mechanism for providing work pieces from continuous stock, a rotatable member, means exerting a force resiliently urging said stock against the periphery of said member, whereby rotation of said member advances the stock, means operated by said member upon a predetermined rotation of said member for releasing said force, means operated in response to operation of said force releasing means to secure said stock against movement, and cutting means operating on said stock while secured against movement.

7. In cutting and feeding mechanism for providing work pieces from continuous stock, a rotatable member, means exerting a force resiliently urging said stock against the periphery of said member, whereby rotation of said member advances the stock, means operated by said member upon a predetermined rotation of said member for releasing said force, means operated in response to operation of said force releasing means to secure said stock against movement, and means operated in response to rotation of said member for cutting said stock while secured against movement.

8. In cutting and feeding mechanism for providing work pieces from continuous stock, a rotatable member having a circular surface for engaging said stock, a pressure member resiliently urged toward said surface for urging said stock against said surface, whereby rotation of said rotatable member advances the stock, means forming a cam surface on said rotatable member for engaging said pressure member after a predetermined angular movement of the rotatable member and urging said pressure member away from said surface to release pressure on the stock, brake means operated in response to movement of said pressure member away from the rotatable member to hold the stock against movement after release, and means for cutting the stock while so held.

9. In cutting and feeding mechanism for providing work pieces from continuous stock, a rotatable member having a circular surface for engaging said stock, a pressure member resiliently urged toward said surface for urging said stock against said surface, whereby rotation of said rotatable member advances the stock, means forming a cam surface on said rotatable member for engaging said pressure member after a predetermined angular movement of the rotatable member and urging said pressure member away from said surface to release pressure on the stock, whereby advance of the stock ceases, means for cutting the stock while stationary and operated in response to rotation of said rotatable member, and means for adjusting said cam surface to alter the length of the cut stock.

10. In mechanism for intermittently advancing continuous stock, a rotatable member having a circular surface, an arm carrying a pressure member pivotally mounted for movement toward and away from said surface, and resiliently urged toward said surface for pressing the stock thereagainst, whereby rotation of the rotatable member advances the stock, means forming a cam surface on said rotatable member for forcing the pressure member away from the circular surface and releasing the stock therefrom, and an extension on said arm over which the stock is adapted to pass, movement of said arm in response to movement of the pressure member away from the rotatable member causing said extension to exert a braking force on said stock to restrain the stock against movement.

11. In a forming press, a work holder comprising a pair of fingers for gripping a work piece, said fingers being mounted at their inner ends for pivotal movement with respect to each other, and having respectively opposed work engaging faces adjacent their outer ends, means urging said fingers to bring the faces toward each other to grip the work piece, the work piece when gripped lying in a plane substantially normal to the direction of relative movement of the fingers, one of said faces having a transverse groove extending across the face for engaging the work piece, said groove having extensions on the sides of the finger adapted to be engaged by the work piece after a forming operation for securing the work piece against movement with respect to said fingers.

12. In a forming press, a pair of relatively movable fingers having jaws adapted to grip the work between them, means urging the fingers to cause the jaws to grip the work, a pivoted arm adapted to be positioned on one side of said fingers, a link for swinging said arm about its pivot, and means for moving one of said fingers to release the work, said finger in response to such movement engaging said link and causing said arm to swing past said jaws and eject the work from between the jaws.

13. In a forming machine, means for winding a coil, means supporting stock for forming said coil so that an end portion thereof is free, a winding form, a winding pin spaced from the axis of the form and rotatable about said form, the axis of rotation of the winding pin being substantially parallel with the axis of the form, said support means, said winding pin, and said form being relatively movable, means for moving said support means and said form so that said free portion of the stock is engaged on opposite sides by the form and by said winding pin respectively and at points spaced from its end, means for rotating said pin through a predetermined angular extent in winding direction, and then in reverse direction to facilitate removal of the work.

14. In a forming machine, means for winding a coil, means supporting stock for forming said coil so that its end portion is free, a winding form, a winding pin spaced from the axis of the form and rotatable about said form, the axis of rotation of the winding pin being parallel with the axis of the form, said support means, said winding pin and said form being relatively movable, means for moving said support means and said form so that said free portion of the stock is engaged on opposite sides by the form and said winding pin respectively and at points spaced from its end, means for rotating said pin through a predetermined angular extent in winding direction, and then in reverse direction to facilitate removal of the work, means for adjusting the relative positions of the axis of rotation of the winding pin about the axis of the form, and means for altering the angular extent of the rotation of the winding pin.

15. In coil forming mechanism, means appropriately supporting stock for a coil, a winding form, winding means for coiling at least a portion of said stock about said form, said supporting means being movable toward and away from said winding means, means mounting said winding form for movement in a generally axial direction, means whereby movement of said mounting means causes movement of said support means to bring the stock into and out of operative relation with the winding means, and locking means for securing said support means and said mounting means against relative movement while said stock is in operative relation with the winding means.

16. In coil forming mechanism, means appropriately supporting stock for a coil, a winding form, winding means for coiling at least a portion of said stock about said form, said supporting means being movable toward and away from said winding means, means mounting said winding form for movement in a generally axial direction, means whereby movement of said mounting means causes movement of said support means to bring the stock into and out of operative relation with the winding means, locking means movable to a position securing said support means and said mounting means against relative movement, and means for moving said locking means to securing position.

17. In coil forming mechanism, means appropriately supporting stock for a coil, a winding form, winding means for coiling at least a portion of said stock about said form, said supporting means being movable toward and away from said winding means, means mounting said winding form for movement in a generally axial direction, means whereby movement of said mounting means causes movement of said support means to bring the stock into and out of operative relation with the winding means, locking means carried by said mounting means and movable to a position securing said support means and said mounting means against relative movement, and means for moving said locking means to securing position in response to movement of said mounting means.

18. In coil forming mechanism, means appropriately supporting stock for a coil, a winding form, winding means for coiling at least a portion of said stock about said form, said supporting means being movable toward and away from said winding means, means mounting said winding form for movement in a generally axial direction, means whereby movement of said mounting means causes movement of said support means to bring the stock into and out of operative relation with the winding means, a locking member carried by said mounting means for movement with respect thereto and adapted to engage said support means when said mounting means is in position to cause movement of said support means, and means operated in response to arrival of said mounting means at a predetermined position to cause said locking member to engage said support means, whereby said support means and said mounting means are secured against relative movement.

19. In coil forming mechanism, means appropriately supporting stock for a coil, a winding form, winding means for coiling at least a portion of said stock about said form, said supporting means being movable toward and away from said winding means, means mounting said winding form for movement in a generally axial direction, means whereby movement of said mounting means causes movement of said support means to bring the stock into and out of operative relation with the winding means, a locking member carried by said mounting means for movement with respect thereto, and adapted to engage said support means when said mounting means is in position to cause movement of said support means, and cam means operated in response to movement of said mounting means for causing said locking member to engage said support means, whereby said support means is secured against movement relative to the mounting means.

20. In a machine for forming a coil, movable means for supporting the coil, said coil having a projecting tail, a fixed cutter, a movable cutter, said movable cutter by engaging said tail serving to move the coil and the coil supporting means to bring the tail into engagement with the stationary cutter and trim said tail from the coil, means for directing a fluid jet at said cutters to eject the severed tail, a valve controlling the supply of fluid to said jet, and means for opening said valve when the trimming operation occurs.

21. In a machine for forming a conical coil, means for carrying the coil, the small end of the coil having a projecting tail, a pair of relatively movable cutters for trimming the tail, and a form having a projection of arcuate cross section for insertion between a pair of successive convolutions of the coil for supporting the coil laterally during trimming.

22. In a machine for forming a pair of spaced conical coils, a pair of relatively movable dies, means respectively on said dies forming surfaces for engaging the opposite ends of said coils, a pair of projections having tapered ends on one of said dies for engaging the smallest loops of said coils respectively, means for causing said dies to approach to a predetermined separation whereby the height of said springs is set, said tapered projections cooperating to maintain the center distance between said smallest loops at a predetermined amount.

23. In a forming apparatus, a rotatable shaft, a plurality of forming mechanisms disposed about said shaft in angularly spaced relation with respect to each other, means operatively connecting said mechanisms with said shaft whereby rotation of said shaft operates the mechanisms, means for rotating the shaft, a plurality of work holders disposed about said shaft in angularly spaced relation with respect to each other, means supporting said work holders for movement about said shaft, energy storing means energized in response to rotation of said shaft, and means operated by rotation of said shaft causing the energy stored in said means to advance the work holders synchronously with the operation of the forming mechanisms.

24. In a forming apparatus, a rotatable shaft, a plurality of forming mechanisms disposed about said shaft in angularly spaced relation with respect to each other, means operatively connecting said mechanisms with said shaft whereby rotation of said shaft operates the mechanisms, means for rotating the shaft, a plurality of work holders disposed about said shaft in angularly spaced relation with respect to each other, means supporting said work holders for movement about said shaft, energy storing means, a latch ring secured to said supporting means, a locking dog normally cooperating with said ring to prevent movement of said means, a ratchet dog movable in one direction to advance said latch ring, and means whereby rotation of said shaft is effective to move said ratchet dog in said one direction and to energize said energy storing means, continued rotation of the shaft causing said energy storing means to move said ratchet dog in said other direction and advance said latch ring.

25. In a multiple stage forming press, a plurality of forming stages arranged in a circuit for performing successive operations on a work piece advanced in a step by step manner from one stage to the next, a work holder for gripping the work continuously throughout its traverse about the circuit, means in one stage adapted to load a work piece into the work holder, means in said stage for ejecting the finished work piece from the work holder, and means insuring that the finished work piece is ejected prior to the loading operation.

26. In a multiple stage forming press, a work holder comprising a pair of relatively movable fingers adapted to grip a work piece between them and means urging said fingers to work gripping position, and adapted to be indexed into operative relation with a reciprocating ram, a plunger reciprocably carried by the ram, for releasing said fingers from clamping position, means for reciprocating said ram, and means for moving said plunger to release said fingers before the ram reaches the upper limit of its stroke.

27. In a multiple stage forming press, a work holder comprising a pair of relatively movable fingers, means forming jaw surfaces respectively on said fingers adapted to clamp a work piece between them in response to relative movement between the fingers in one direction, means urging said fingers in work clamping direction, said work holder being adapted to be indexed into operative relation with a reciprocating ram, means carried by said ram and movable independently thereof for causing relative movement between said fingers to release the work, means movable transversely of said jaw surfaces for ejecting a finished work piece from the work holder, and means whereby movement of said ram operates said ejecting means in work ejecting direction.

28. In a multiple stage forming press, a work holder comprising a pair of relatively movable fingers, means forming jaw surfaces respectively on said fingers adapted to clamp a work piece between them in response to relative movement between the fingers in one direction, means urging said fingers in work clamping direction, said work holder being adapted to be indexed into operative relation with a reciprocating ram, means carried by said ram and movable independently thereof for causing relative movement between said fingers to release the work, means movable transversely of said jaw surfaces for ejecting a finished work piece from the work holder, means carried by said ram for moving a finished work piece out of engaging position with said jaw surfaces in response to movement of the ram, and means whereby said movement of the ram operates said ejecting means in work ejecting direction.

29. In a multiple stage forming press, a work holder comprising a pair of relatively movable fingers. means forming jaw surfaces respectively on said fingers adapted to clamp a work piece between them in response to relative movement between the fingers in one direction, means urging said fingers in work clamping direction, said work holder being adapted to be indexed into operative relation with a reciprocating ram, means for causing relative movement between the jaws to release the work, and means on the ram for engaging a finished work piece for moving said work piece from between said jaws.

30. In a multiple stage forming press, a work holder comprising a pair of relatively movable fingers, means forming jaw surfaces respectively on said fingers adapted to clamp a work piece between them in response to relative movement between the fingers in one direction, means urging said fingers in work clamping direction, said work holder being adapted to be indexed into operative relation with a reciprocating ram, means for causing relative movement between the jaws to to release the work, means on the ram for straddling the work holder and arranged to simultaneously engage the opposite end portions of a finished work piece therein and move the work piece from between said jaws, but to clear the end portions of an unformed work piece upon insertion thereof between the jaws.

31. In a multiple stage forming press, a work holder comprising a pair of relative movable fingers, means forming jaw surfaces respectively on said fingers adapted to clamp a work piece between them in response to relative movement between the fingers in one direction, means urging said fingers in work clamping direction, said work holder being adapted to be indexed into operative relation with a reciprocating ram, means for causing relative movement between the jaws to release the work, means movable transversely of said jaw surfaces and spaced above and adjacent one end thereof for ejecting a finished work piece from the work holder, means on the ram for moving a finished work piece from between the jaws so as to be ejected by said ejecting means, said means on the ram and said ejecting means providing clearance for an unformed work piece, whereby said last mentioned piece is not affected by movement of either of said last mentioned means.

32. The method of operating a multiple stage forming press comprising a plurality of movable rams, the forming operations occurring as the rams reach corresponding points of their strokes, some of said stages only requiring the work of the forming operation to be performed by movement of the ram, which comprises: timing the movement of the rams in those stages where work is not performed by movement of the ram so that said rams reach the said points of their strokes substantially simultaneously, and timing the movements of at least some of the work performing rams so that an equal number of said rams reach the said points of their strokes respectively by substantially equal angular amounts before and after said rams which do not perform work, whereby to distribute the load incident to such forming operations on the mechanism.

33. In cutting and feeding mechanism for providing work pieces from continuous stock, a rotatable member having a surface adapted to be engaged by said stock, means exerting a force resiliently urging said stock against said surface, whereby rotation of the member advances the stock, means on said member for releasing said force upon a predetermined rotation of said member, means for altering the extent of said predetermined rotation to thereby vary the length of the work piece, and means for severing the work piece.

34. In cutting and feeding mechanism for providing work pieces from continuous stock, a rotatable member having a surface adapted to be engaged by said stock, means exerting a force resiliently urging said stock against said surface, whereby rotation of the member advances the stock, means forming an adjustable cam surface on said member for urging said force exerting means to release said force, the adjustment of said cam surface serving to vary the length of the work piece, and means for severing the work piece.

35. In cutting and feeding mechanism for providing work pieces from continuous stock, a rotatable member having a surface adapted to be engaged by said stock, means exerting a force resiliently urging said stock against said surface, whereby rotation of the member advances the stock, a pair of relatively adjustable cams on said member for urging said force exerting means to release said force, the adjustment of said cams serving to vary the length of the work piece, and means for severing the work piece.

36. In a forming press including a forming stage having a fixed forming element and a movable forming element, a work holder having a pair of relatively movable fingers adapted to grip a work piece between them, means for advancing said work holder to bring the work piece into operative relation with said forming elements, means pivotally mounting said work holder on said advancing means for movement in a direction transverse to said advance, means urging said fingers to grip the work piece, and means positioning said work holder about said pivot for movement between said elements, said moving element swinging the work holder about its pivot to bring the work into operative relation with the fixed forming element.

37. In coil forming mechanism, means appropriately supporting stock for a coil, a winding form, winding means for coiling at least a portion of said stock about the form, said supporting means being movable toward and away from said winding means, means mounting said winding form and said winding means for relative movement axially of said form, means whereby movement of said mounting means causes movement of said support means to bring the stock into and out of operative relation with the winding means, and means causing relative axial movement between the form and the winding means as the winding progresses.

38. A movably supported work holder comprising a pair of fingers secured together for relative movement, means forming jaw surfaces respectively on said fingers and adapted to clamp a work piece between them in response to relative movement between the fingers in one direction, means urging said fingers in clamping direction, and means on one of said fingers adapted to be engaged by a member moving transversely to the direction of movement of the work holder for causing relative movement between the fingers to release the work piece.

39. In a forming machine, including a stage in which an operation is performed on a work piece, a work holder for gripping the work piece, movable in one direction into operative relation with said stage and in another direction into operation forming condition, a reciprocable ram for cooperating with said stage to perform the operation, and a member carried by the ram for independent movement with respect thereto for conditioning the work holder for the operation.

40. In a forming machine, including a stage in which an operation is performed on a work piece, a work holder for gripping the work piece, movable in one direction into operative relation with said stage and in another direction into operation forming condition, a reciprocable ram for cooperating with said stage to perform the operation, a member carried by the ram for independent movement with respect thereto, and means for moving said member in advance of the ram for conditioning the work holder for the operation.

41. In a forming press, a work holder comprising a pair of relatively movable fingers having jaws adapted to grip the work between them, means urging said fingers to cause the jaws to grip the work, said work holder being adapted to be positioned in operative relation with a reciprocating ram, means for causing the jaws to release the work, means for moving said work piece from between the jaws including a member movable transversely of the jaws, and means whereby movement of said ram operates said member.

42. In a forming press, a work holder comprising a pair of relatively movable fingers having jaws adapted to grip the work between them, means urging said fingers to cause the jaws to grip the work, said work holder being adapted to be positioned in operative relation with a reciprocating ram, means for causing the jaws to release the work, means for moving said work piece from between the jaws including a member pivoted for movement transversely of the jaws, a link for swinging said arm about its pivot and means whereby said ram engages said link to swing the arm.

43. In a forming press, a pair of relatively movable fingers having jaws adapted to grip the work between them, means urging the fingers to cause the jaws to grip the work, a movable member adapted to be positioned on one side of said fingers, means for moving said fingers to release the work, and means for causing said member to swing past the jaws and eject the work from therebetween.

44. In a forming press, a pair of relatively movable fingers having jaws adapted to grip the work between them, means urging the fingers to cause the jaws to grip the work, a pivoted arm adapted to be positioned on one side of said fingers, a link for swinging said arm about its pivot, means for moving said fingers to release the work, and means engageable with said link to cause said arm to swing past the jaws and eject the work from therebetween.

45. In a forming press, a work holder comprising a pair of relatively movable fingers having jaws adapted to grip the work between them, means urging said fingers to cause the jaws to grip the work, a movable member adapted to be positioned on one side of said fingers, means for moving said fingers to release the work, means for causing said member to swing past the jaws and eject the work, and means for feeding a work piece between the jaws while they are in work releasing position.

46. In a forming press, a work holder comprising a pair of relatively movable fingers having jaws adapted to grip the work between them, means urging said fingers to cause the jaws to grip the work, a pivoted arm adapted to be positioned on one side of said fingers, means for moving said fingers to release the work, means for causing said arm to swing past the jaws and eject the work, and to return to its initial position, and means for feeding a work piece between the jaws after the return of said arm to its initial position and while the jaws are in work releasing position.

47. A machine for forming a spring fastening element, comprising means for releasably gripping a length of stock between its ends, means for producing an offset intermediate the free ends of the stock, means for acting on the free ends of the stock to form them into coils, said gripping means maintaining the stock gripped during the formation of said coils and said offset, and means for causing said gripping means to release said stock.

STEWART H. JONES.

REFERENCES CITED

The following references are of record in the file of this patent:

UNITED STATES PATENTS

| Number | Name | Date |
| --- | --- | --- |
| 195,186 | Tyner | Sept. 11, 1877 |
| 224,484 | Foster | Dec. 9, 1879 |
| 296,806 | Wildermuth | Apr. 15, 1884 |
| 344,247 | Cawley | June 22, 1886 |
| 466,117 | Cady | Dec. 29, 1891 |
| 487,679 | Morse | Dec. 6, 1892 |
| 489,550 | Stark | Jan. 10, 1893 |
| 543,401 | Pettersen | July 23, 1895 |
| 574,154 | Lane | Dec. 29, 1896 |
| 681,491 | Bement | Aug. 27, 1901 |

(Other references on following page)

UNITED STATES PATENTS

| Number | Name | Date |
|---|---|---|
| 749,730 | Haley | Jan. 19, 1904 |
| 841,634 | Crouch | Jan. 15, 1907 |
| 1,012,630 | Gridley | Dec. 26, 1911 |
| 1,282,530 | Bloemker | Oct. 22, 1918 |
| 1,387,055 | Kaase | Aug. 9, 1921 |
| 1,495,508 | Campbell | May 27, 1924 |
| 1,586,627 | Kominsky | June 1, 1926 |
| 1,710,261 | Kellogg | Apr. 23, 1929 |
| 1,733,881 | Illingworth | Oct. 29, 1929 |
| 1,733,961 | Gray | Oct. 29, 1929 |
| 1,737,261 | Morin | Nov. 26, 1929 |
| 1,737,262 | Morin | Nov. 26, 1929 |
| 1,791,378 | Regenstreif | Feb. 3, 1931 |
| 1,795,175 | Hardesty | Jan. 13, 1931 |
| 1,821,894 | Otaka | Sept. 1, 1931 |
| 1,833,417 | Drake | Nov. 24, 1931 |
| 1,881,981 | Trussell | Oct. 11, 1932 |
| 1,894,526 | Wilcox | Jan. 17, 1933 |
| 1,966,256 | Marinsky | July 10, 1934 |
| 1,976,104 | Archea | Oct. 9, 1934 |
| 2,031,982 | Saltzman | Feb. 25, 1936 |
| 2,058,698 | Lehman | Oct. 27, 1936 |
| 2,148,247 | Swangren | Feb. 21, 1939 |
| 2,157,050 | Bilger et al. | May 2, 1939 |
| 2,219,040 | Harper | Oct. 22, 1940 |
| 2,261,703 | Tetzlaff | Nov. 4, 1941 |
| 2,268,824 | Hicks | Jan. 6, 1942 |
| 2,272,055 | Carlson | Feb. 3, 1942 |
| 2,275,978 | Mingle | Mar. 10, 1942 |
| 2,297,950 | Flaws, Jr. | Oct. 6, 1942 |
| 2,337,528 | Stuckert et al. | Dec. 21, 1943 |
| 2,351,200 | George et al. | June 13, 1944 |
| 2,357,615 | Stuhlfauth | Sept. 5, 1944 |